(12) United States Patent
Anteau

(10) Patent No.: US 12,092,069 B2
(45) Date of Patent: Sep. 17, 2024

(54) POWER GENERATOR

(71) Applicant: Mark R. Anteau, Toledo, OH (US)

(72) Inventor: Mark R. Anteau, Toledo, OH (US)

(*) Notice: Subject to any disclaimer, the term of this patent is extended or adjusted under 35 U.S.C. 154(b) by 0 days.

(21) Appl. No.: 16/940,388

(22) Filed: Jul. 27, 2020

(65) Prior Publication Data
US 2021/0148327 A1    May 20, 2021

Related U.S. Application Data

(63) Continuation-in-part of application No. PCT/US2019/014989, filed on Jan. 24, 2019, and a continuation-in-part of application No. 16/116,903, filed on Aug. 29, 2018, now Pat. No. 11,073,139.

(60) Provisional application No. 62/622,048, filed on Jan. 25, 2018, provisional application No. 62/551,781, filed on Aug. 29, 2017.

(51) Int. Cl.
*F03B 17/02* (2006.01)
*F03B 13/08* (2006.01)
*F03B 17/04* (2006.01)

(52) U.S. Cl.
CPC ............ *F03B 17/02* (2013.01); *F03B 13/08* (2013.01); *F03B 17/04* (2013.01)

(58) Field of Classification Search
CPC .... F03G 7/04; F04F 5/02; F03B 17/02; F03B 13/08; F03B 17/04; Y02E 10/20
USPC ................................. 290/54; 405/78; 60/398
See application file for complete search history.

(56) References Cited

U.S. PATENT DOCUMENTS

| | | | |
|---|---|---|---|
| 2,072,930 | A | 3/1937 | Voorduin |
| 3,648,458 | A | 3/1972 | McAlister |
| 4,038,186 | A | 7/1977 | Potter et al. |
| 4,307,299 | A | 12/1981 | Norton |
| 4,391,097 | A | 7/1983 | Tsunoda et al. |
| 4,408,452 | A | 10/1983 | Tsunoda |
| 4,430,861 | A | 2/1984 | Avery |
| 4,450,690 | A | 5/1984 | Clark, Jr. |
| 4,617,801 | A | 10/1986 | Clark, Jr. |
| 4,629,904 | A | 12/1986 | Rojo, Jr. et al. |
| 4,746,244 | A | 5/1988 | Broome |
| 4,797,563 | A | 1/1989 | Richardson |
| 4,819,697 | A | 4/1989 | Randa et al. |
| 4,883,411 | A | 11/1989 | Windle |
| 4,898,517 | A | 2/1990 | Eriksen |
| 4,991,397 | A | 2/1991 | Varsa |
| 5,099,648 | A | 3/1992 | Angle |
| 5,329,497 | A | 7/1994 | Previsic et al. |
| 5,426,332 | A | 6/1995 | Ullman et al. |
| 6,250,199 | B1 | 6/2001 | Shulte et al. |

(Continued)

*Primary Examiner* — Pedro J Cuevas
(74) *Attorney, Agent, or Firm* — UB Greensfelder LLP; Matthew J. Schonauer

(57) ABSTRACT

The power plant disclosed is an engine that derives its usefulness in the pursuit of energy generation by utilizing hydrostatic pressure differentials found or created in various liquids, gases or solutions, such as but not limited to water and air. It is generally provided as a configuration designed to create a pressure differential, and to use the pressure differential to increase the effective head seen via a penstock and turbine system. Pump systems that are employed include venturi systems, jet pump systems and other comparable mixed-pressure vacuum pumps. Multiple power generating systems are interconnected to provide continuous and constant power generation through a penstock and turbine system.

8 Claims, 44 Drawing Sheets

(56) References Cited

U.S. PATENT DOCUMENTS

| | | |
|---|---|---|
| 6,313,545 B1 | 11/2001 | Finley et al. |
| 6,546,723 B1 | 4/2003 | Watten et al. |
| 6,559,554 B2 | 5/2003 | Finley et al. |
| 6,800,954 B1 | 10/2004 | Meano |
| 6,803,670 B2 | 10/2004 | Peloquin |
| 7,132,758 B2 * | 11/2006 | Rochester ............... F03B 17/00 |
| | | 290/43 |
| 7,132,759 B2 | 11/2006 | Alstot et al. |
| 7,239,037 B2 | 7/2007 | Alstot et al. |
| 7,329,962 B2 | 2/2008 | Alstot et al. |
| 7,918,087 B1 | 4/2011 | Brown et al. |
| 7,926,501 B2 | 4/2011 | Springett et al. |
| 8,049,351 B2 | 11/2011 | Mahawili |
| 8,196,396 B1 | 6/2012 | Tseng |
| 8,231,327 B2 * | 7/2012 | Davis, Sr. ................. F03G 7/04 |
| | | 415/906 |
| 8,234,861 B2 | 8/2012 | Frye |
| 8,424,300 B1 | 4/2013 | Navarro |
| 8,446,031 B2 | 5/2013 | Roberts |
| 8,631,638 B2 | 1/2014 | Carlos |
| 8,946,922 B1 | 2/2015 | Johnson |
| 9,038,377 B2 | 5/2015 | Anteau |
| 9,127,639 B2 | 9/2015 | Cho et al. |
| 9,157,332 B2 * | 10/2015 | Hanna ..................... F03B 17/02 |
| 9,163,606 B2 * | 10/2015 | Azar ....................... F03B 17/02 |
| 9,234,494 B2 | 1/2016 | Anteau |
| 9,234,495 B2 | 1/2016 | Anteau |
| 9,752,549 B2 | 9/2017 | Roberts |
| 10,221,830 B2 | 3/2019 | Schneider |
| 10,428,786 B2 | 10/2019 | Navarro |
| 10,527,021 B2 | 1/2020 | Schneider |
| 10,781,787 B2 * | 9/2020 | Hector, Jr. ............ H02K 7/1823 |
| 10,801,476 B2 * | 10/2020 | Ekanem .................... F03G 3/00 |
| 2002/0130520 A1 | 9/2002 | Finley et al. |
| 2003/0066289 A1 | 4/2003 | Watten et al. |
| 2003/0164613 A1 | 9/2003 | Finley et al. |
| 2005/0082837 A1 | 4/2005 | Alstot et al. |
| 2005/0236842 A1 | 10/2005 | Alstot et al. |
| 2006/0006657 A1 | 1/2006 | Alstot et al. |
| 2007/0152452 A1 | 7/2007 | Finley et al. |
| 2009/0152871 A1 | 6/2009 | Ching |
| 2009/0320459 A1 * | 12/2009 | Frye ......................... F03G 7/04 |
| | | 60/398 |
| 2010/0170236 A1 | 7/2010 | Lezi |
| 2010/0194116 A1 | 8/2010 | Mahawili |
| 2010/0209192 A1 | 8/2010 | Behm et al. |
| 2011/0042956 A1 | 2/2011 | Frye |
| 2011/0109089 A1 | 5/2011 | Frye |
| 2011/0110797 A1 | 5/2011 | Cho et al. |
| 2011/0204642 A1 * | 8/2011 | Davis, Sr. ................. F03G 7/04 |
| | | 290/52 |
| 2011/0258996 A1 | 10/2011 | Ingersoll et al. |
| 2011/0278844 A1 * | 11/2011 | Davis, Sr. ................. F03G 7/04 |
| | | 290/52 |
| 2011/0278845 A1 * | 11/2011 | Davis, Sr. ................. F03G 7/04 |
| | | 290/52 |
| 2012/0038165 A1 | 2/2012 | Carlos |
| 2012/0167563 A1 | 7/2012 | Cherepashenets et al. |
| 2013/0019971 A1 | 1/2013 | Anteau |
| 2013/0089410 A1 * | 4/2013 | Azar ....................... F03B 7/003 |
| | | 415/151 |
| 2014/0028028 A1 | 1/2014 | Frye |
| 2014/0130497 A1 | 5/2014 | Anteau |
| 2014/0216022 A1 * | 8/2014 | Jiang ....................... F03B 13/06 |
| | | 60/413 |
| 2014/0246860 A1 | 9/2014 | Payre et al. |
| 2014/0312623 A1 | 10/2014 | Anteau |
| 2015/0198057 A1 | 7/2015 | Hanna ..................... F01D 15/10 |
| | | 290/52 |
| 2017/0184069 A1 | 6/2017 | Roberts |
| 2017/0204830 A1 | 7/2017 | Schneider |
| 2019/0085814 A1 | 3/2019 | Bee |
| 2019/0383260 A1 * | 12/2019 | Frye ........................ F03B 17/00 |
| 2020/0080531 A1 * | 3/2020 | Hector, Jr. ............... H02J 3/38 |
| 2020/0080538 A1 * | 3/2020 | Hector, Jr. ............ F03B 11/004 |
| 2020/0191109 A1 * | 6/2020 | Hector, Jr. ............ H02K 7/1823 |
| 2020/0208615 A1 * | 7/2020 | Ekanem .................... F03G 3/00 |
| 2020/0378354 A1 * | 12/2020 | Hector, Jr. ............... H02K 7/02 |
| 2020/0400114 A1 * | 12/2020 | Hector, Jr. ............. F03B 13/06 |

* cited by examiner

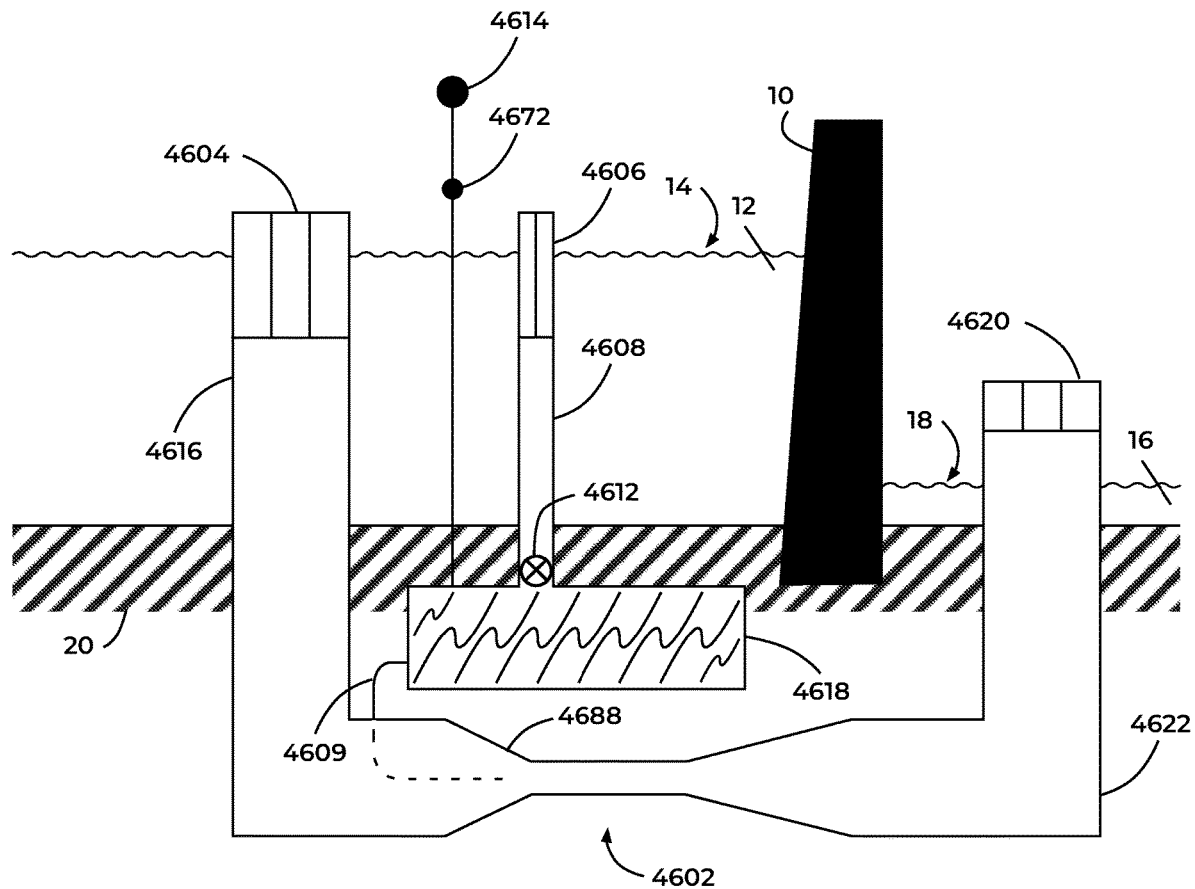
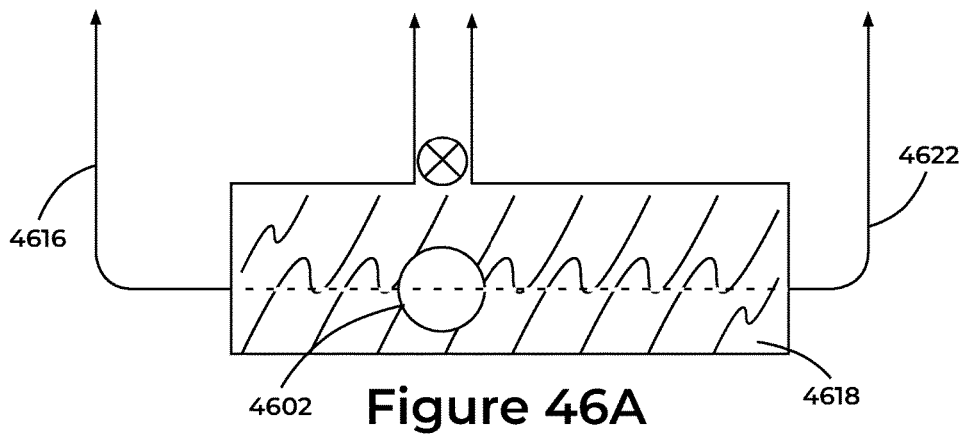
Figure 46
Figure 46A

POWER GENERATOR

CROSS-REFERENCE TO RELATED APPLICATIONS

This application claims the benefit of U.S. patent application Ser. No. 16/116,903 filed 29 Aug. 2018, and international patent application number PCT/US2019/014989 filed 28 Aug. 2019 under 35 USC § 120, the disclosures of each of which are both hereby incorporated by reference.

TECHNICAL FIELD

Exemplary embodiments of the present invention relate generally to the field of power generation, and more specifically to hydroelectric power generation systems and methods based on renewable energy and pressure differential principles.

BACKGROUND OF THE INVENTION

As energy sources based on fossil fuels become ever more expensive to maintain and their environmental cost is realized and quantified, the world has turned to renewable energy sources to combat these disadvantages of traditional energy generation methods. A sharply increasing demand curve continues to push the need for innovative new ways to generate power. There is thus a current need for new sources of energy that utilize renewable sources to generate that energy.

A particularly salient obstacle to power generation is the power input needed for use in the generation scheme. The input power required will inherently reduce the efficiency, and therefore the viability of, the system. Therefore, there is a need for a power generation scheme that utilizes natural phenomenon to both reduce the input power required to operate the system and to provide an energy source greater than the input power that the system can convert to a form of usable energy.

Previous work by the applicant has disclosed a power generation system based upon the use of, in combination or in part, natural pressure gradients, fluid flow and buoyant forces. These disclosures can be found, for example in U.S. Pat. No. 9,038,377 (issued 26 May 2015), U.S. Pat. No. 9,234,494 (issued 12 Jan. 2016) and U.S. Pat. No. 9,924,495 (issued 12 Jan. 2016), the contents of each of which are hereby incorporated by reference as if fully restated herein. While those disclosed systems and methods have been shown to be effective in power generation, there remains further need for efficiency gains and variations upon these systems and methods in order to meet society's ever-growing energy needs effectively and in an environmentally friendly manner.

It is therefore an unmet need in the prior art for more efficient power generation systems able to harness more renewable energy and being adaptable for increasing the efficacy of existing power generation systems. No known references, taken alone or in combination, are seen as teaching or suggesting the presently claimed power generation system.

BRIEF SUMMARY OF THE INVENTION

Exemplary embodiments of the present disclosure pertain to innovative systems and method for performing work such as but not limited to generating power (electricity), lifting items, pumping liquids/gases/solutions and operating mechanisms such as a saw, mill, or other devices generally requiring a force input. This document will disclose the manner in which the invention generates power (electricity) using a pressure differential from a natural source of water, a man-made source of water or a combination of a natural and a man-made source of water. Natural sources of water include but are not limited to an ocean, lake, river, spring, stream, wave action (surf), tides and run-off water. Man-made water supplies include but are not limited to dams/reservoirs, water towers, canals, tanks, pipes, ditches and wells. The water can, also, come from any combination of natural or man-made sources. The invention uses a pressure differential to move water through a power plant in an alternative wave action to perform work. The system is reset at the end of each stroke in the cycle to reverse the wave action allowing the flow and system to return to its beginning state.

Under the same conditions such as but not limited to: location, geography/topography, size of dam, size of reservoir and depth of reservoir the invented system can extend the length/height of its penstock further than current technology allows. Accordingly, the invented system can generate more power at comparable efficiencies to traditional hydroelectric power plants using any natural source of water, man-made source of water or any combination of a natural and man-made sources of water than any current/traditional hydroelectric power plant in operation today. Some examples include but are not limited to the following: Given a head of water that is five feet deep in theory and under the right conditions, the invented system can have a penstock length significantly longer than five feet. Theoretically, this innovation can outperform current hydroelectric power plants using the same dam reservoir system. If a dam is 50 feet tall and has a reservoir that is 45 feet deep and discharges its water from the penstock into a low head of water 45 feet below the reservoirs head of water, then current hydroelectric power plants can only have a penstock of approximately 45 feet or less. Thus, the most head of water any current hydroelectric power plant could possibly use to generate power, under those conditions, is limited to a depth of 45 feet. Given the same conditions, location, 50-foot dam, the same size reservoir with a depth of 45 feet and discharges its water from the penstock with the same diameter into a low head of water 45 feet below the reservoirs head of water, then the invented system can have a penstock far longer than 45 feet. Under the same conditions such as but not limited to: the same location, 50-foot dam, the same size reservoir with a depth of 45 feet and discharges its water from a penstock with the same size diameter into a low head of water 45 feet below the reservoirs head of water, it is possible for the invented system to have a penstock with a length between (0 to 200 feet or longer). This allows the invented system to generate more power (electricity) than current hydroelectric power plants are capable of generating, given the same conditions.

Since the invented system and its variations use a pressure differential based upon a high head of water and a low head of water to move water through the system hydrostatic pressure (gravity) moves the water. This saves energy and gives the invented system efficiencies that compare or exceed traditional hydroelectric power plants including hydroelectric pump storage power plants (HEPS Power Plants). The pressure differential can be a result of natural conditions such as but not limited to topography. Manmade design (altering the landscape) and or the intervention of man-made devices such as but not limited to: dams, reservoirs, water towers, canals, locks (like the ones on the St.

Lawrence Seaway and the Panama Canal), pipes, and ditches and the pressure differential can be derived from a combination of natural and man-made causes.

Natural sources of water include but are not limited to an ocean, lake, river, spring, stream, wave action, tides or run-off water. Man-made water supplies include but are not limited to dams/reservoirs, water towers, canals, tanks, pipes, ditches or wells. The water can, also, come from any combination of natural or man-made sources.

Some of the inventions variations do use a pump system and if desired one or more pump systems can be added to any of its variations. If desired or necessary, a pump system can be added to the invented system to help move water through the system and/or to help evacuate water from the system. Some variations may need to pump water from a point of discharge, like a connecting pipe, an evacuation chamber and/or some other area. Note that, for the purposes of this disclosure, venturi systems and E-jector-transvac ejector technology are consider pump systems.

Given the same conditions such as but not limited to: head of water, location, topography and whether or not a dam/reservoir system is used, the invented system and its variations can have a penstock considerably longer than current hydroelectric power plants. This means the invented system can generate more power (electricity) than current hydroelectric power plants using the same head of water. It follows that invented system can be placed at sites where it was previously not practical to build a hydroelectric power plant because the amount of electricity generated was not cost effective.

The invented system can be built (with or without) using a dam and a reservoir. However, if a dam/reservoir system is desired and/or required, then the invented systems can be built using a smaller dam and reservoir system and generate a wide range of power even more power than a traditional hydroelectric power plant can generate at that site. Therefore, the invented system and its variations can be built in locations where it was previously not practical to build a hydroelectric power plant because of the cost effectiveness, topography, environmental concerns and the loss of land/property.

The invented system can be used to replace existing hydroelectric power plants to provide more power generation. If desired an existing hydroelectric power plant can be replaced with the invented system to reduce the size of a dam and reservoir system and still generate the same amount or a greater amount of power (electricity).

The applicant's prior work (patents) illustrates how to add components (more return stations) to this type of power plant to supply water to the penstock continuously. This would allow the invented system to generate power continuously. Currently, without adding return stations to supply the penstock with a continuous supply of water, the invented system would generate intermittent power. This is because if there is only one return station supplying water to the penstock, then as they are moving up and down to supply water to the penstock and to be refilled with water, there would be no water being supplied to the penstock.

The high head of water can be supplied by a natural source of water, a man-made source of water and a combination of natural and man-made sources of water.

When water is discharged from the invented system, it can be evacuated into a low head of water the same high head of water supplying the power plant or a combination of being evacuated into a low head and the high head.

When water is evacuated back into the original head of water, it is acting like a hydroelectric pump storage power plant. The difference between a traditional (HEPS Power Plant) and the (EHPG pump Storage Power Plant) is that a pump storage version of the invented system can operate for longer period of time and even continuously when the applicant's prior patented work involving adding one or more return stations to the power plant to supply a continuous supply of water to the penstock (PS) is included in the design.

The invented system can operate with or without a dam/reservoir system and under the same conditions for any location it can have a longer penstock giving it greater power generation capabilities than traditional hydroelectric power plants. If a dam/reservoir is used for the invented system, then a smaller dam/reservoir system can be used to generate a wide range and even more power (electricity) compared to a traditional hydroelectric power plant.

Given the aforementioned characteristics of the invented system, it can be built in locations that previously were not conducive to building a traditional hydroelectric power plant.

The invented system can also replace current hydroelectric power plants to match or increase their power generation and or to reduce the intrusion into environmental/habitat concerns by reducing the size of the dam/reservoir system.

Components of the invented system can be used to modify existing hydroelectric power plants to increase their power generation and/or to reduce the intrusion into the environment/habitat.

Water entering the invented system can be discharged from the invented system using a venturi system and/or an ejector system (Transvac Ejector technology).

There are numerous variations of the invented system that are described in this document. They all require a high head of water and a low head of water to generate a pressure differential to move water back and forth in an up and down wave action through the invented system. The pressure differential can come from a natural source of water, a man-made source of water or a combination of a natural and man-made source of water.

The invented system and methods of perform work using a combination of manmade devices and a fundamental force of nature, gravity. The work is used to operate a turbine and a generator to generate electricity. The work can also be used to operate other machines like but not limited to pumps, saws and mechanisms that lift and lower things. Examples of this can be seen in my prior work. Gravity, in the form of a pressure differential, is used to help operate the system. The pressure differential can be from various sources such as but not limited to liquids, gases, solids and/or any combination of those elements. This document focuses on using water to generate the pressure differential in order to generate power (electricity). The water can be from any natural source such as but not limited to an ocean, lake, river, spring, stream, wave action, tides or run-off water. The water can also come from man-made water supplies such as but not limited to dams/reservoirs, canals, tanks, pipes, ditches or wells. The water can come from any combination of natural or man-made sources, as well.

The information contained in this document is used to describe the invented system's method for generating power for illustrative and teaching purposes only. Accordingly, the illustrations are not drawn to proper proportions/specifications. The drawings in this document serve to merely show how the system operates. The actual design for any of these types of power plants needs to be calculated and tested by an expert in the relevant arts to attain the best efficacy and/or desired outcome. The order of operating (opening and closing) vents and valves needs to be calculated and tested by an expert in the relevant arts.

Many of the components necessary to operate these types of power plants are not included in the diagram. However, they are necessary and implied. Some of these components may include but are not limited to the following items: a structural frame to support the power plant, computers, solenoids, smart boards, generators, a system to carry electricity from the power plant to its destination (power transmission system), maintenance access portals and a battery storage system. Maintenance portals include but are not limited to entry ports for technicians to repair and maintain the system. They also include portals to fill and to drain the different relevant areas of the power plant. The applicant's prior work demonstrates how to adapt the invented system to allow it to run continuously. Those adaptations can be applied to the invented system, too. Again, this document's goal is to explain how the invented system and its variations function. Accordingly, the actual design of any of these types of power plants and the design of any adaptations/variations will need to be calculated and tested by an expert in the relevant arts to achieve the highest and/or the desired amount of efficiency. Additionally, the order of operating (opening and closing) vents and valves needs to be calculated and tested by an expert in the relevant arts.

It should be noted that the relationship between the invented system and its surrounding environment can vary depending upon the desired outcome and the geography. Thus, the invented system can be built above ground, below ground, (partially above and partially below) ground. Likewise, the invented system can be built above water, below water and (partially above and partially below) water. The invented system can also be built inside a container.

It is an object of this invention to provide systems and methods for renewable sources of power generation of the types generally described herein, being adapted for the purposes set forth herein, and overcoming disadvantages found in the prior art. These and other advantages are provided by the invention described and shown in more detail below.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which:

FIG. 46 is an elevation view of a forty-first exemplary embodiment of the invented power generation system;

FIG. 46A is an optional configuration of the embodiment shown in connection with FIG. 46;

DETAILED DESCRIPTION OF THE INVENTION

Figure 1:
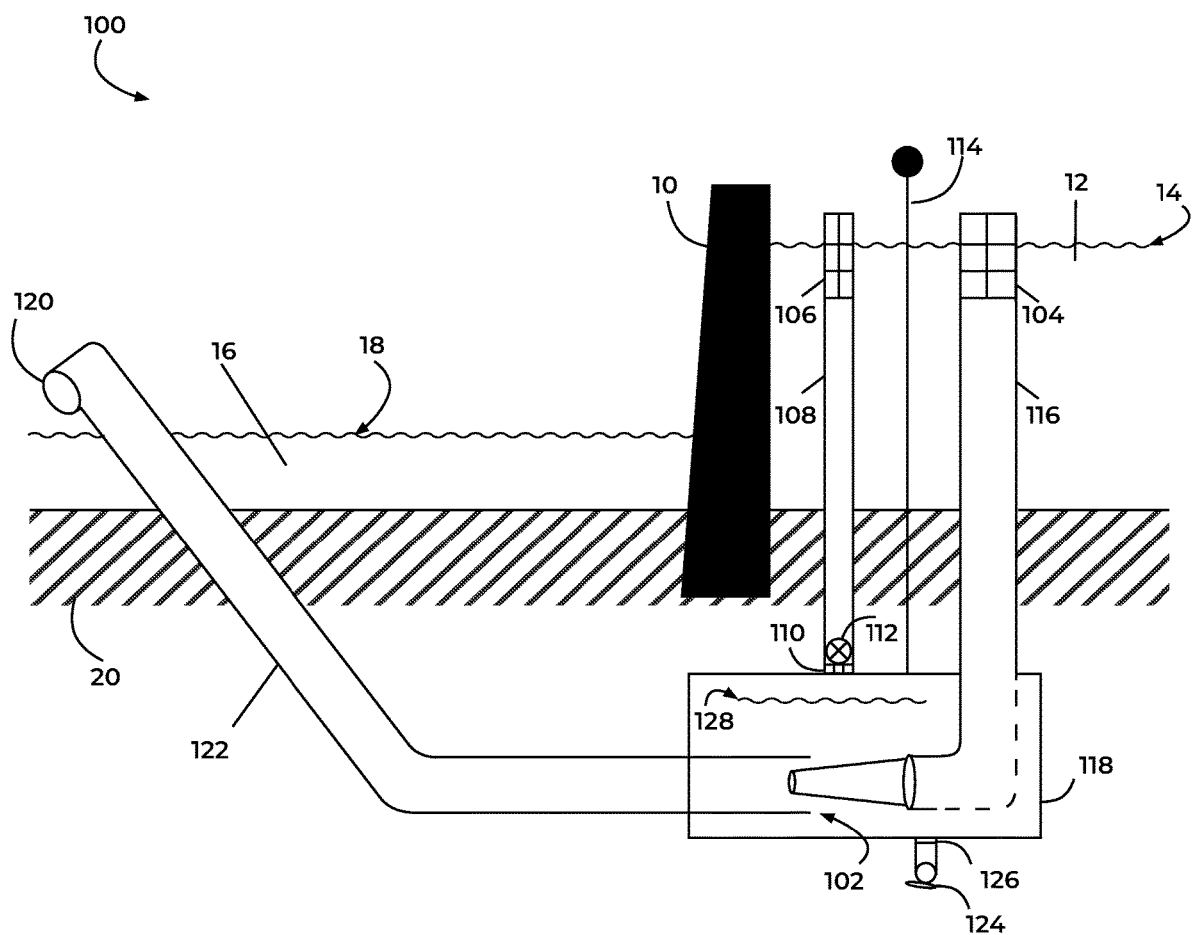
FIG. 1 is an elevation view of a first exemplary embodiment of the invented power generation system.

An exemplary embodiment of the present invention is shown in connection with FIG. 1. In this embodiment, the invention operates as a hydroelectric power source in supplementation to a traditional hydroelectric dam 10 that defines an upstream reservoir 12 having a high head 14 and a downstream tailrace 16 having a low head 18, typically found in suitable waterways flowing over ground 20. In effect, the exemplary embodiment shown here utilizes the differential in the water levels found up- and down-stream of the dam's location in combination with "flow pump", "vacuum" or "vacuum pump" systems to increase the effective head experienced through a turbine system situated in a penstock (separately from the dam system's turbine system, if applicable), thereby generating power. It will be understood that—while several exemplary embodiments of the present disclosure are presented with electrical generation turbine systems as a primary means of performing work—the systems and methods so disclosed may be readily adapted by those skilled in the art for other means, such as but not limited to, lifting items, pumping liquids/gases/solutions and operating mechanisms such as a saw, mill, or other devices generally requiring a force input.

In FIGS. 1-4, exemplary flow pump systems are incorporated into the embodiments as a means for utilizing the high head of water to assist in maintaining a consistent flow rate of the working fluid out of the turbine water chamber component and thus through the power-generating penstock component. For instance, liquid eductors, jet pumps systems (an E-Jector/Transvac ejector technology system, for example) or venturi systems can be used to evacuate water/liquids or gasses from the relevant components of the system as needed. The actual physical design of these high-low pump systems used will therefore be readily applied as deemed suitable by those skilled in the art for particular applications and shall not be considered to limit the scope of the claimed invention unless so specifically stated (e.g., in form or exact dimensions). Vacuum pumping systems (such as but not limited to: vacuum pumps, venturi systems, eductors and ejector technology systems) can be used to evacuate the working fluids from the system. Note that there are various methods to employ jet pump and venturi-type systems to evacuate working fluids from the system, and the scope of the invention should therefore not be considered limited by the following examples.

As illustrated in FIG. 1, ejector systems can be used to evacuate water from the invented system after it was used to generate power (electricity). This scenario uses a high-pressure liquid (like but not limited to water) to evacuate a liquid (like but not limited to water) from the invented system. This is a very efficient method for pumping water out of the invented system. The exemplary embodiment shown 100 is depicted as employing a single-unit ejector system 102, but it will be understood by those skilled in the art that multiple ejector units in series, parallel or combinations thereof may be employed to better suit an embodiment of the invention for a particular application. In general, references to or illustrations of vacuum systems herein should be interpreted to cover one or more vacuum system components generally, unless otherwise specified.

A method of operation for ejector systems that have water entering through valve 104 are illustrated as follows: valve 106 is opened allowing water from the high head 14 to enter the penstock 108. Valve 110 is opened allowing water in penstock 108 to pass through the turbine/generator system 112 to generate power. Air vent 114 is opened. Valve 104 is opened. Valves 106, 110, 104 and air vent 114 preferably remain open during normal plant operation. However, any of those can be opened and closed as necessary for desired operation.

Water from the high head of water 14 enters connecting pipe 116 through valve 104. It travels down to the ejector system 102. The nozzle effect from the ejector system 102 takes effect. Since the water in the turbine water chamber (TWC) 118 is vented to atmosphere by the air vent 114 it is low pressure water. Since the column of water in 116 entering 102 is higher than the column of water in the turbine water chamber 118, the water entering the 102 system from 116 is at a higher pressure than the water in 118. Thus, the entrained fluid in 118 commingles with the water in 116. Connecting pipe 116 now carries water from the high head of water 14 and water from the turbine water chamber 118 up to and out of the invented system's point of discharge 120 via connecting pipe 122 into the low head of water 18 at the tailrace 16.

The point of discharge 120 can be above, below or at the low head of water 18. Its exact location will need to be calculated and tested by an expert in the appropriate art. If required, the water pressure in the turbine water chamber 118 can be controlled by opening and closing 114. Closing 114 builds up back pressure causing the water in 118 to be raised to a higher pressure. Opening 114 can lower the water pressure in the 118 to atmospheric pressure.

A pump system 124 may be optionally added to any turbine water chamber such as 118 to evacuate water if necessary. Valve 126 may be opened when pump 124 is in operation but closed when it is not pumping. The turbine water chamber 118 may be provided with venting via air vent 114 wherein the turbine water chamber 118 has a low chamber water level/head 128

Figure 2:
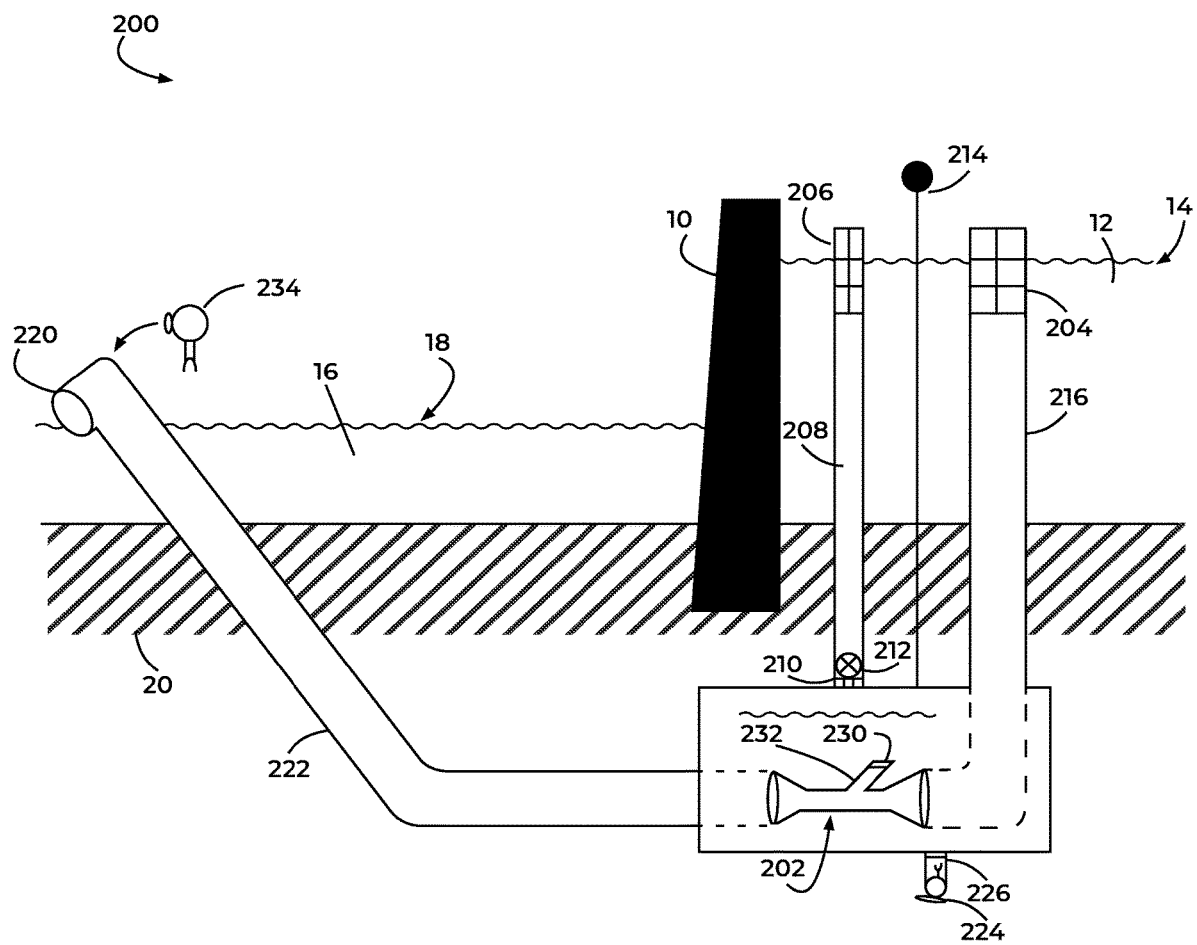
FIG. 2 is an elevation view of a second exemplary embodiment of the invented power generation system.

FIG. 2 is used to explain how a venturi-type vacuum pump system is used to evacuate water from a second embodiment 200 of the invented system using water. The pressure differentials between the water being evacuated from the turbine water chamber (TWC) 218 and the water entering valve 204 can vary. As shown in connection with FIG. 1, in this exemplary embodiment a dam is used to generate a pressure differential between the high head of water 14 and the low head of water 18. This allows for greater power generation and in some instances, allows for a greater pressure differential between the water in the TWC 218 and the water entering the connecting pipe 216 via valve 204.

Venturi vacuum pump systems that use water (or liquids generally) can be used to evacuate water from the invented system after that water was used to generate power. In this example, high pressure water is used to evacuate a lower pressure water. This is a very efficient method for evacuating water out of the invented system and provides for an increased effective head experienced by the penstock. This is especially useful, for example, in retrofitting low-head dams or reevaluating low-head dam project sites for new hydroelectric power plants.

A method of operation for venturi vacuum pump systems is illustrated as follows in connection with the exemplary embodiment shown in connection with FIG. 2: valve 206 is opened allowing water from the high head 14 to enter the penstock 208. Valve (V5) is opened allowing water in 208 to pass through the turbine/generator system 212 to generate power. Air vent 214 is opened. It vents the air space in the TWC 218 to atmosphere. Valve 204 is opened. Valve 230 is opened. Valves 206, 210, 204, 230 and air vent 214 preferably remain open during normal plant operation. However, any of those can be opened and closed as necessary for desired operation.

Water from the high head of water 14 enters connecting pipe 216 through valve 204. It travels down to the venturi vacuum pump system 202. Since the water in (TWC) 218 is vented to atmosphere by 214 it is low pressure water. Since the column of water in 216 entering 202 is higher than the column of water in the (TWC) 218, the water entering the 202 system from 216 is at a higher pressure than the water in the (TWC) 218. The venturi effect takes place, in which the low-pressure water in the turbine water chamber (TWC) 218 passes through valve 230 and commingles/mixes with the water from 216 via a connecting pipe 232. Connecting pipe 216 now carries water from the high head of water 14 and water from the (TWC) 218 up to and out of the invented system's point of discharge 220 into the low head of water 18.

Note that the point of discharge 220 can be above, below or at the low head of water. Its exact location should be calculated and tested by an expert in the appropriate art for a particular application. Furthermore, an optional pump system 234 can be added at the point of discharge 220 to help evacuate water from the invented system.

Figure 3:
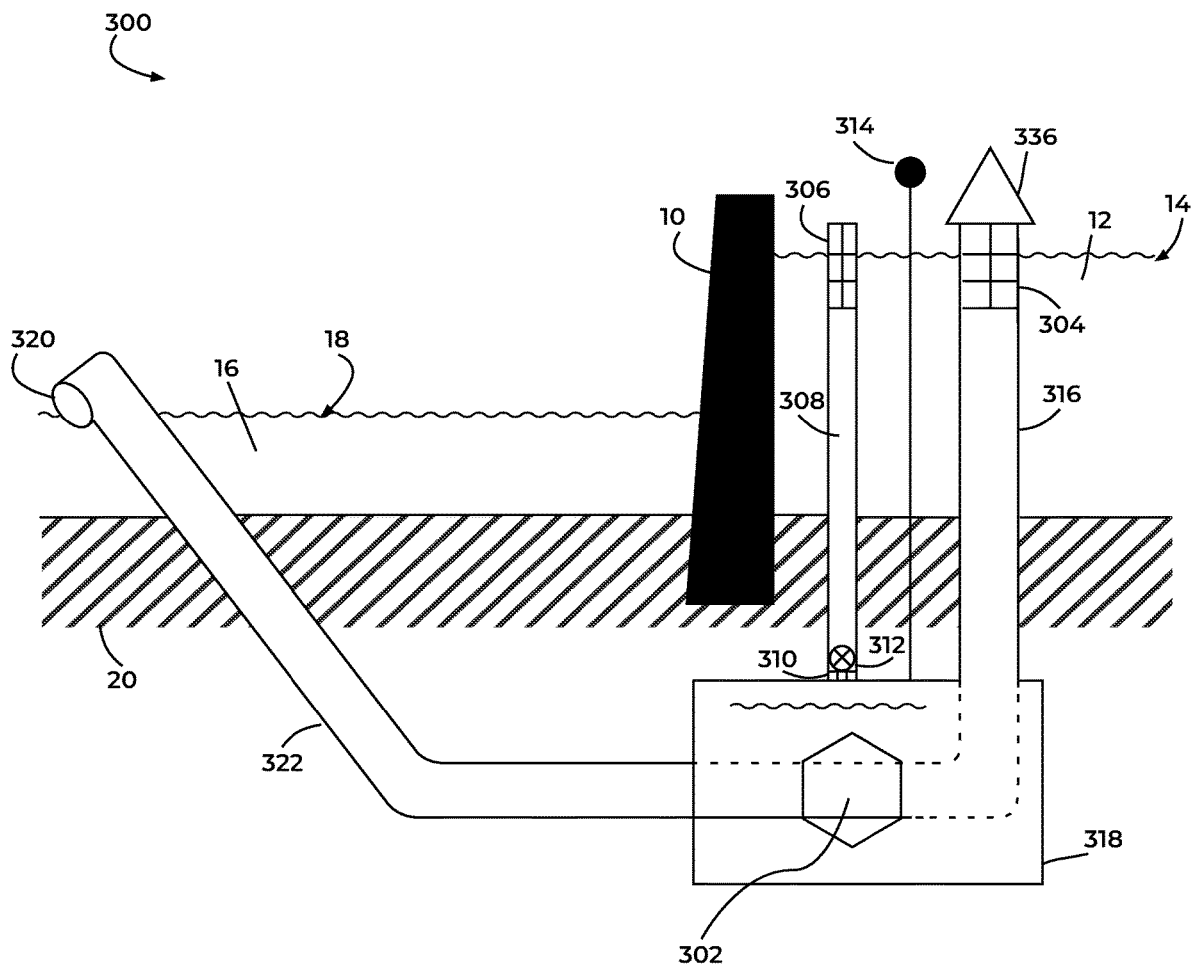
FIG. 3 is an elevation view of a third exemplary embodiment of the invented power generation system.

The exemplary embodiment shown in connection with FIG. 3 depicts a vacuum pump system that incorporates the use of air (or other gasses). This scenario uses high pressure air to evacuate lower pressure water. A system/device 336 is required to pressurize the air entering through valve 304. This example uses an air compressor 336 to compress the air entering valve 304, however, other systems can be used to compress the air entering valve 304.

Note that dams are not required for the vacuum pump system embodiments if the head of water entering through valve 304 is sufficient to operate the system. Given the same head of water enters through valves 306 and 304, that water can be evacuated into the same head of water. Additionally, whether or not a dam is used in vacuum pump systems a pumping system can be added at the point of discharge 320 to help evacuate water from the invented system.

FIG. 3 illustrates an exemplary embodiment of the method of operation for gas-type vacuum pump systems. When an air compressor 336 is used to compress air entering valve 304 the method of operation is the same as when water is entering through valve 304 with the following exceptions: (1) only compressed air enters through valve 304; (2) water from the turbine water chamber (TWC) 318 mixes with air from 316 because of the venturi effect; and (3) connecting pipe 322 carries water and air up to and out of the point of discharge 320.

When an air compressor 336 is used to compress air entering valve 304 the method of operation for an ejector system (EJ) is the same as when water is entering through valve 304 with the following exceptions: (1) only compressed air enters through valve 304; (2) water from the turbine water chamber (TWC) 318 mixes with air from 316 because of the nozzle effect; and (3) connecting pipe 322 carries water and air up to and out of the 320. The same is true for any other comparable vacuum pump systems, wherein the specific vacuum pump system applied in a given application of the invention involves a vacuum pump effect, generally. Note also that in this example water does not enter connecting pipe 316 through valve 304. Only compressed air from air compressor 336 enters through valve 304.

Since an air compressor is used in this exemplary embodiment to cause the venturi effect or the nozzle effect a dam is not strictly required, as will be evident upon the disclosure of further embodiments herein below. Water entering through valve 306 to generate power (perform work, generally) can be discharged at the system's 320 into the same head of water entering through valve 306. A dam is used to increase the pressure differential between the matter entering through valve 304 and the water inside of the (TWC) 318. A dam also allows a greater power generation.

Figure 4:
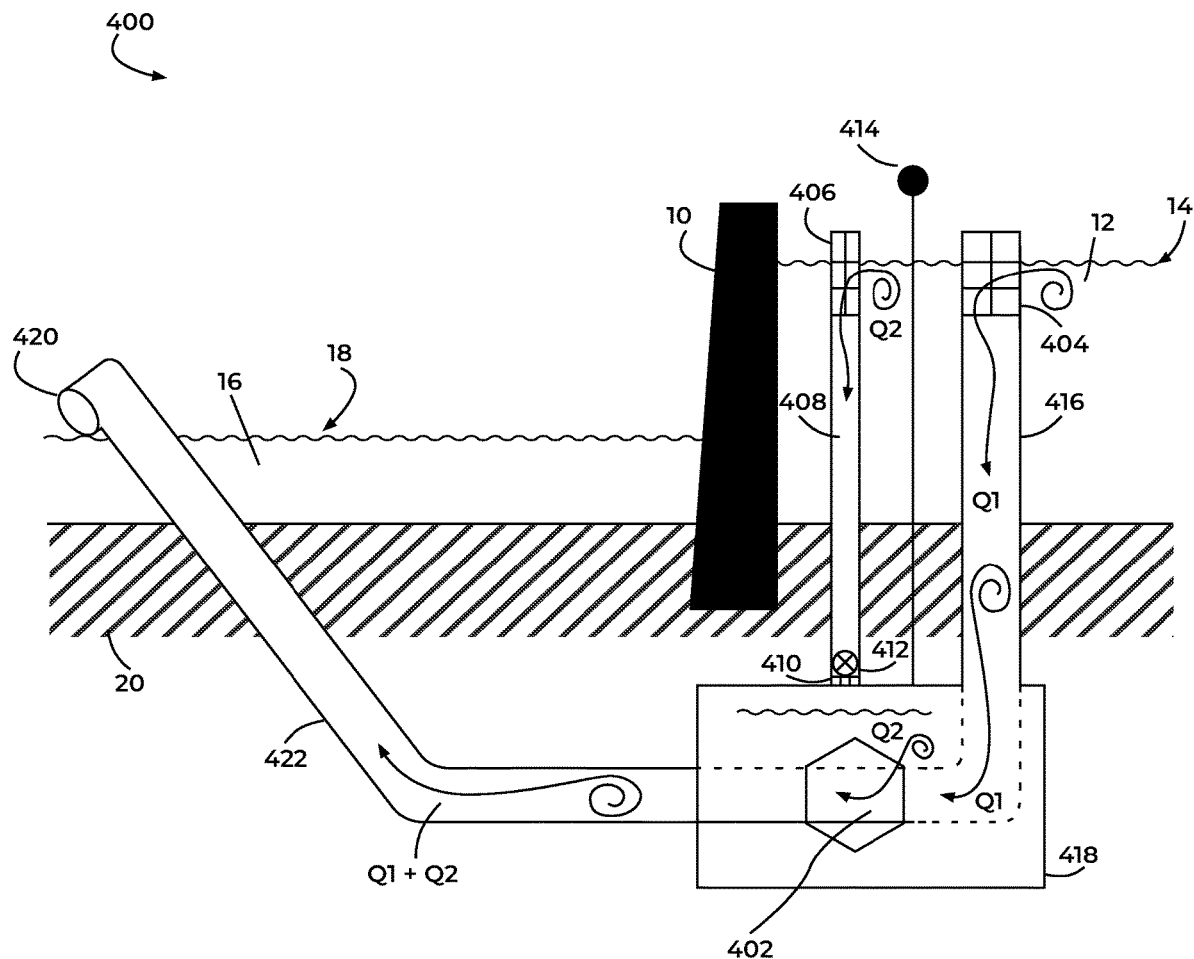
FIG. 4 is another view of the embodiment shown in connection with FIG. 3 depicting exemplary flow throughout the system.
Figure 5A:
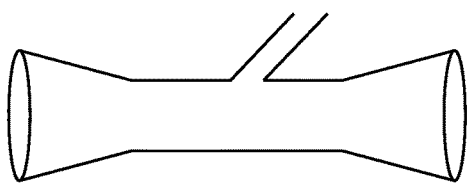
FIG. 5A illustrates an exemplary venturi design for use in connection with applications of the invented power generation system.
Figure 5B:
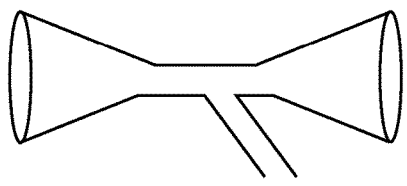
FIG. 5B illustrates an exemplary venturi design for use in connection with applications of the invented power generation system.
Figure 5C:
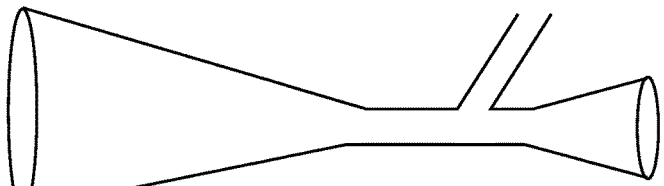
FIG. 5C illustrates an exemplary venturi design for use in connection with applications of the invented power generation system.
Figure 5D:
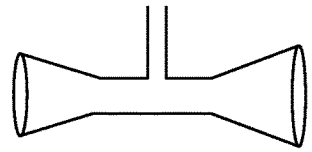
FIG. 5D illustrates an exemplary venturi design for use in connection with applications of the invented power generation system.
Figure 5E:
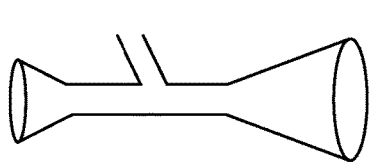
FIG. 5E illustrates an exemplary venturi design for use in connection with applications of the invented power generation system.
Figure 5F:
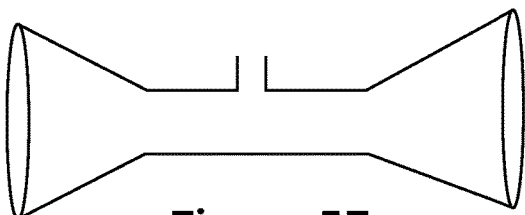
FIG. 5F illustrates an exemplary venturi design for use in connection with applications of the invented power generation system.

FIG. 4 depicts the water flow through the invented system for venturi, ejector, eductor and similar comparable systems generally as described in connection with FIGS. 1-3. FIG. 4 uses the same symbol shown in connection with FIG. 3 to represent vacuum pump systems generally at 402, such as venturi, ejector and eductor systems and the like.

Q1 represents the flow of water passing through connecting pipe 416 after it passed through valve 404. Q2 signifies the flow of water that entered through valve 406, passed through the turbine/generator system and was dropped into the turbine water chamber (TWC) 418 after generating power. Flow (Q1+Q2) indicates the flow of water after the venturi effect in a venturi system, the nozzle effect in an ejector system, or other comparable vacuum pump systems 402. Flow (Q1+Q2) illustrates the mixing of matter/water between the water in the turbine water chamber (TWC) 418 and the water that entered via valve 404.

FIG. 5 illustrates various venturi designs signifying that these design variations as with other pump systems such as but not limited to jet pumps (ejector pumps), hammer pumps, double hammer pumps, and centrifugal pumps are too numerous to describe and/or depict. In these examples—intended for illustrative purposes—FIGS. 5A, 5B, 5C and 5D illustrate angled low-pressure inlets in various configurations, as well as a variety of exemplary inlet and outlet cone widths. In some embodiments, the angle of the low-pressure inlet with respect to the horizontal may impact the efficiency of the vacuum effect and thus the overall system efficiency. FIG. 5E is an exemplary embodiment of a venturi design with a perpendicularly oriented low-pressure inlet and with a smaller relative diameter, and FIG. 5F depicts a similarly-configured perpendicular low-pressure inlet with a relatively shorter overall length, coupled with larger inlet and outlet cones.

Figure 6:
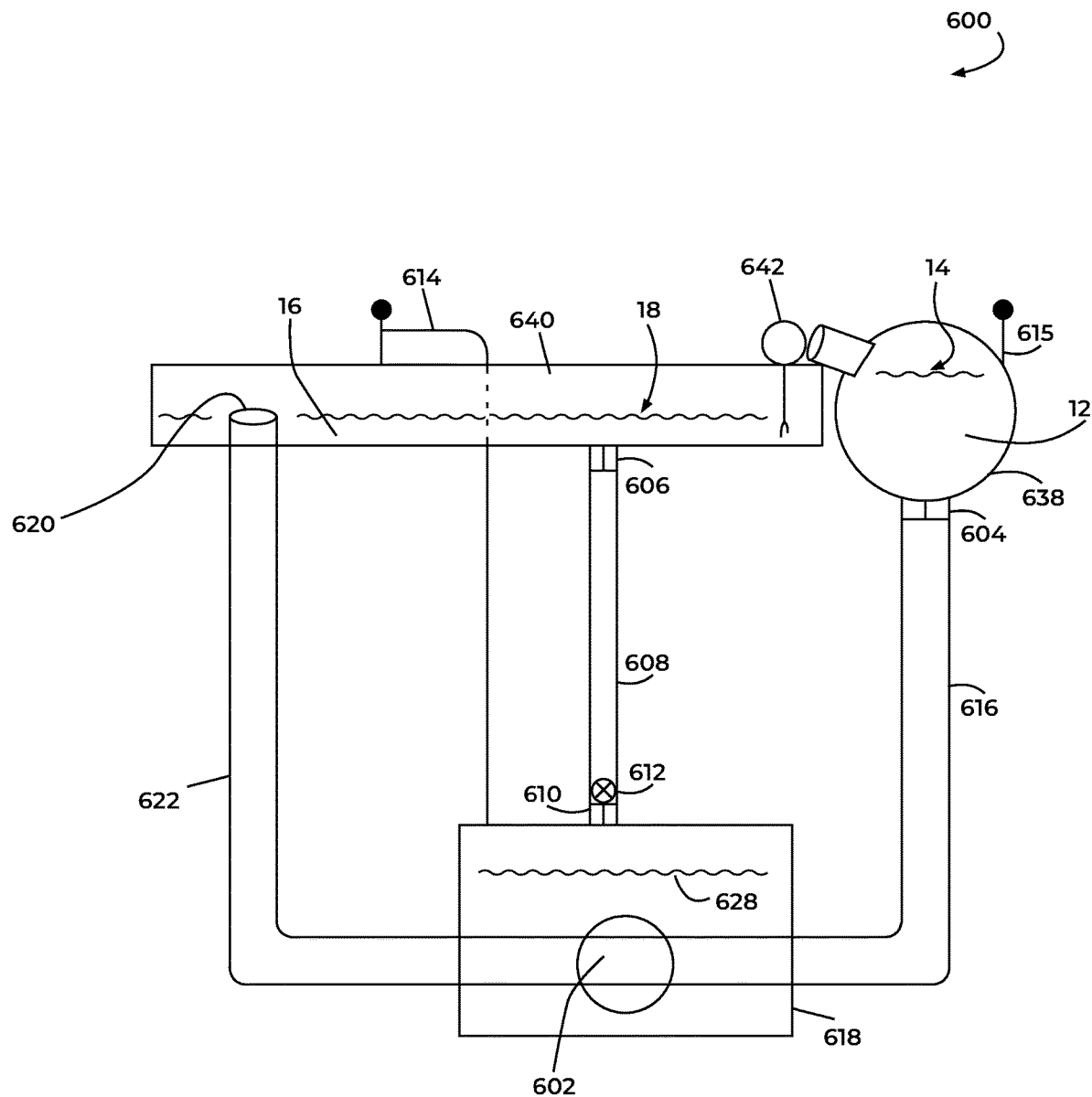
FIG. 6 is an elevation view of a fourth exemplary embodiment of the invented power generation system.

The exemplary embodiment 600 shown in connection with FIG. 6 illustrates that venturi, ejector technology and other such vacuum pump systems 602 can use a water tower 638 or similar apparatus to supply water to the invented system. This allows the invented system to be built anywhere a water tower can be built even far away from a natural source of water. Its water supply can be piped in or transported in by trucks, trains, aircraft and other forms of transportation/delivery. Theoretically, as long as it has gravity or artificial gravity, it has extraterrestrial applications, as well. This allows the invented system to be built in locations such as but not limited to: space stations, extraterrestrial colonies, (underwater/underground complexes) above ground level, below ground level, above water level, below water level, partially above and partially below ground level, as well as, partially above and partially below water level.

In operation, the exemplary embodiment shown in connection with FIG. 6 can be operated as follows: preferably, air vents 614 and 615 are open during normal plant operations. Preferably, valves 606, 610, 604 and vacuum pump valves (not shown) are open during normal system operations (a vacuum pump valve is depicted in FIG. 2 at 230 in connection with the venturi vacuum pump system). Any of those vents and valves can be opened and closed as necessary. The high head of water in this scenario is 14 located in the water tower 638. The low head of water 18 is located in the evacuation chamber 640. Since the point of discharge 620 is at or below 18, 18 becomes the low head of water.

Water from water tower 638 passes through valve 604 and enters connecting pipe 616. It travels down to venturi system 602. Water from the evacuation chamber 640 passes through valve 606 and down the penstock 608 to turbine/generator 612 where it generates power. Then that water passes through valve 610 and drops into the turbine water chamber (TWC) 618, which is vented to atmosphere by air vent system 614. Vent 614 also vents evacuation chamber 640 to atmosphere. Likewise, air vent 615 vents the water tower 638 to atmosphere. There can be an air space in the turbine water chamber (TWC) 618 between valve 610 and the water level 628 in the (TWC) 618. As water from 616 passes through venturi system 602 the venturi effect takes place and water from the (TWC) 618 passes through valve and connecting pipe and mixes with the water from 616. Connecting pipe 230 is depicted in FIG. 2 for venturi vacuum pump system embodiments. Since the column of water entering the venturi system 602 has a higher head of water than the water inside of (TWC) 618, the water from 616 has a higher pressure. The combined flow of water exiting the venturi travels up connecting pipe 622 and out of the point of discharge 620 located in the evacuation chamber 640. Pump system 642 pumps water from 640 back into the water tower 638 preferably at the same rate as the water exiting the water tower 638 through valve 604. Preferably, water from 640 drops down 608 at the same rate that water exits the (TWC) 618 through the venturi system 602. Again, valve 606 and/or valve 610 control the flow of water down the penstock 608 and valve 604 controls the flow of water entering connecting pipe 616. The amount of water entering the penstock and entering connecting pipe 616 will need to be calculated and tested by an expert in the appropriate arts to determine the desired efficiency. This holds true for all variations contained in this document.

In ejector technology systems (EJ): preferably, air vents 614 and 615 are open during normal plant operations. Preferably, valves 606, 610 and 604 are open during normal system operations. Any of those vents and valves can be opened and closed as necessary. The high head 14 of water 12 in this scenario is located in the water tower 638. The low head 18 of water 16 is located in the evacuation chamber 640. Since the point of discharge 620 is at or below 18, 18 becomes the low head of water 16.

Water 12 from water tower 638 passes through valve 604 and enters connecting pipe 616. It travels down to ejector system 602. Water 16 from the evacuation chamber 640 passes through valve 606 and down the penstock 608 to turbine/generator 612 where it generates power. Then that water passes through valve 610 and drops into the turbine water chamber (TWC) 618, which is vented to atmosphere by air vent system 614. 614 may also vent evacuation chamber 640 to atmosphere. Likewise, air vent 615 vents the water tower 638 to atmosphere. There is an air space in (TWC) 618 between valve 610 and the water level 628 in the (TWC) 618. As water from 616 passes through ejector system 602 the nozzle effect takes place and water from the (TWC) 618 mixes with the water from 616. Since the column of water entering the ejector system 602 has a higher head of water than the water inside of (TWC) 618, the water from 616 has a higher pressure. The combined flow of water exiting 602 travels up connecting pipe 622 and out of the point of discharge 620 located in the evacuation chamber 640. Pump system 642 pumps water from 640 back into the water tower 638 preferably at the same rate as the water exiting the water tower 638 through valve 604. Preferably, water from 640 drops down 608 at the same rate that water exits the (TWC) 618 through the ejector system 602. Again, valve 606 and/or valve 610 control the flow of water down 608 and valve 604 controls the flow of water entering connecting pipe 616.

Note that if necessary, a valve can be added to the ejector system 602 to control the flow of water between it and the turbine water chamber (TWC) 618.

Figure 7:
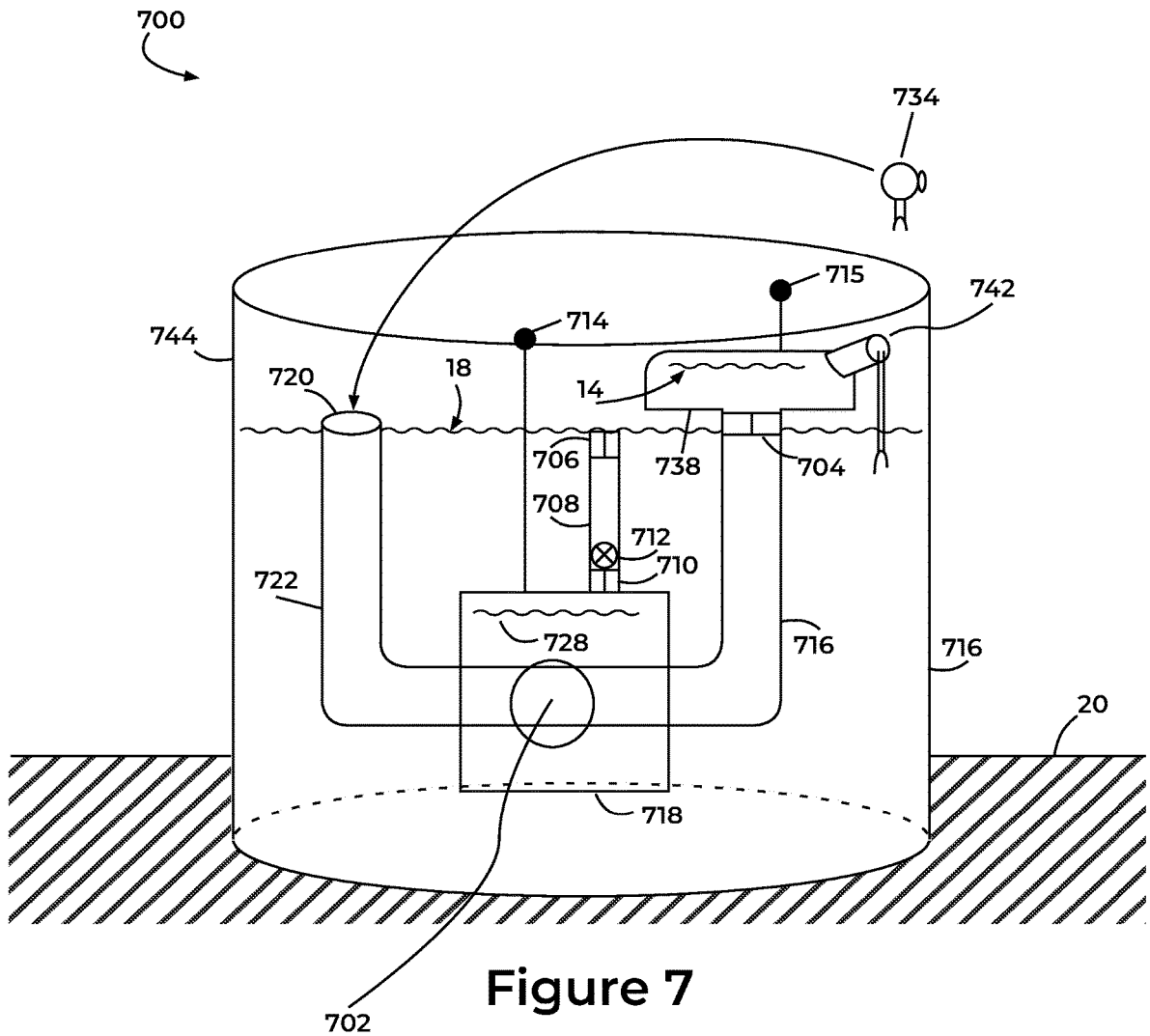
FIG. 7 is an elevation view of a fifth exemplary embodiment of the invented power generation system.

The embodiment 700 shown in connection with FIG. 7 illustrates that any system can be placed in a tank, reservoir or container system 744. This allows the power plant to operate in places like but not limited to above ground 20, below ground and below water. This embodiment also illustrates that a water tower/container 738 can provide the high head of water 14. Optionally, a pump system 734 can be added to the point of discharge 720 if necessary, desired or appropriate for a given application.

Figure 8:
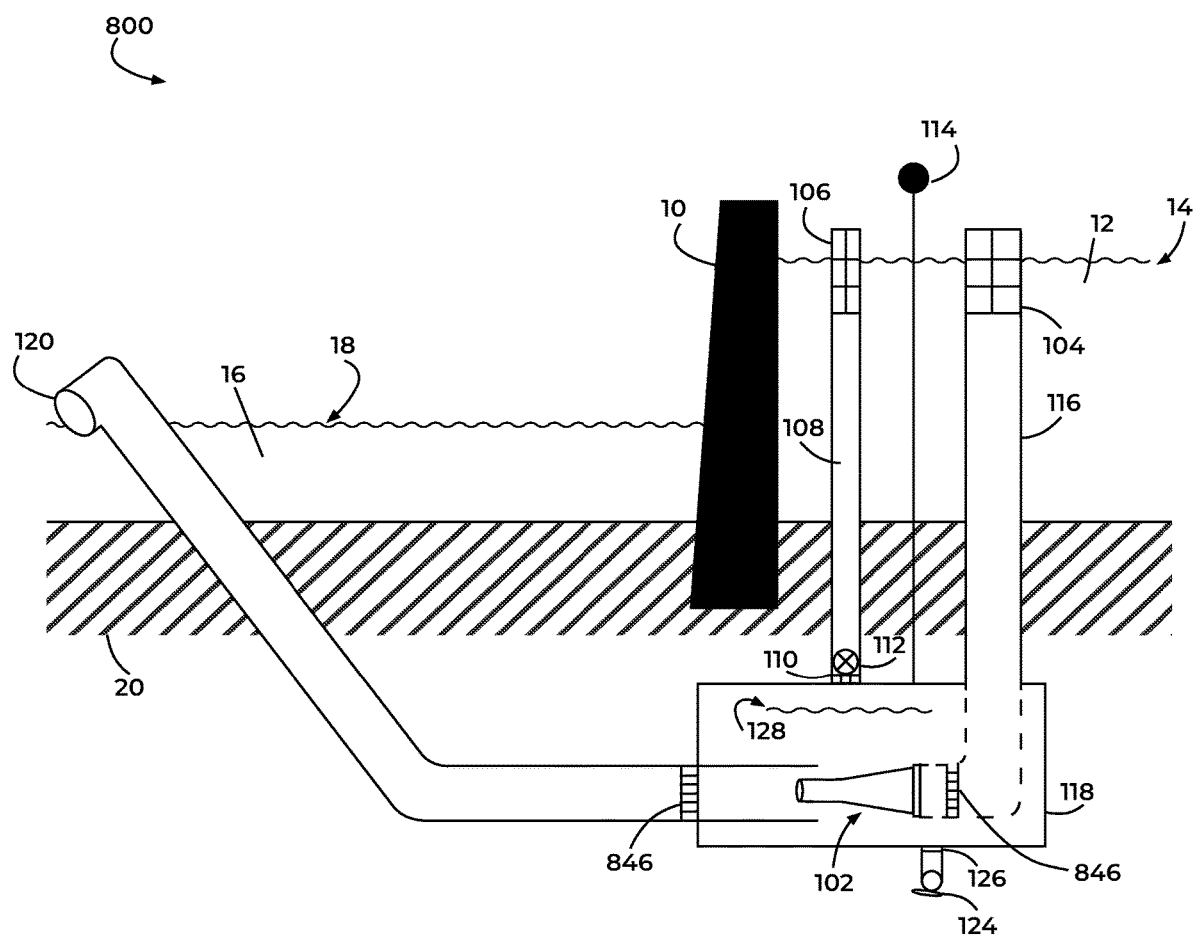
FIG. 8 is an elevation view of a sixth exemplary embodiment of the invented power generation system.

The embodiment 800 shown in connection with FIG. 8 is similar to the embodiment 100 shown in connection with FIG. 1, with the exception that it includes an optional exemplary mixing chamber valve system 846 to prevent water in connecting pipe 116 backing up into the turbine water chamber (TWC) 118 when the power plant 800 is not in operation. Valve 126 can be opened and closed as necessary to allow pump system 124 to evacuate water for the (TWC) 118 as needed.

Figure 9:
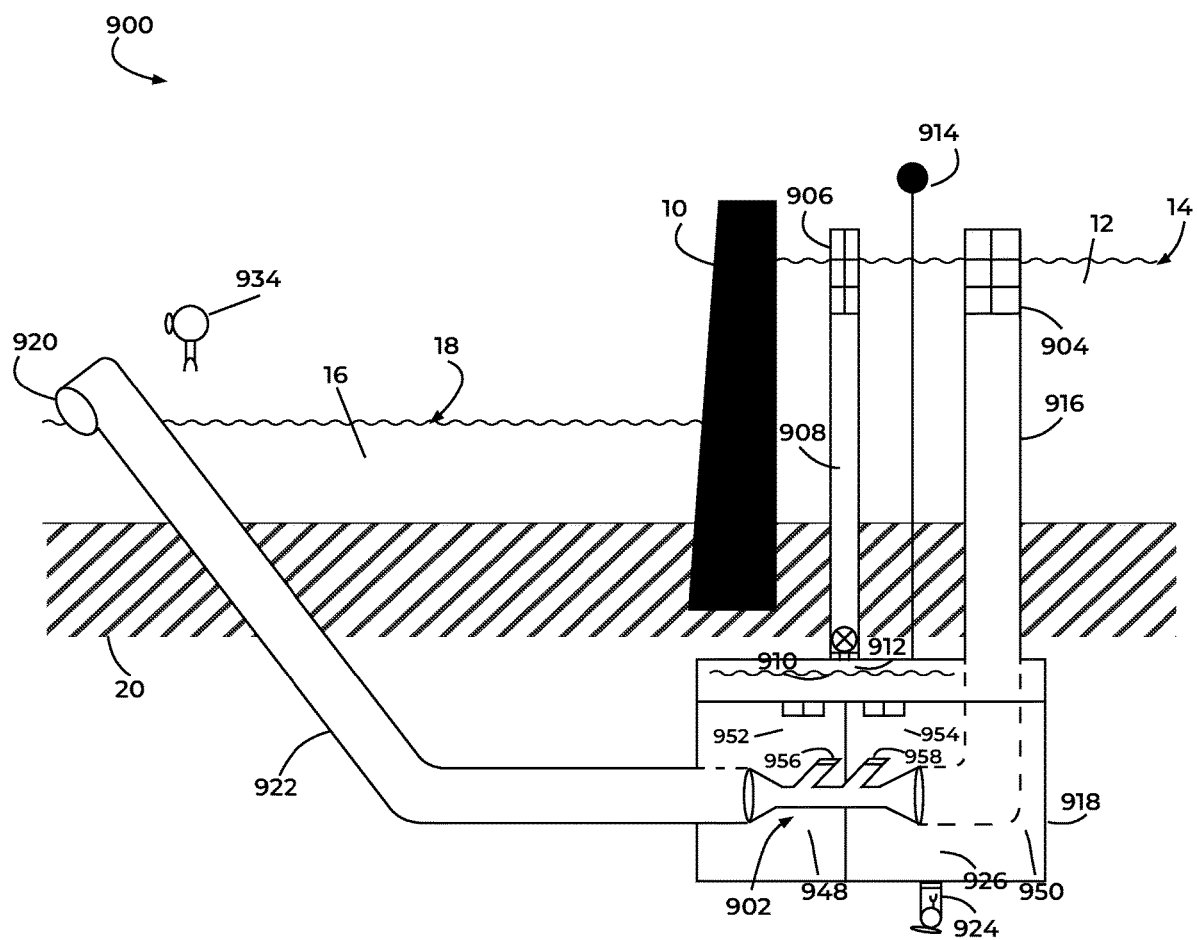
FIG. 9 is an elevation view of a seventh exemplary embodiment of the invented power generation system.

FIG. 9 depicts an embodiment 900 of the invented power generation system wherein the water entering the venturi system 902 does not need to be vented to atmosphere. However, if desired or necessary they can be by adding an air vent to 948 and 950. FIG. 9 shows how to achieve continual power generation if you wish to supply water from the turbine water chamber 918 via segregated turbine water chamber compartments 948 and 950. 948 and 950 are not directly vented to atmosphere in this embodiment.

This embodiment also illustrates that there can be more than one turbine water chamber compartments supplying water to the vacuum pump system 902. Although the (TWC) 918 is vented to atmosphere by air vent 914 both 948 and 950 are not vented to atmosphere in this scenario. As 950 is being refilled with water from the penstock via valve 954, 948 is supplying water to the venturi via valve 952. Valve 952 is closed when valve 956 is open and valve 954 is closed when valve 958 is opened. This shows how to operate this variation of the invented system with little if any intermittent power generation.

Figure 10:
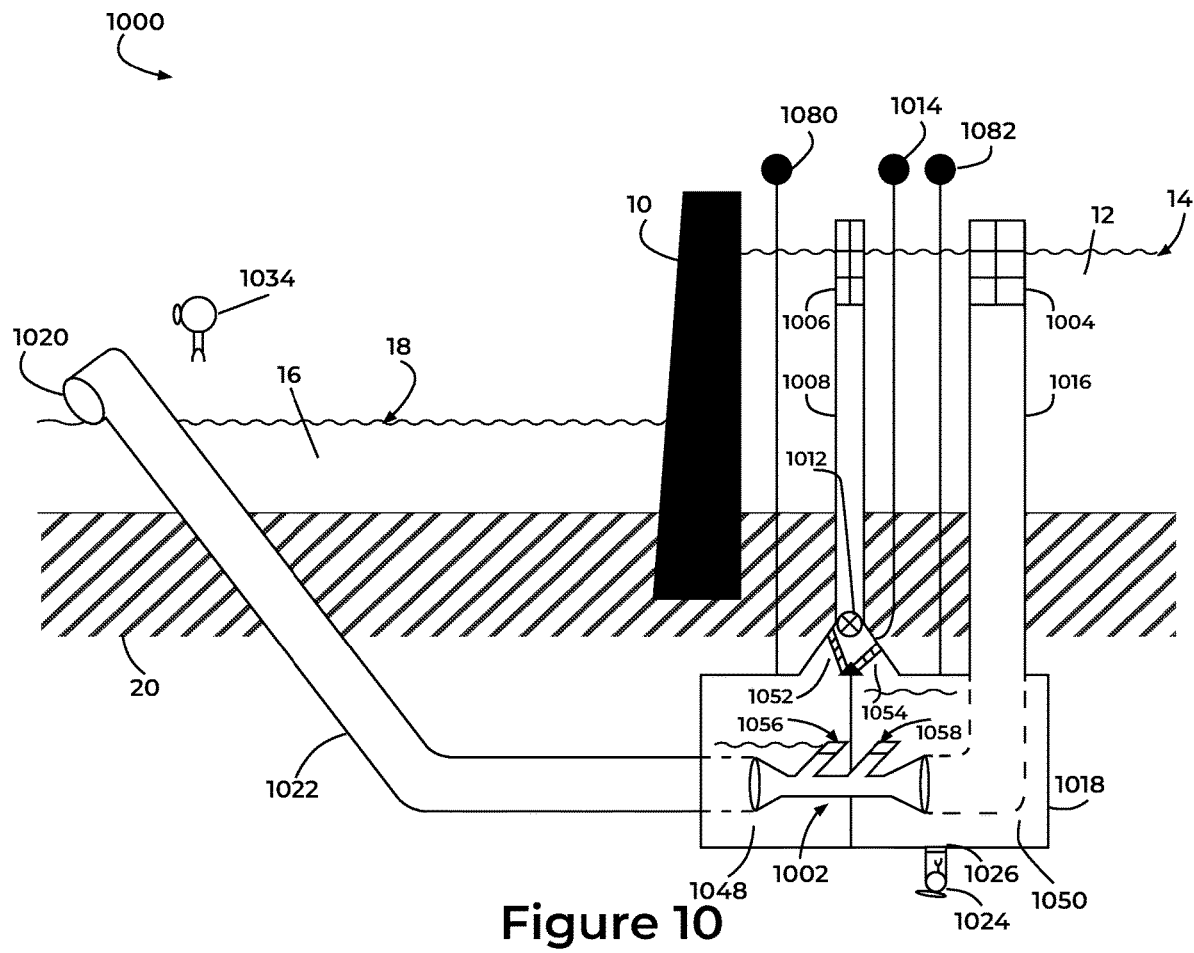
FIG. 10 is an elevation view of an eighth exemplary embodiment of the invented power generation system.

FIG. 10 depicts an embodiment 1000 that is a modified example for FIG. 9. The difference between FIGS. 10 and 9 is that the embodiment 1000 shown in FIG. 10 has added an air vent to both 1048 and to 1050. Thus, if you want to send water vented to atmosphere into the venturi from 1050, then air vent 1062 is open. If you want to send water that is not vented to atmosphere from 1050 into the vacuum pump system, then air vent 1062 is closed. The same relationship applies between 1048 and 1060. In any event the (TWC) 1018 preferably is vented to atmosphere during normal operation via air vent 1014. Whether or not water from the turbine 1048 and 1050 is vented to atmosphere or not vented to atmosphere can be decided by an expert in the appropriate arts for particular applications.

Figure 11:
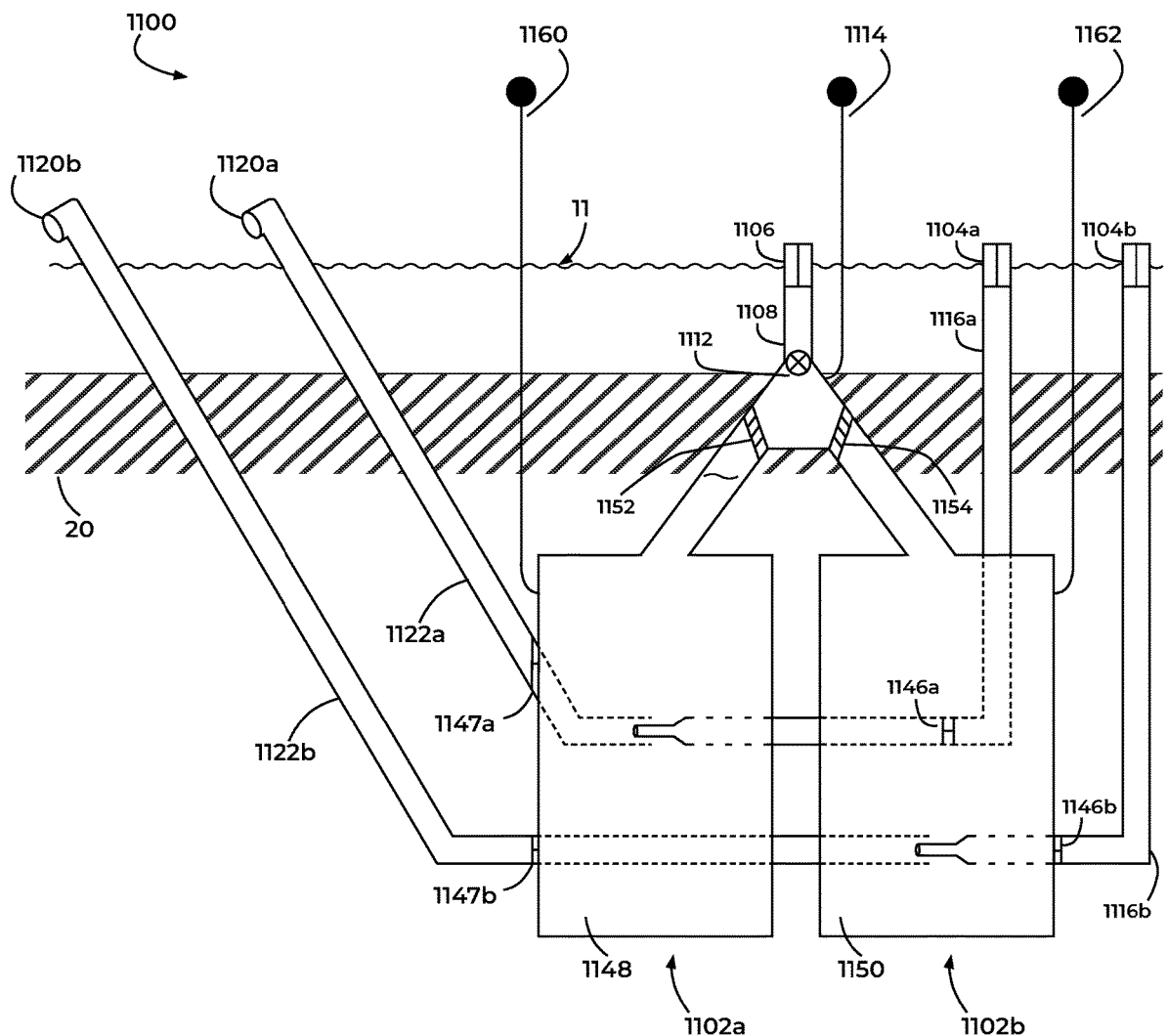
FIG. 11 is an elevation view of a ninth exemplary embodiment of the invented power generation system.

The exemplary embodiment 1100 shown in connection with FIG. 11 shows that two or more ejector systems 1102a and 1102b can be employed in an application of the invention. This model has separate ejector systems 1102a and 1102b being supplied with water from the same penstock 1108. The systems can be designed to alternate evacuating water or run concurrently. If they run concurrently then valves 1152 and 1154 are left open and valves 1147a, 1146a, 1147b and 1146b are left open. Then the valves associated with chamber 1148 and 1150 can alternate opening and closing.

This example further shows that the penstock 1108, the connecting pipes 1116a and 1116b supplying water to the ejector vacuum pump systems 1102a and 1102b, respectively, and the point of discharge 1120a and 1120b can have the same head of water 11. Preferably, the water being supplied to valves 1104a and 1104b is moving (like but not limited to water from a river, stream or canal system). If desired or necessary, then a dam system or water tower system can be added to increase the head of water supplying water to 1104a and 1104b. This would increase the pressure differential between the water entering through intake valves 1104a and 1104b and the points of discharge 1120a and 1120b. The examples in FIGS. 1, 6 and 8 show variations between the water levels among the water entering connecting pipe and the point of discharge, generally.

Figure 12:
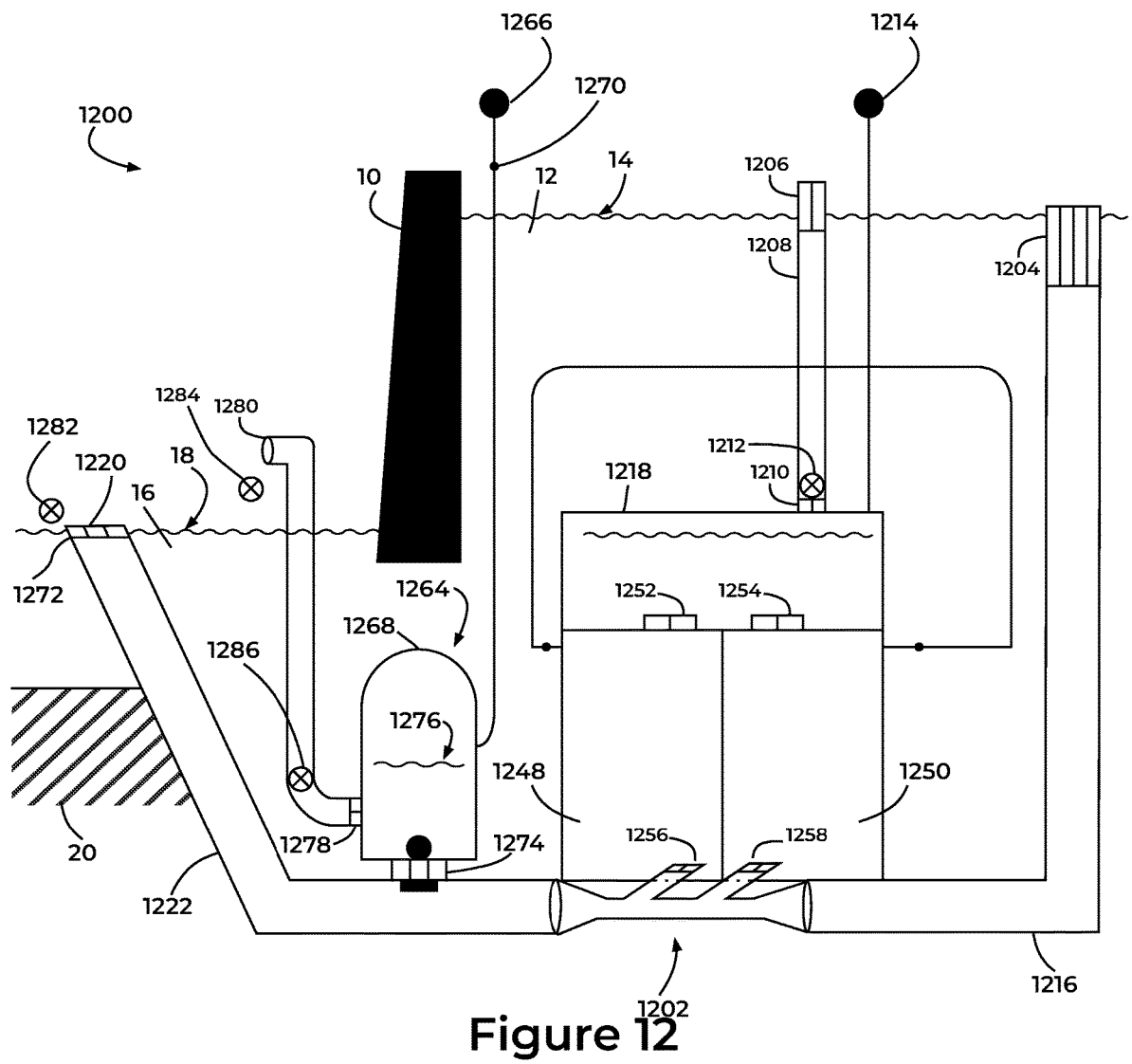
FIG. 12 is an elevation view of a tenth exemplary embodiment of the invented power generation system.

The exemplary embodiment 1200 shown in connection with FIG. 12 uses a Hammer Pump component 1264. Hammer Pump (also known as Ram Pumps) variations can also be used to evacuate water from the invented system. Hammer pumps operate differently from venturi and ejector pumps (note that ejector pumps are also called "jet pumps"). This exemplary embodiment also has two evacuation chambers, 1248 and 1250. They can be filled at the same time, afterwards then be emptied at the same time. However, this example has the two evacuation chambers alternating being filled and evacuated. Thus as chamber 1250 is being filled with water from the turbine water chamber (TWC) 1218 via valve 1254 the other chamber 1248 is being evacuated of its water content via valve 1256. Having two or more evacuation chambers alternating being filled and emptied allows for a continuous power generation.

Air compressor 1266 pumps air into the hammer bell 1268. After the desired amount of air is pumped into 1268 valve 1270 is closed and the air compressor/air pump 1266 is shut off. Valve 1254 is opened to fill evacuation chamber 1250 with water from (TWC) 1218. Then it is closed. Preferably Valves 1206, 1204 and 1210 are open during normal plant operation. Air vent 1214 is open during normal plant operation.

High pressure water from water level 14 enters connecting pipe 1216 and travels through that connecting pipe to valve 1272. Valves 1272 and 1274 can be pressure operated, mechanically operated using springs and/or weights or electronically opened and closed. This scenario has them being operated using electronics. Meters can determine when those valves open and close.

This scenario has 1250 being filled with water from (TWC) 1218 via open valve 1254 while the other chamber's 1248 water content is being evacuated into the venturi via open valve 1256. High pressure water from the high head of water 14 entering valve 1204 enters the venturi system 1202 and mixes with water from 1248 and continues up connecting pipe 1222 to valve 1272 causing the "hammer effect". When the pressure is sufficient valve 1274 opens allowing the high-pressure water to enter chamber 1268. The air in 1268 becomes pressurized as water from 1222 enters 1268 and causes its water level 1276 to rise. Valve 1278 preferably remains open during normal plant operation but can be opened and closed as necessary. When the air pressure in 1268 is sufficient the water in 1268 travels up a connecting pipe and is discharged into the low head of water 18 at the point of discharge 1280. Valves 1274, 1256 and 1254 are closed after the desired amount of water has been evacuated and valve 1272 can be opened to reset the hammer effect. Then 1272 is closed.

Valves 1252 and 1258 are opened allowing chambers 1248 and 1250 to alternate duties. Now 1248 is being filled with water from (TWC) 1218 while water from 1250 is being evacuated via valve 1258 into the venturi system 1202.

This scenario only uses one chamber 1248 to operate the hammer effect. 1250 is not used in this example to demonstrate how a one chamber evacuation chamber like but not limited to 1248 can be used to evacuate water from the invented system using the "hammer effect". Valve 1252 is left open and 1256 is left open. High pressure water entering through valve 1204 enters the venturi 1202 and draws water out from 1248 via valve 1256 on account of the venturi effect "vacuum". The mix of water from 1216 and 1248 travels up 1222 to 1272 creating the "hammer effect". When the pressure is sufficient valve 1274 opens allowing the high-pressure water to enter chamber 1268. The air in 1268 becomes pressurized as water from 1222 enters 1268 and causes its water level 1276 to rise. Valve 1278 preferably remains open during normal plant operation but can be opened and closed as necessary. When the air pressure in 1268 is sufficient the water in 1268 travels up a connecting pipe and is discharged into the low head of water 18 at the point of discharge 1280. Valve 1272 opens after the pressure drop in 1268 and 1274 and 1272 are closed to reset the hammer.

Auxiliary turbines like but not limited to 1282, 1284 and 1286 can be added for additional power generation, if desired. 1282 and 1284 preferably are positioned so they do not interfere with the water being discharged from the system.

Figure 13:
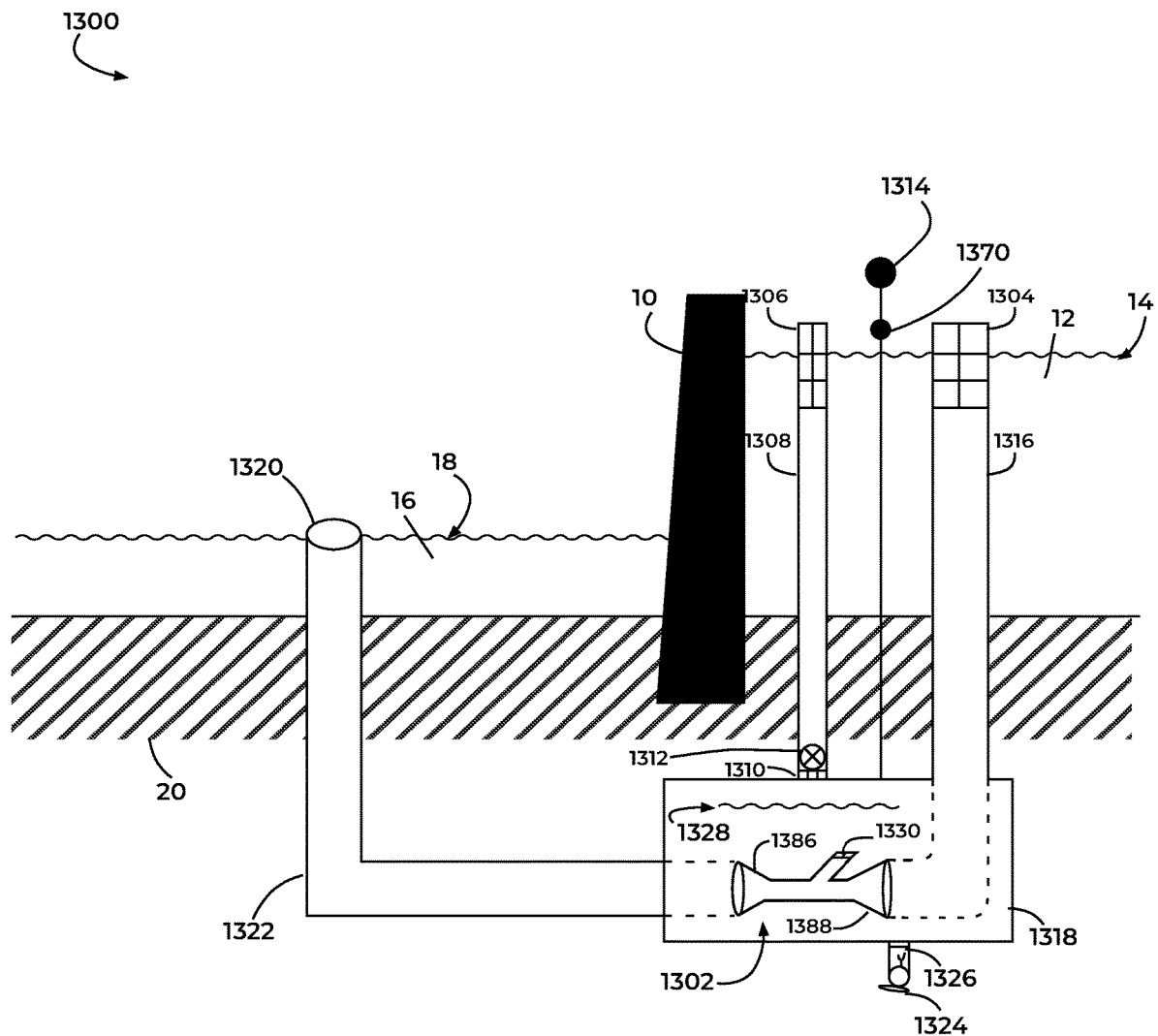
FIG. 13 is an elevation view of an eleventh exemplary embodiment of the invented power generation system.

With regard to the variability of various exemplary embodiments of the invention, turning to FIG. 13, the outlet or divergent cone of the venturi 1386 is shown with a relatively smaller diameter with respect to other embodiments, and relative to the inlet or convergent cone of the venturi 1388. This is provided as an illustrative example of the wide range of design choices that may be made in a given application and is not necessarily considered to be a preferred exemplary embodiment of a design. Those skilled in the art will appreciate that these components may be configured for a given application, flow rate, and pressure profiles of the environment to which the invention is being applied and is not considered to be particularly limiting in respect to the scope of the claimed invention. In this embodiment 1300, the cone sizes and desired flow rates dictate a larger diameter for the connecting pipe inlet 1316 than that of the discharge connecting pipe 1322, wherein the point of discharge 1320 is at or below the low water level head 18. This point 1320 can also be above this level, if desired.

Note that valve 1370 can be open to vent the turbine water chamber (TWC) 1318 to atmosphere. If 1370 is closed, then the turbine water chamber (TWC) 1318 is not vented to atmosphere. Valve 1370 can be opened and closed as necessary. The turbine water chamber (TWC) 1318 can have an air space between its water level 1328 and valve 1310, or it can be filled with water and not have an air space.

The types of vacuum pump systems (such as but not limited to jet/ejector pumps, venturi systems, eductor systems, hammer pumps, double hammer pumps, and centrifugal pumps) that can be used in the disclosed systems are too numerous to list and their various designs for each type of pump system are too numerous to describe. The main purpose of the pumps is disclosed thoroughly herein, and it is expected that comparable replacements may be substituted by those skilled in the art without departing from the scope of the invention herein.

Also seen in FIG. 13 is the penstock 1308 positioned on the high head 14 side of the dam 10. However, it can also be placed on the low head 18 side of the dam 10 if desired.

Figure 14:
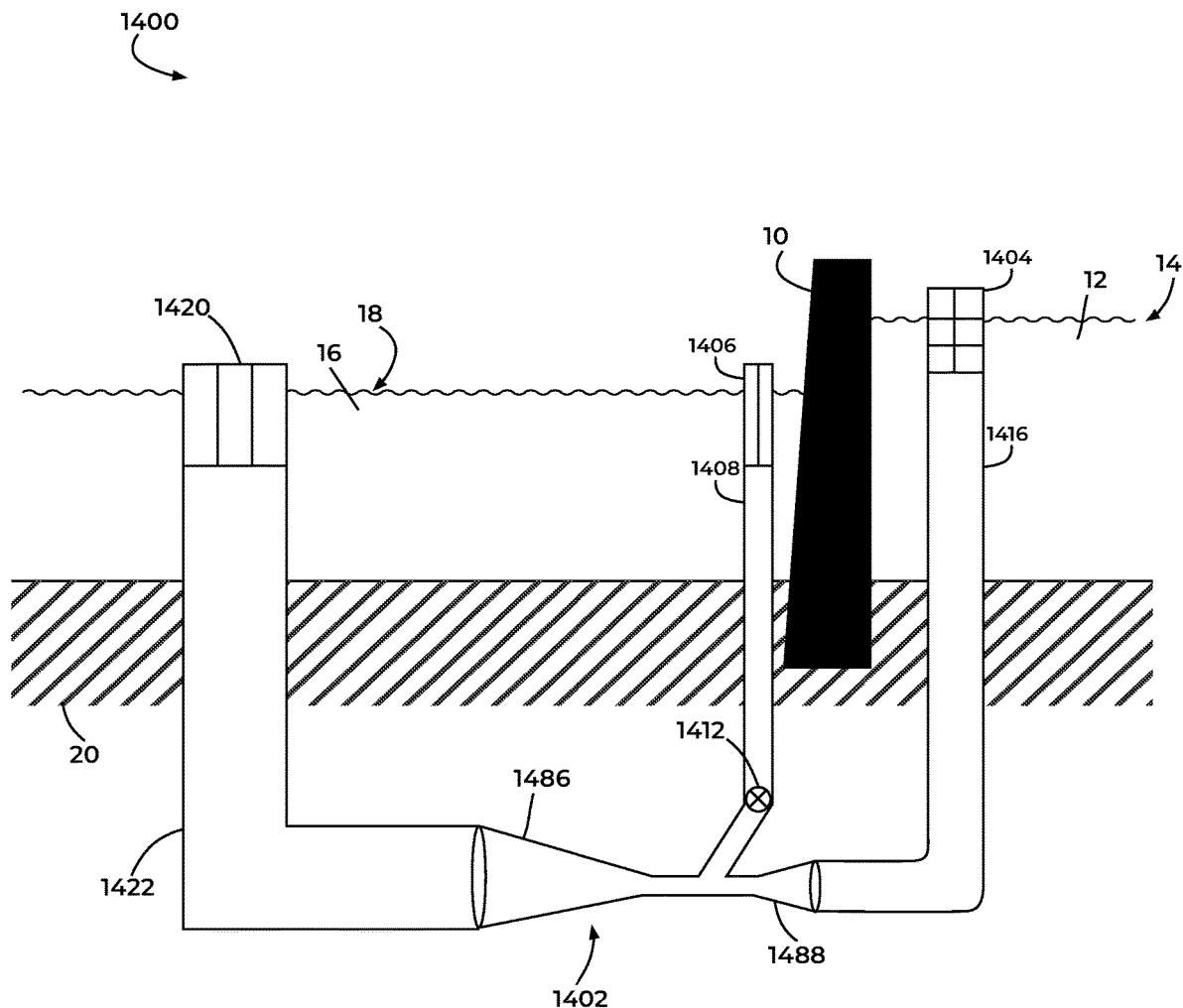
FIG. 14 is an elevation view of a twelfth exemplary embodiment of the invented power generation system.

In FIG. 14, an exemplary embodiment 1400 of the invention is shown wherein the penstock 1408 is connected directly to the venturi 1402 (i.e., there is no turbine water chamber (TWC) in this embodiment). This figure also illustrates a different design variation of a venturi for exemplary purposes. The diameter of the venturi system's 1402 inlet cone 1488 is smaller than its outlet cone 1486. Also, the outlet cone 1486 is longer than the front inlet cone 1488. The possible design variations for all the possible pumps that can be used such as but not limited to: venturi systems, jet pumps, hammer, double hammer pumps and centrifugal pumps are too numerous to describe. In the case of a venturi system, a typical configuration will see the inlet cone having a steeper cone angle than the outlet cone, but those skilled in the art will appreciate the selection will be based upon environmental and outcome-based design details for a given application.

Also illustrated in FIG. 14 is the different design of an outlet connecting pipe 1422. Its 1422 diameter is relatively larger than in other examples and bends upward at about a 90-degree angle. Its point of discharge 1420 is lower to maximize efficiency. However, its bend can be at various angles and the point of discharge 1420 can be positioned at various locations above the outlet cone 1486, at or below the low water head 18.

Figure 15:
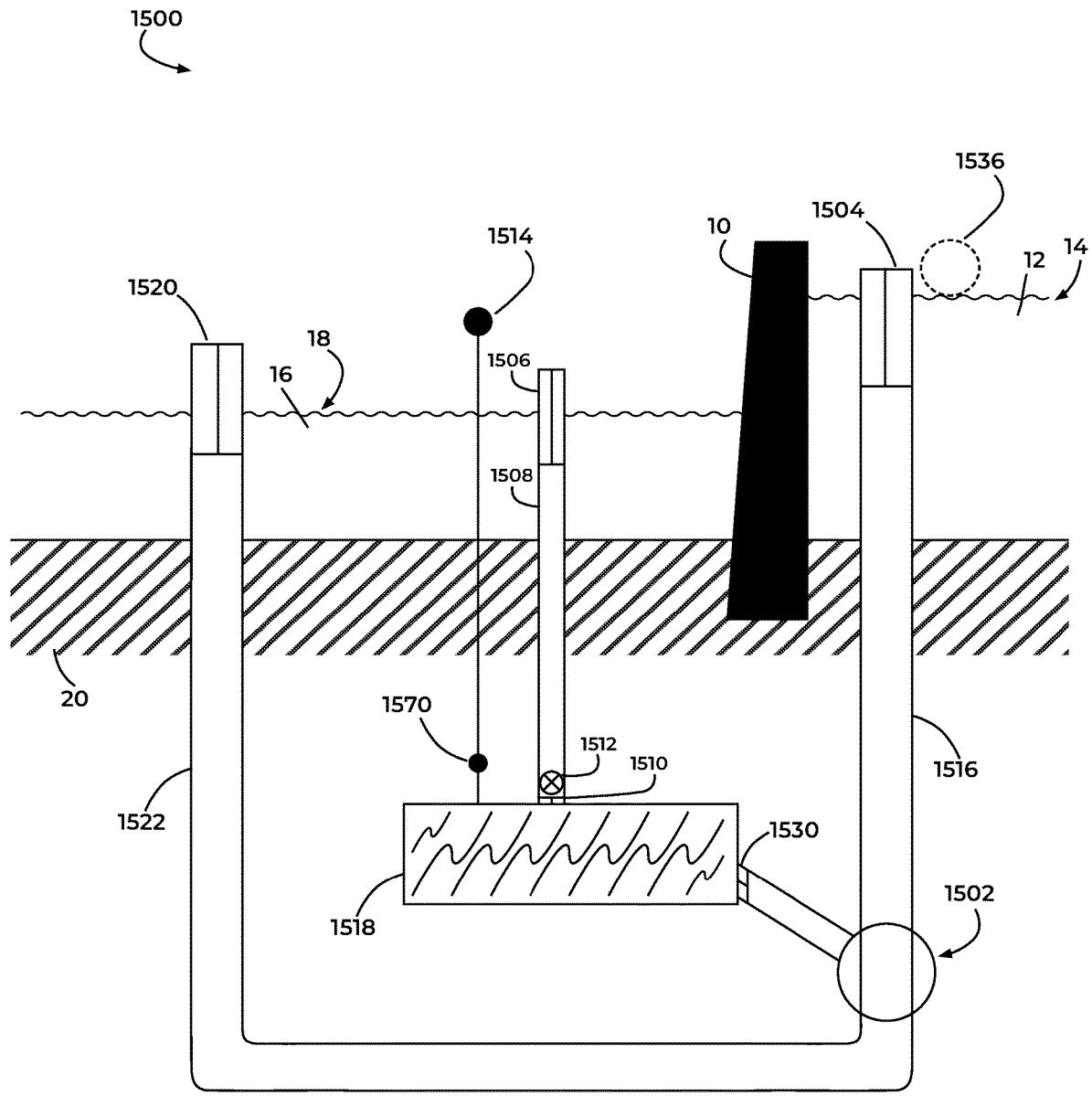
FIG. 15 is an elevation view of a thirteenth exemplary embodiment of the invented power generation system.

In FIG. 15, the turbine water chamber (TWC) 1518 is filled with a liquid or solution like but not limited to water. There is no air space in the (TWC) 1518 for this exemplary embodiment 1500. However, if desired an air space can be used, as depicted in other exemplary embodiments. Here, the turbine water chamber air vent valve 1570 can be opened or closed. This allows the turbine water chamber (TWC) 1518 to be open to atmosphere or closed to atmosphere as desired.

Also depicted in FIG. 15 is a modification of the design of connecting pipe 1516 leading to the point of discharge 1520. This variation on the configuration is illustrative of the variety of spatial/dimensional characteristic options, wherein its bends can be at various angles/curves. Additionally, the point of discharge 1520 can be positioned at various locations above, at or below the low water head 18.

If desired, an air compressor 1536 can be added to force compressed (GAS) like but not limited to air down connecting pipe 1516 to operate the venturi 1502 or another vacuum pump system generally. Furthermore, any suitable pump system, like but not limited to a venturi tube, a jet pump, a hammer pump, a double hammer pump and/or a centrifugal pump, can be used to move water through the system and to evacuate water from the system. This includes moving water that passed through turbine 1512 into connecting pipe 1502 allowing it to be evacuated from the system at the point of discharge 1520 or reused.

Figure 16:
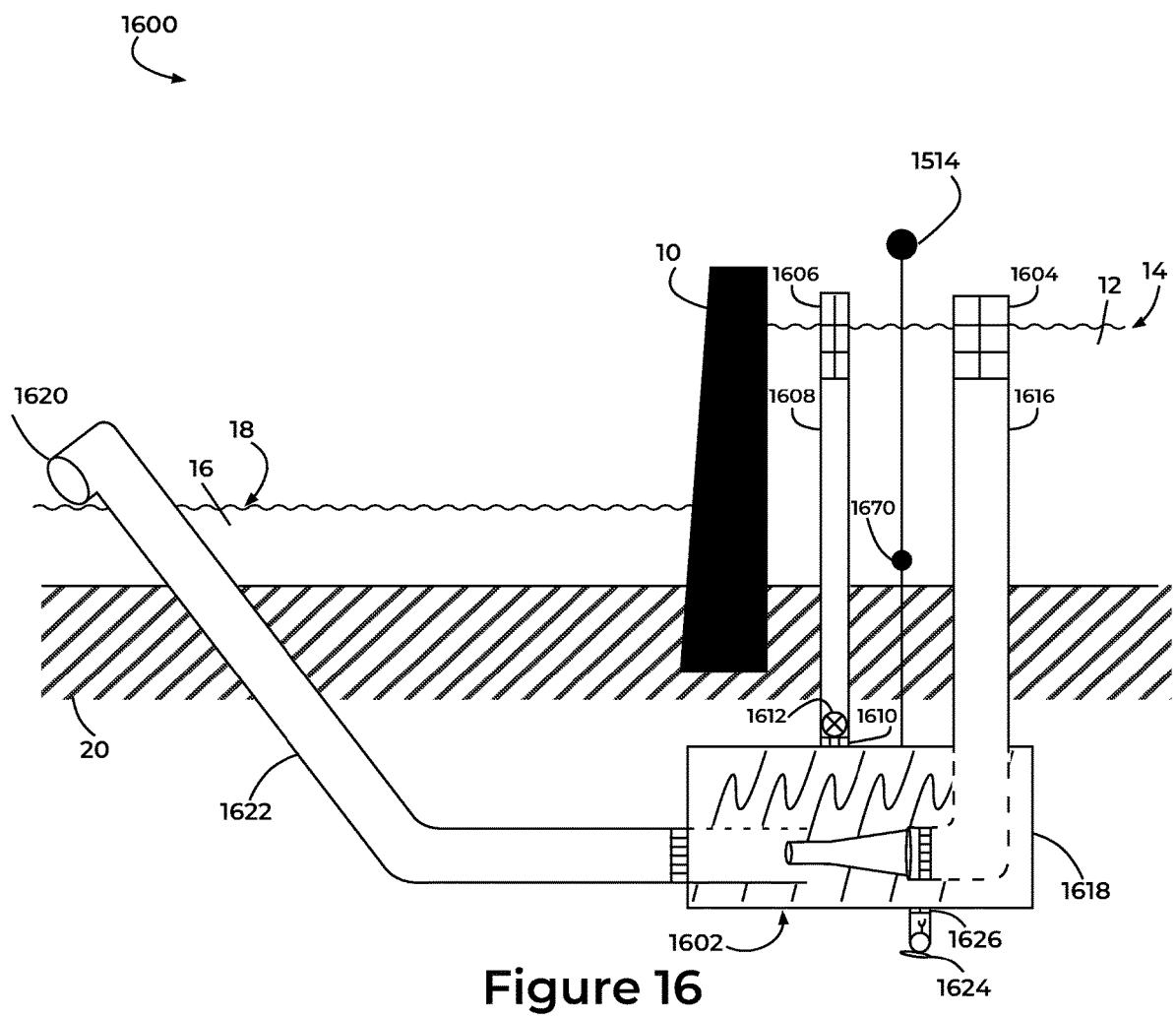
FIG. 16 is an elevation view of a fourteenth exemplary embodiment of the invented power generation system.

In the exemplary embodiment 1600 shown in connection with FIG. 16, the turbine water chamber (TWC) 1618 also has no air space. The (TWC) 1618 is filled with a liquid/solution like but not limited to water. Air vent valve 1670 can be opened and closed as desired to vent the turbine water chamber (TWC) 1618 to atmosphere or to close it from atmosphere. If desired, an air space (not shown) may also be provided in the turbine water chamber (TWC) 1618. In this exemplary embodiment, the penstock 1608 is designed to be on the high head 18 side of the dam 10 but may alternatively be placed on the low head 18 side of the dam.

Figure 17:
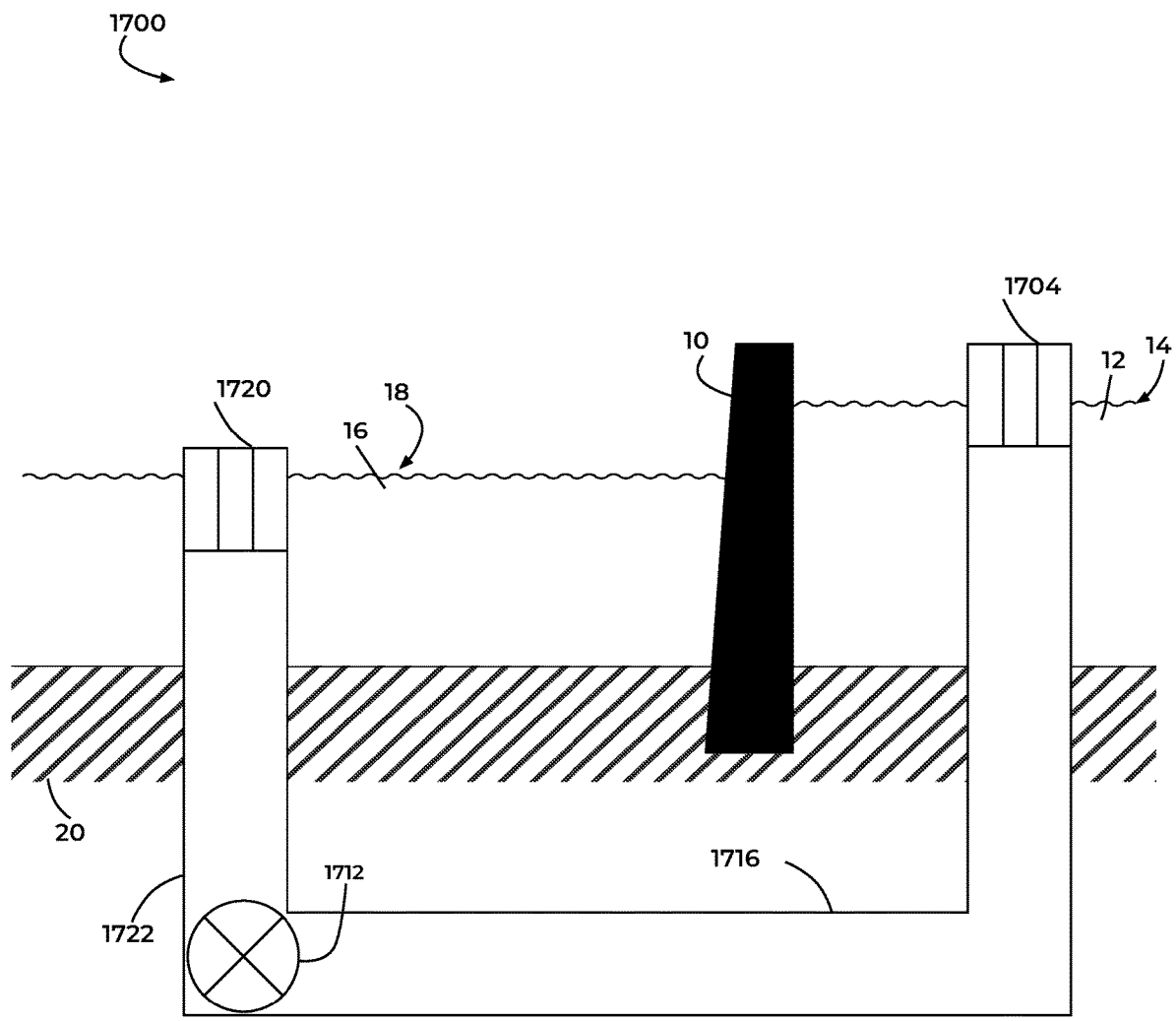
FIG. 17 is an elevation view of a fifteenth exemplary embodiment of the invented power generation system.

The exemplary embodiment shown in connection with FIG. 17 has a turbine/generator system 1712 placed directly/indirectly in connecting pipe 1716/1722 to generate electricity.

Figure 18:
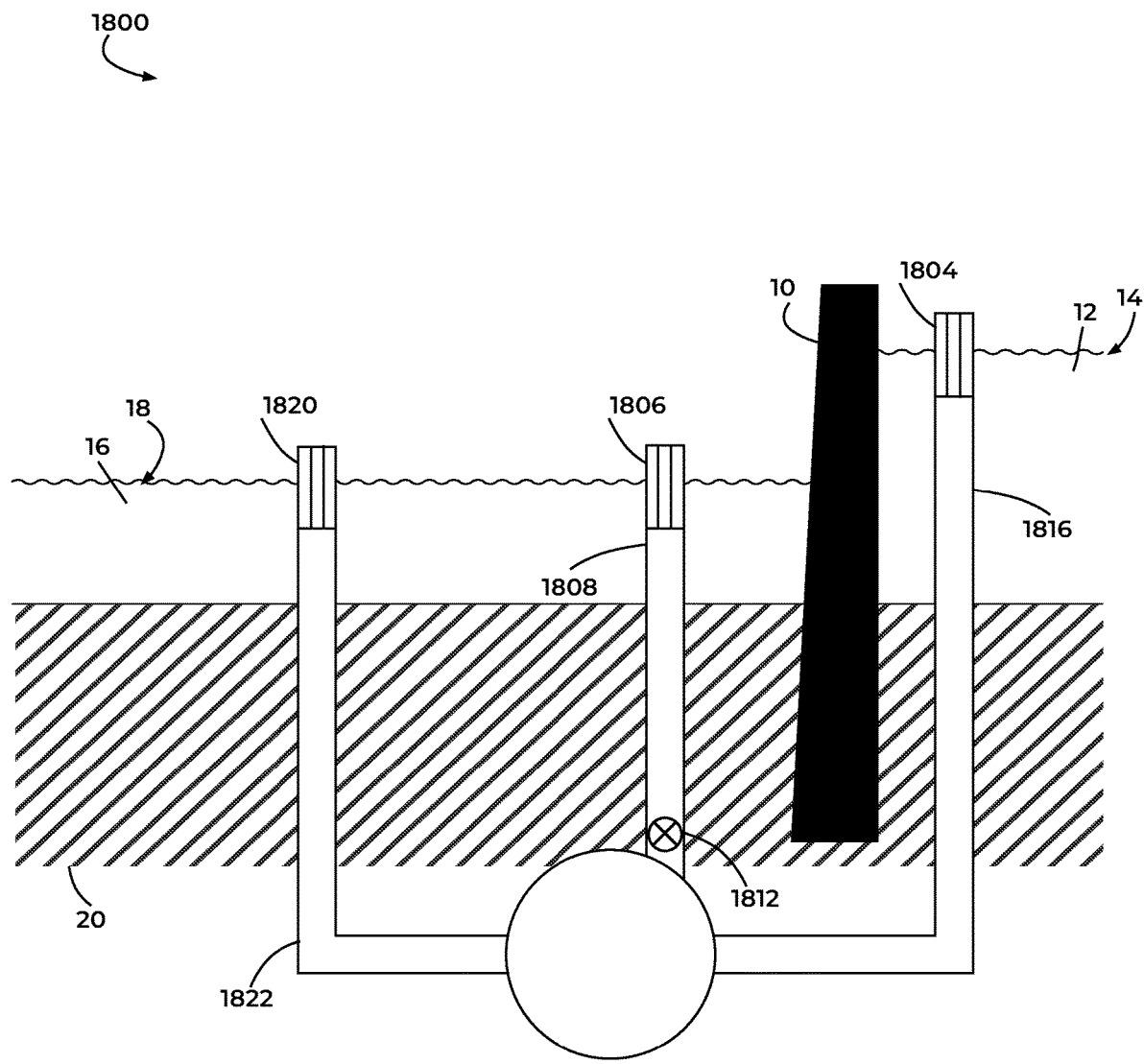
FIG. 18 is an elevation view of a sixteenth exemplary embodiment of the invented power generation system.

The exemplary embodiment 1800 shown in connection with FIG. 18 uses a general indicator (a circle) to represent all of the possible vacuum pump systems 1802 like but not limited to venturi systems, jet pumps (ejector pumps), hammer pumps, double hammer pumps and centrifugal pumps, that can be used to move water through the power plant and to evacuate water from the power plant. This includes moving water that passed through turbine/generator 1812 into discharging connecting pipe 1822 allowing it to be evacuated from the system at the point of discharge 1820 or reused.

In this embodiment, the system has no turbine water chamber (TWC). The penstock 1808 feeds directly into the evacuation system 1802, which can have several different kinds of systems that will work such as but not limited to: a venturi, a jet pump/ejector system, a hammer pump, a double hammer pump and/or a centrifugal pump. The system that is ultimately employed in a given application will be calculated and tested by a skilled artisan in order to determine which type is best suited for the desired outcome.

Similarly, the design specifications of the penstock 1808 in characteristics such as diameter and length are too numerous to describe exhaustively herein but will be readily available in a particular application as applied by a skilled artisan. The invented enhanced hydroelectric power generator can be designed to have its penstock 1808 receive its supply of water from sources such as but not limited to: the low water head 18, the high-water head 14, a water tower, and/or any other suitable source. Here, the penstock 1808 is shown drawing working fluid from the low water head 18.

Figure 19:
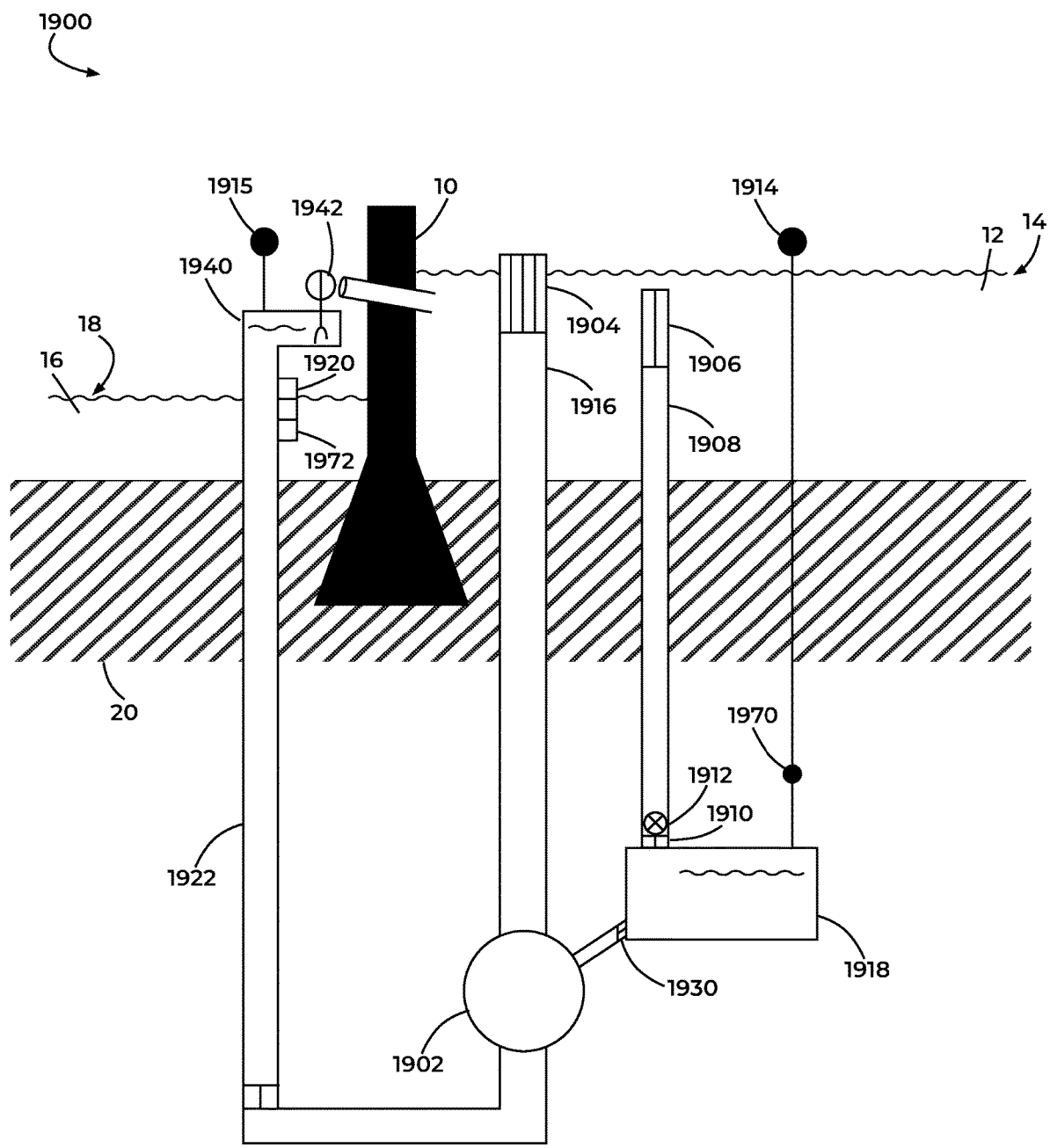
FIG. 19 is an elevation view of a seventeenth exemplary embodiment of the invented power generation system.

In the exemplary embodiment 1900 shown in connection with FIG. 19, the penstock 1908 receives its water from the high head 14 side of the dam 10. Note that the enhanced hydroelectric power generator can be designed to have its penstock 1908 receive its supply of water from sources such as but not limited to the low water head, the high-water head, a water tower, and/or any other suitable source. FIG. 19 also depicts the use of an exemplary optional evacuation chamber 1940. The evacuation chamber 1940 can be deployed during low water level seasons, for example, by closing the valve 1972 at the point of discharge 1920, thereby filling the evacuation chamber 1940 during plant 1900 operation. The evacuation chamber 1940 can optionally be vented to atmosphere at 1915 and the low head water can be pumped back into the high head side of the dam 10 via pump 1942.

Figure 20:
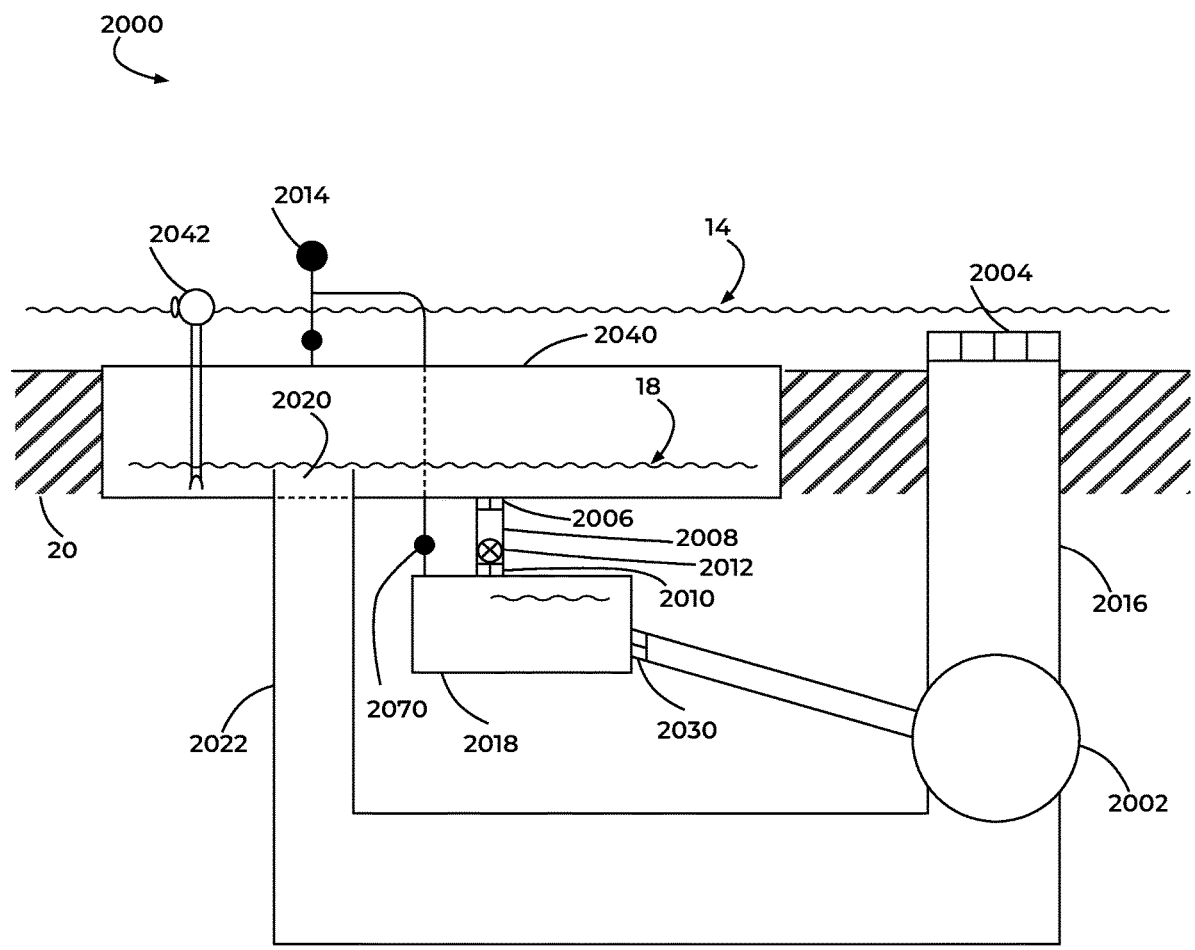
FIG. 20 is an elevation view of an eighteenth exemplary embodiment of the invented power generation system.

Turning to the exemplary embodiment 2000 shown in connection with FIG. 20, a system is depicted that receives its working fluid from a source without the use of a dam to create a differential in inlet and outlet head levels. The pressure differential comes from the distance between the high head of water from the source 14 and the low head of water 18 maintained in the evacuation chamber 2040. The low head of water 18 effectively becomes the water level in the evacuation chamber. This configuration of this embodiment is suitable for installation and operation in locations like but not limited to: ponds, lakes, oceans, streams, rivers, tanks/reservoirs, land and any combination of land and water. It further permits for the penstock 2008 to be extended significantly longer than current designs allow. In this exemplary embodiment, the system 2000 is installed into the riverbed or lakebed bedrock 20, and a pump 2042 is provided to make up the difference in the remaining heads.

Figure 21A:
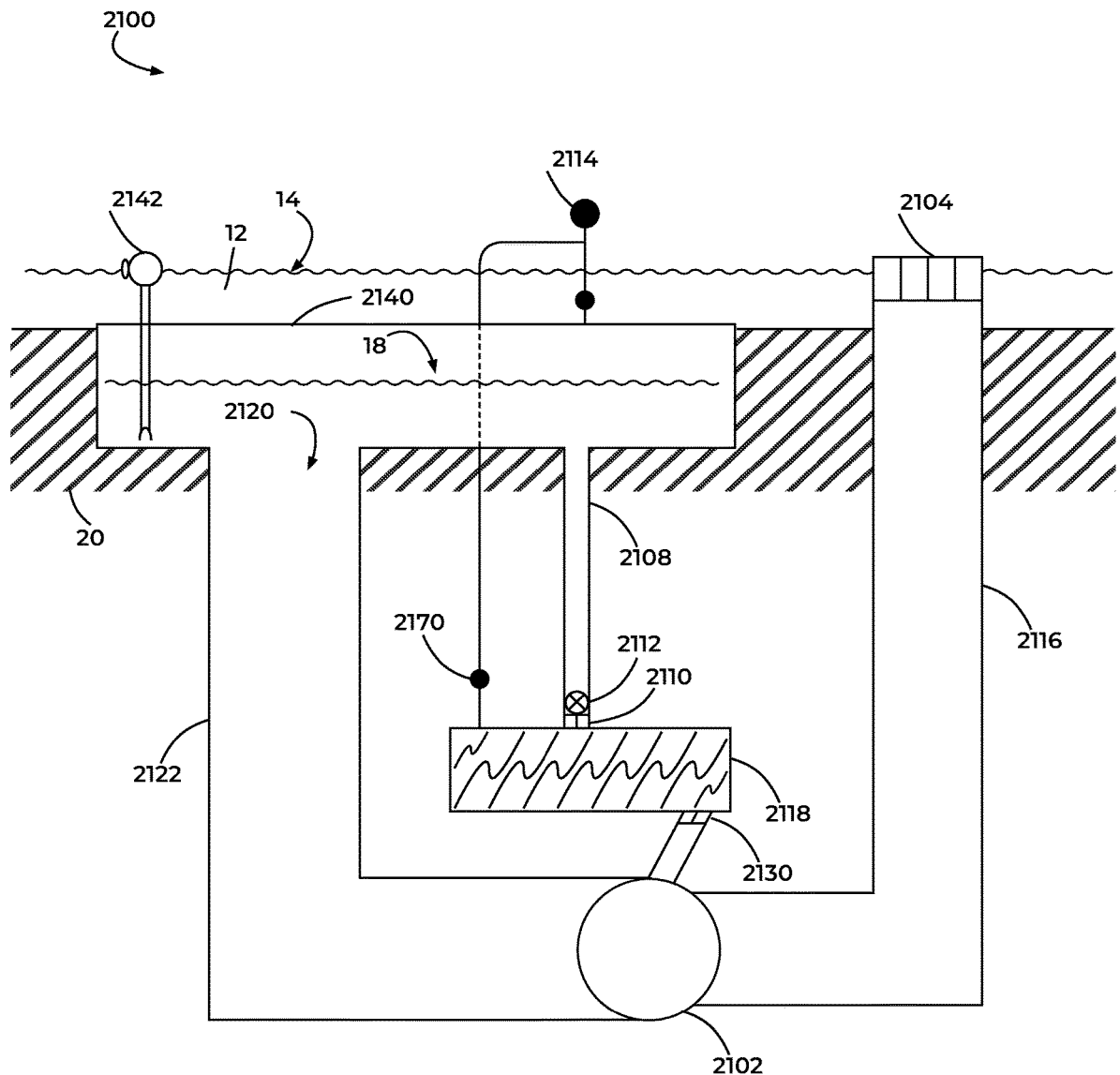
FIG. 21A is an elevation view of a nineteenth exemplary embodiment of the invented power generation system.
Figure 21B:
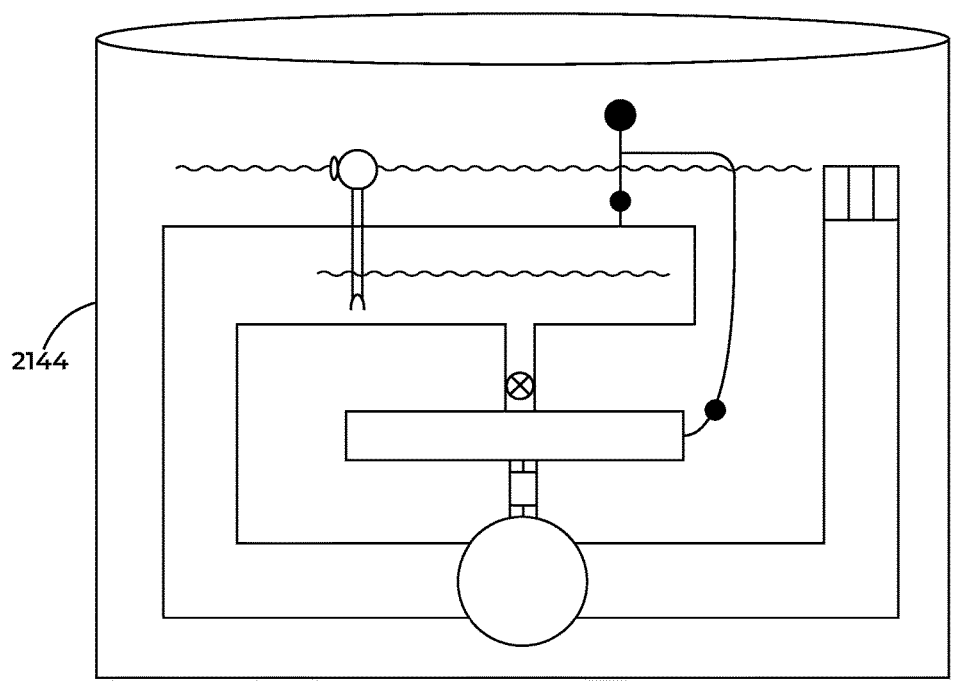
FIG. 21B is an elevation view of the embodiment shown in connection with FIG. 21A implemented in a tank/reservoir design.
Figure 21C:
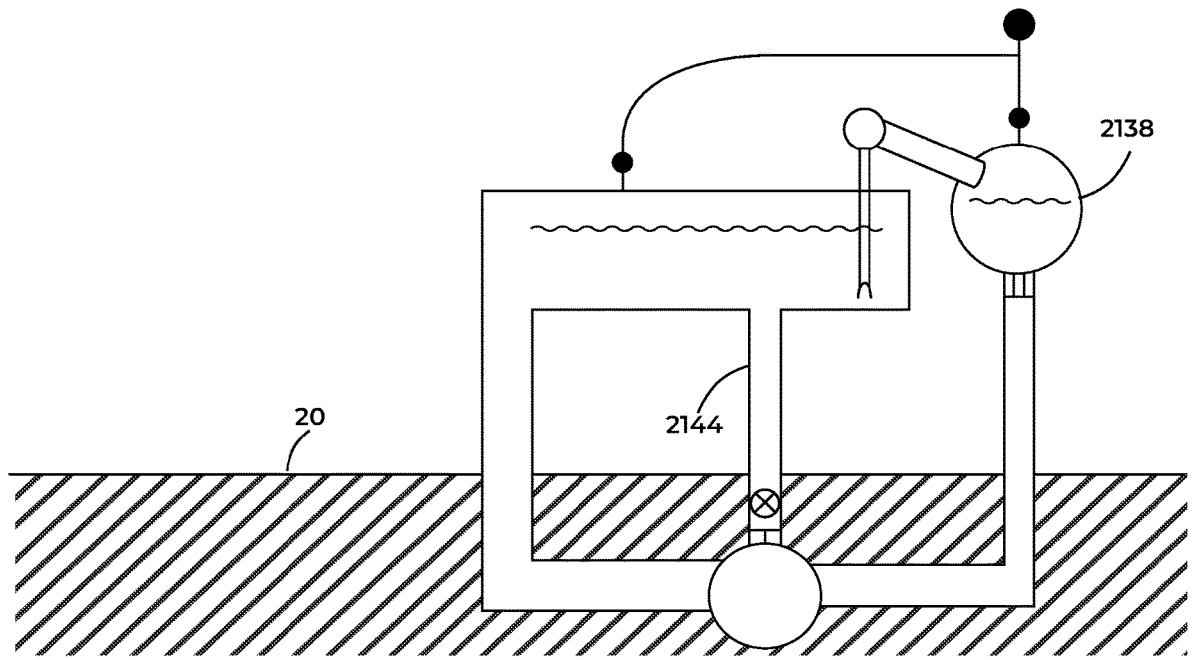
FIG. 21C is an elevation view of the embodiment shown in connection with FIG. 21A implemented in a water tower design.

Turning to FIGS. 21A-21C, a further exemplary embodiment 2100 is depicted wherein the system is installed in the absence of a dam, as in FIG. 20. In this exemplary embodiment, the penstock 2108 can be extended significantly longer than current designs allow. As seen in FIG. 21A, the turbine water chamber (TWC) 2118 has no air space and is completely filled with water. It is not vented to atmosphere. However, note that the turbine water chamber (TWC) 2118 can have an air space if desired. Air vent valve 2170 can be opened exposing the turbine water chamber (TWC) 2118 to atmosphere. If the air vent valve 2170 is closed, then the turbine water chamber (TWC) 2118 is not exposed to atmosphere.

As seen in FIG. 21B, the system may be installed and operated in this manner in connection with a tank/reservoir 2144. In this exemplary, the turbine water chamber (TWC) is shown with an air space vented to atmosphere.

As illustrated in FIG. 21C, this type of embodiment may be deployed in a manner that utilizes a water tower 2138 to supply water to the system as a closed fluid loop, the water tower 2138 acting as a reservoir is described in previous work. This exemplary embodiment also shows the absence of a turbine water chamber, wherein the penstock 2108 runs directly into to a venturi system. This embodiment has terrestrial and extraterrestrial applications.

Figure 22:
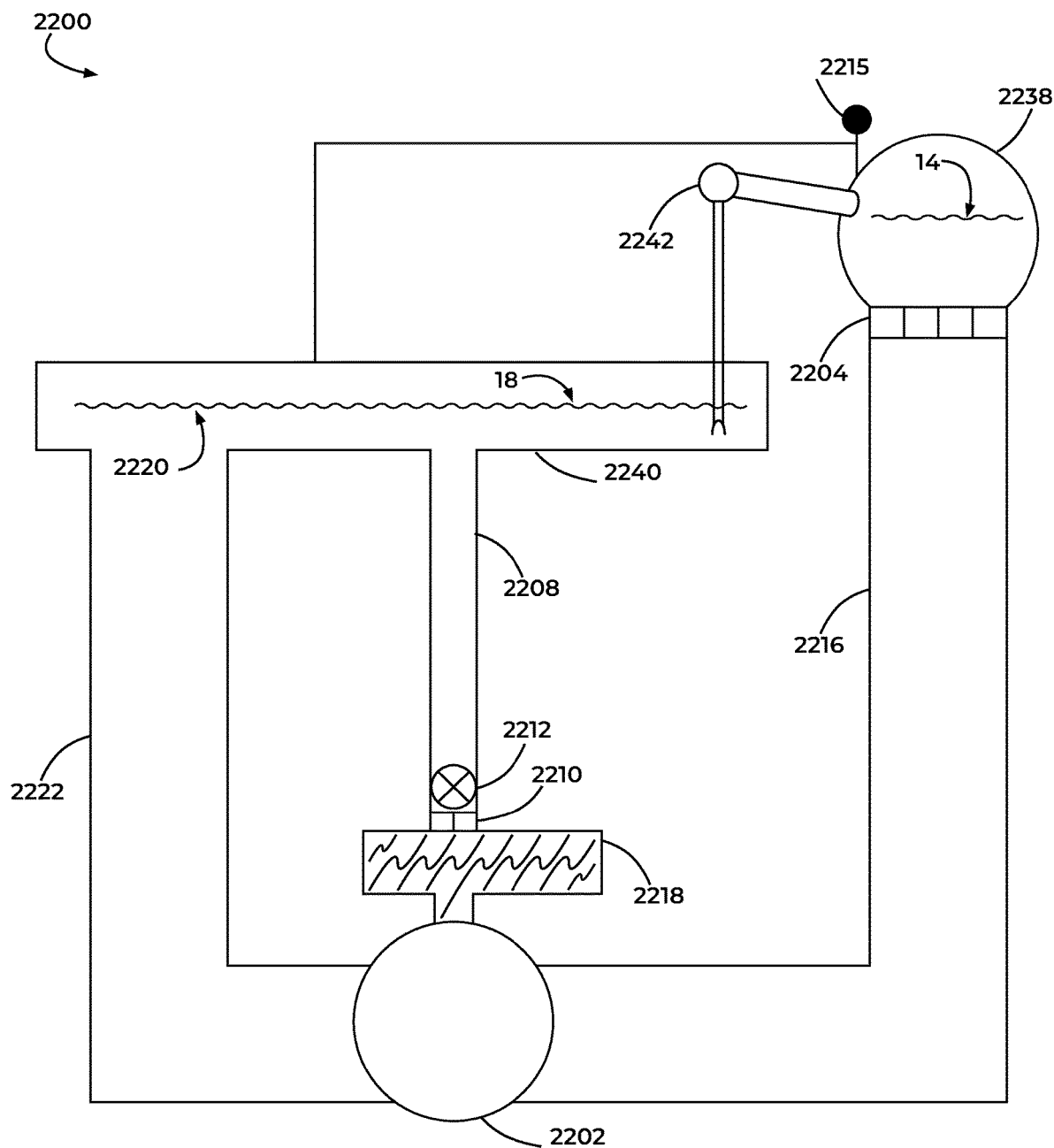
FIG. 22 is an elevation view of a twentieth exemplary embodiment of the invented power generation system.

FIG. 22 depicts an exemplary embodiment 2200 of the invention wherein the turbine water chamber (TWC) 2218 is filled with water and has no air space. The turbine water chamber (TWC) 2218 is not vented to atmosphere. Note that if desired, the turbine water chamber (TWC) 2218 can have an air vent system that can be opened to expose its turbine water chamber (TWC) 2218 to atmosphere. It can also be closed as necessary to prevent the turbine water chamber (TWC) 2218 from being exposed to atmosphere. This example can have an air space above the water level in the turbine water chamber (TWC) 2218, if desired. This embodiment 2200 also shows the use of a non-vented (TWC) in a closed system, wherein a pump 2242 is used to restore the head between 18 and 14.

Figure 23:
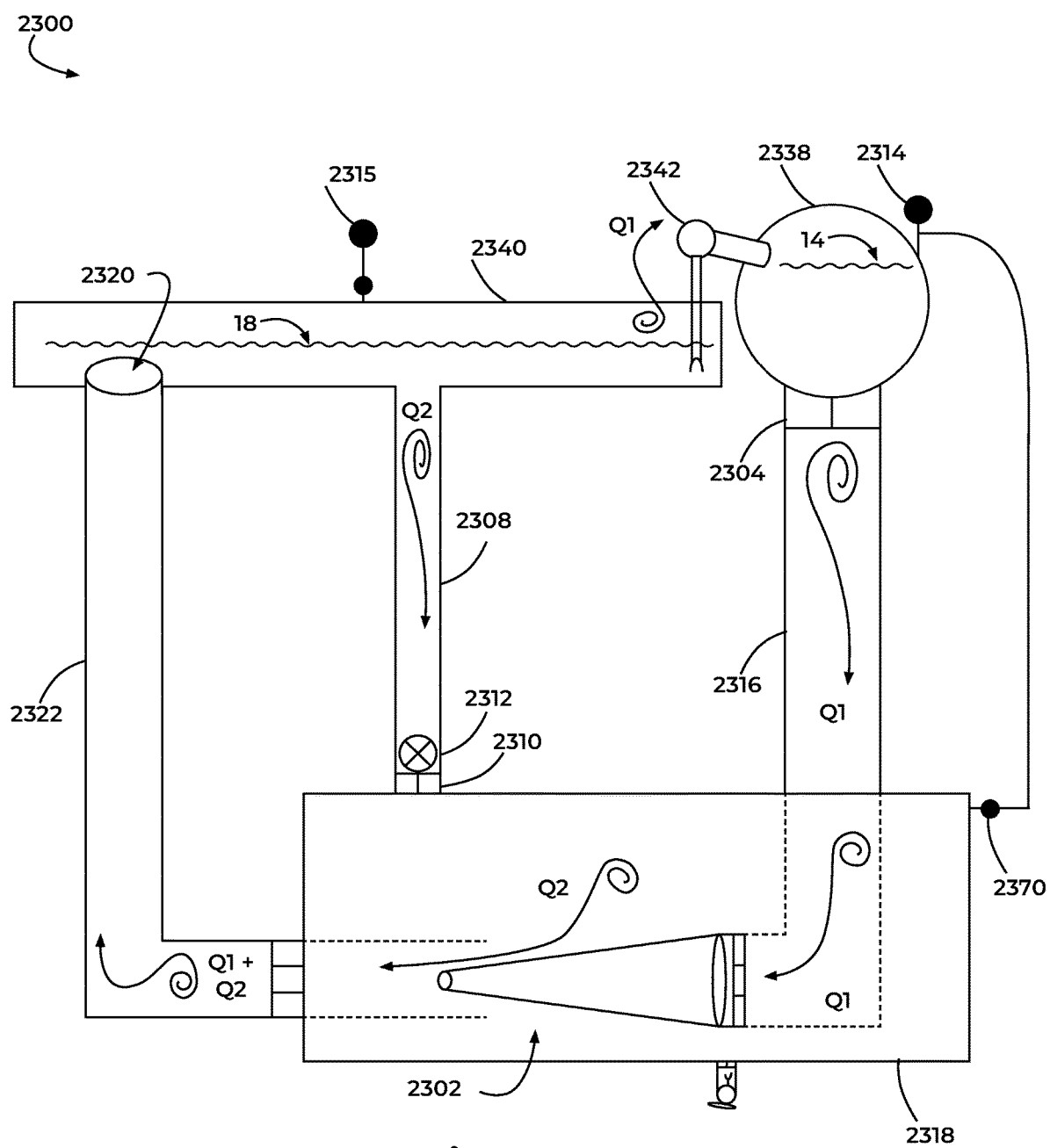
FIG. 23 is an elevation view of a twenty-first exemplary embodiment of the invented power generation system.

The exemplary embodiment 2300 depicted in connection with FIG. 23 shows a variation with a water tower 2338 providing the high head of water 14 and the evacuation chamber 2340 providing the low head of water 18. The turbine water chamber (TWC) 2318 has no air space and is filled with water. It is not vented to atmosphere in this embodiment. This illustration shows the flow of water through the system. If desired, the turbine water chamber (TWC) 2318 can have an air space above the water level inside of the turbine water chamber (TWC) 2318. The turbine water chamber (TWC) 2318 can be vented to atmosphere by opening valve 2370 and closing that valve closes the turbine water chamber (TWC) 2318 to atmosphere.

Figure 24A:
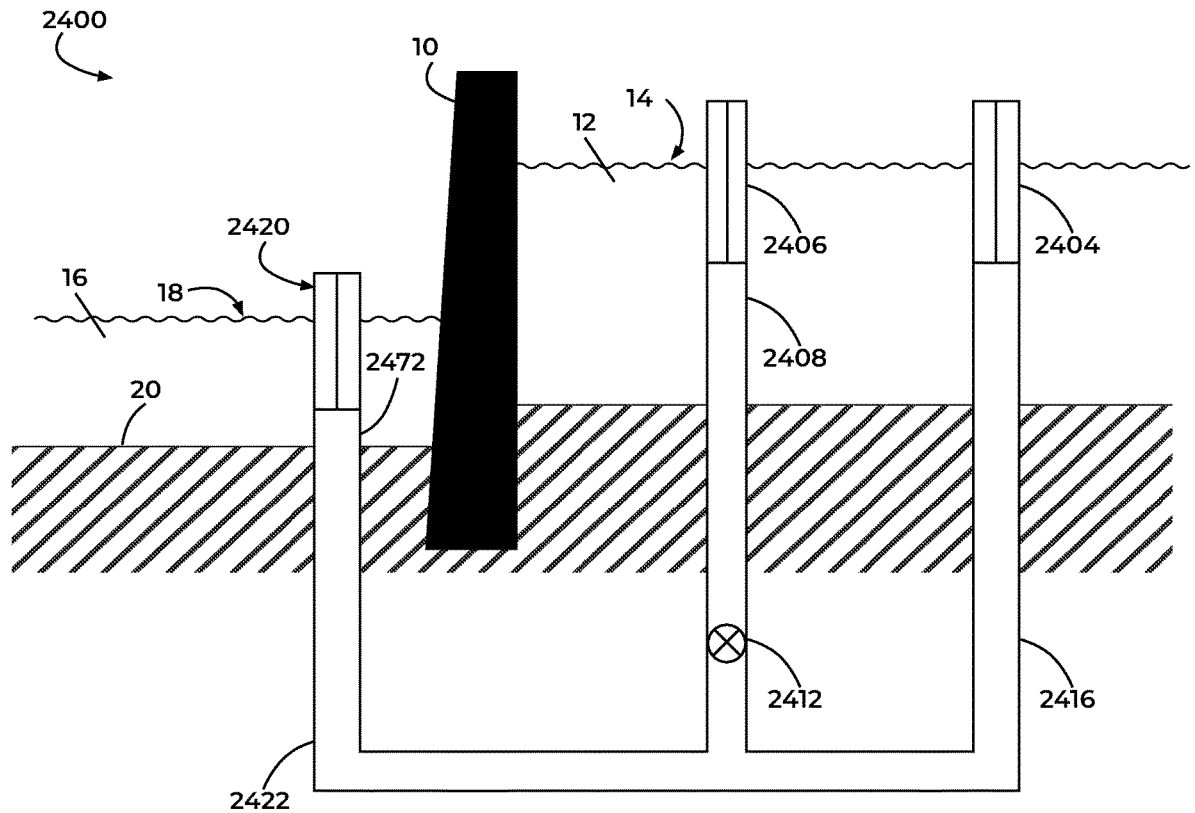
FIG. 24A is an elevation view of a twenty-second exemplary embodiment of the invented power generation system.

The exemplary embodiment 2400 shown in connection with FIG. 24A demonstrates that the penstock 2408 can feed directly into connecting pipe 2416 without using a venturi or any other similar substitute system as described above. Note that the pressure of the water passing through the turbine system 2412 in the penstock 2408 will drop in pressure. Consequently, the water entering connecting pipe 2422 will have a lower water pressure then the water passing through 2416 via 2404. Additionally, the pressure differential between the high head of water 14 and the low head of water 18 will help enable the water in 2408 to enter 2422. This allows 2422 to send water that entered it from intake valve 2404 and water that entered it from the penstock 2408 out of the system at its point of discharge 2420.

Figure 24B:
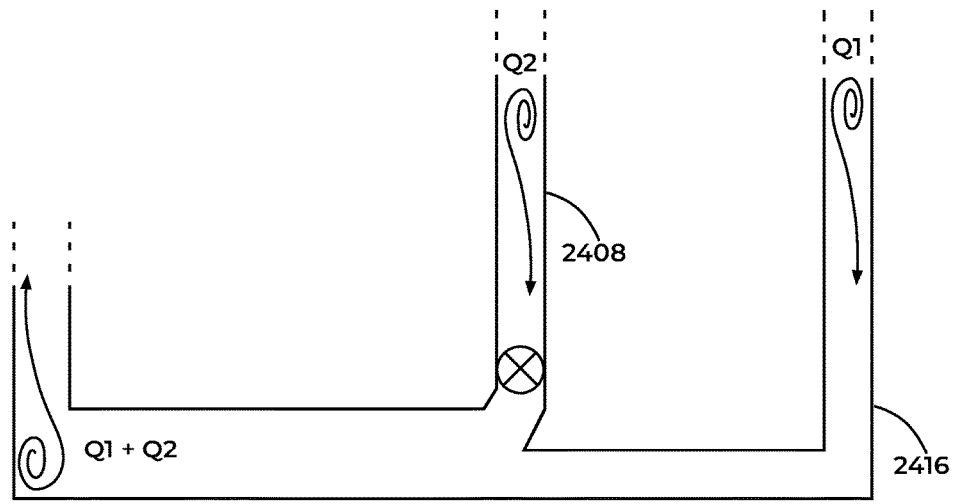
FIG. 24B is an elevation view of the embodiment shown in connection with FIG. 24A illustrating exemplary flow throughout the system.

FIG. 24B illustrates that the angle that the penstock 2408 connects to connecting pipe 2416 can vary without limiting the claims of the presently disclosed invention. The inset also shows that the diameter of connecting pipe 2416 can vary before it connects with the penstock 2408 and it can vary in diameter after the point at which it 2416 connected with the penstock 2408.

Also, in this example, a valve 2472 at the point of discharge 2420 is shown that can be opened and closed as needed. The discharge valve 2472 can be operated/adjusted to control the flow of water exiting 2422 into 18 and if desired and also to control the flow of water entering 2422 from the low head of water 18. Preferably, valve 2472 is open when the system 2400 is operating.

Figure 25A:
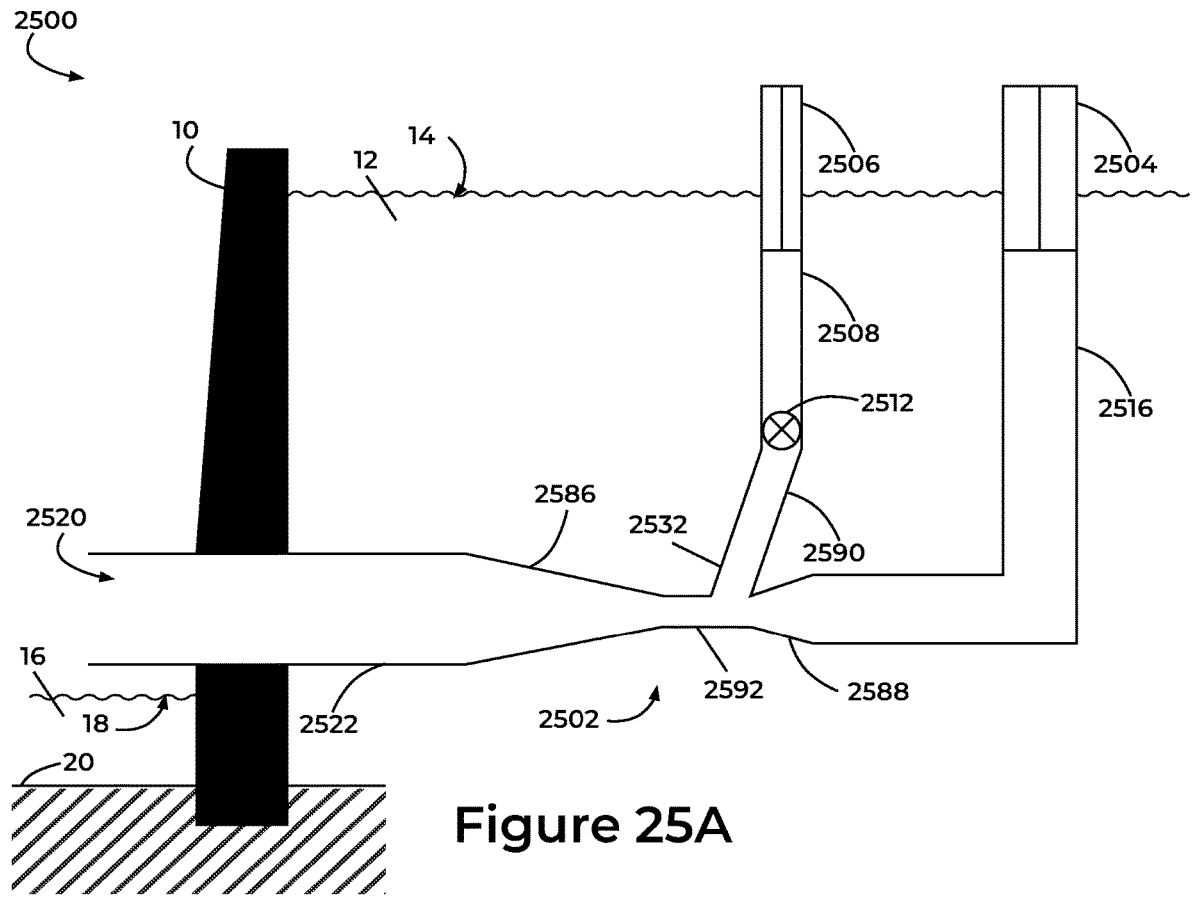
FIG. 25A is an elevation view of a twenty-third exemplary embodiment of the invented power generation system.

In the exemplary embodiment 2500 shown in connection with FIG. 25A, a system is shown with a venturi system 2502 in which there is a vacuum port 2532, a draft tube 2590, a diverging part 2586, a throat 2592, and a converging part 2588.

The illustrated innovation helps (drop, move and/or pull) water through the turbine/generator system 2512 because the "venturi effect" (vacuum) lowers the pressure of the water below the 2512. This creates a pressure differential between the water above and below the turbine generator system 2512. The water below the system 2512 is now at a lower pressure and the water above the system 2512 is at a high pressure. This pressure differential allows water to pass through the system 2512 to generate electricity at a higher effective head than it would otherwise.

The pressure differential allowing water to move through the system 2512 is generated by the venturi effect. High pressure water with slower velocity enters through valve 2504 and travels through connecting pipe 2516 to the venturi system 2502. The high-water pressure is reduced to a lower pressure as it moves through the front (converging part) 2588 of the venturi. The low velocity of that same flow of water is increased to a higher velocity. The high-pressure water with a low velocity that entered the venturi system 2502 now has a low pressure and a high velocity moving through the venturi system's throat 2592. The throat of a venturi is the narrow pipe between its front converging part 2588, where water enters it from 2516 and its back diverging part 2586, is where water exits the venturi 2502 and enters connecting pipe 2522. Water passing through the venturi system 2502 initiates the venturi effect (a vacuum) that not only causes a pressure differential between the water below the system 2512 and the water above it, but it also allows the low-pressure water, that passed through system 2512 to be (sucked/drawn/moved) into the venturi via a vacuum port 2532 leading into the throat 2592 of the venturi system 2502. The vacuum port 2532 of a venturi is a pipe connection that receives the low-pressure water that passed through the power generation system 2512 allowing it to enter into the venturi system's throat 2592. Now the combined flow of water in 2522 is delivered to the point of discharge 2520 where it is evacuated from the power plant 2500. The low-pressure water is raised to a higher pressure as it travels through the back (diverging part) 2586 of the venturi. Likewise, the high velocity water is lowered to a low velocity flow as it travels through the back (diverging part) 2586 of the venturi. The combined flow of water that passed through the venturi now has a water pressure approximately equal to the water pressure that entered it. Likewise, the velocity of the combined flow of water exiting the venturi now has the same approximate velocity as the water that entered it (the venturi). The water pressure in the connecting pipe system is now able to move (lift it if required) the combined flow of water out of the point of discharge where it exits the power plant.

This model has the penstock's 2508 draft tube 2590 connected directly to the venturi system's vacuum port 2532. The draft tube 2590 is the pipe connection that receives water being discharged from the turbine/generator system 2512. It may be possible to connect the system 2512 directly to the venturi system's (vacuum port) 2532 that extends from the throat 2592 of the venturi. Here, the vacuum port 2532 would also be the draft tube 2590, effectively, although they are separated for conceptual purposes.

The order of opening valve 2504 which provides the flow from the high head 14 of water into connecting pipe 2516 and valve 2506 which provides the flow of water that passes through the turbine generator system 2512 can vary. They can occur simultaneously, valve 2504 can be opened first or valve 2506 can be opened first. The best order for opening these valves needs to be calculated and tested by an expert in the appropriate arts. It is probably best to open valve 2504 to initiate the vacuum effect and then open valve 2506. However, they can be opened as desired and/or necessary. Preferably, the penstock 2508 and draft tube 2590 are filled with water as is the connecting pipe system 2516. However, the set up for the power plant needs to be calculated and tested by an expert in the appropriate arts for particular applications.

The high-pressure water entering the venturi 2502 from connecting pipe 2516 is reduced to a lower pressure as it moves through the front 2588 of the venturi and into the venturi system's throat 2592; and its low velocity is increased to a higher velocity as it travels through the front 2588 of the venturi and into the throat 2592 of the venturi. Then as that water exits the venturi system's throat 2592 it begins to revert back to a high-pressure water flow with a low velocity. The "venturi effect" (vacuum) lowers the pressure of the water behind the system 2512 located in the draft tube 2590 which establishes a greater pressure differential than already present under ambient conditions. Accordingly, the water below the system 2512 is now at a lower pressure then the water above the system 2512. This pressure differential enables the high-pressure water above the system 2512 to move through it to generate electricity. Water passing through the system 2512 loses pressure operating the system, as well. The "venturi effect" (vacuum) sucks/draws low pressure water from the draft tube 2590 and into the venturi via its vacuum port 2532. Again, the combined flow of water entering the venturi system from the venturi system's vacuum port 2532 and from connecting pipe 2516 has its water pressure increased and its velocity decreased as it continues to move through the venturi system. Upon entering connecting pipe 2522 the pressure of the flow of water exiting the venturi should be approximately equal to the high pressure of the water that entered it from connecting pipe 2516. Likewise, the velocity of the water exiting the venturi system should be elevated to approximately the same low velocity of the water that entered it from connecting pipe 2516. This high-pressure water can now move the water to the point of discharge 2520 where it is evacuated from the power plant.

Jet pumps—or ejector systems—operate under the similar modes of operation as the venturi systems. Jet pumps use a nozzle effect to lower the pressure behind the power generation system (e.g., 2512) to generate a pressure differential. The pressure differential allows the high-pressure water in front of the system to pass through it and generate electricity. The jet pump's (ejector system's) nozzle effect also draws the low-pressure water that passed through the system into the jet pump. There is a similar effect from using a jet pump compared to a venturi system. Water entering the jet pump from connecting pipe has its pressure reduced and its velocity increased. The "nozzle effect" replaces the venturi effect. Water that passed through the power generating system is drawn into the jet pump via an opening because of the "nozzle effect". The combined flow of water that entered the jet pump has its pressure increased and its velocity decreased. Its pressure becomes equal to or nearly equal to the high pressure of the water that entered the jet pump from connecting pipe. Likewise, the velocity of the water exiting the venturi and entering the discharge pipe has its velocity lowered to a point equal to or nearly equal to the velocity of the water that entered the jet pump from the high head of water.

Figure 25B:
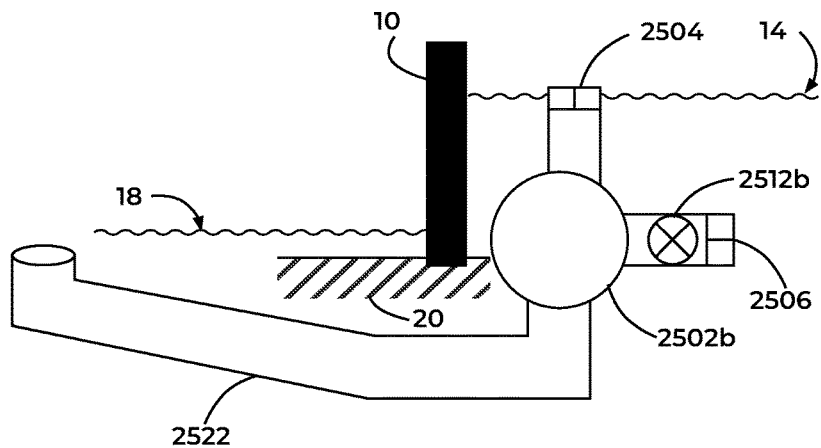
FIG. 25B is an elevation view of a variation on system elements shown in connection with the embodiment of FIG. 25A.

FIG. 25B demonstrates different positions/locations of venturi systems, jet pump, ejector systems and any other appropriate systems 2502*b* capable of evacuating water after passing through the power system 2512*b*, especially ejector and dual hammer pumps. Note also the discharge pipe 2522 and some components of the system depicted in FIG. 25B extend beneath the ground 20, giving the designer even more opportunity to size the power generating components 2512*b* economically.

Figure 26:
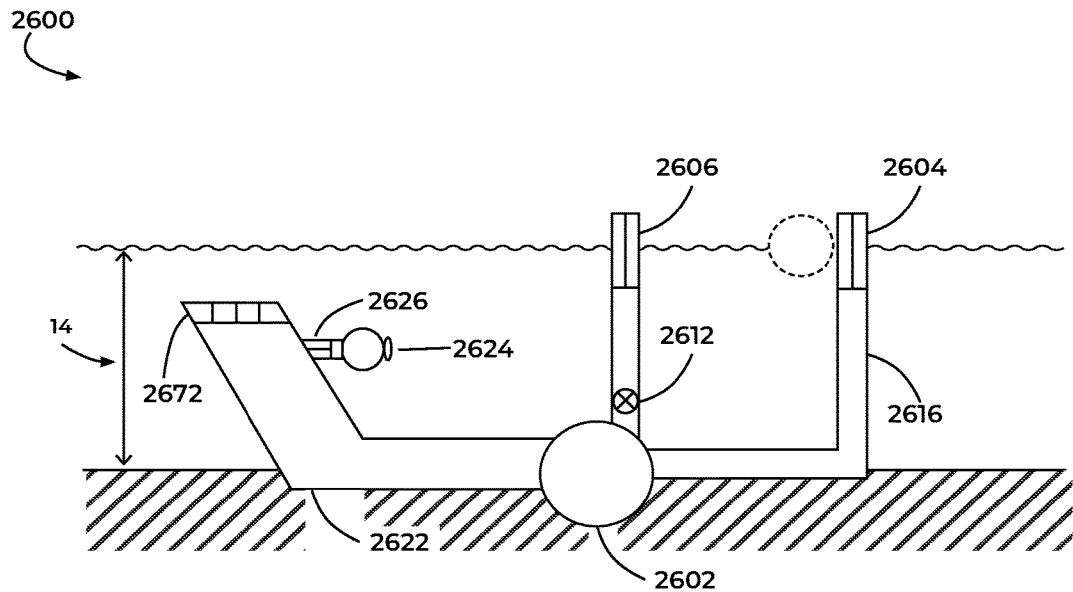
FIG. 26 is an elevation view of a twenty-fourth exemplary embodiment of the invented power generation system.

Turning to FIG. 26, an exemplary embodiment 2600 is depicted similar in operation to that shown in connection with FIG. 21, which uses an evacuation chamber to enhance the pressure differential generated by a venturi system. This embodiment does not use a dam or an evacuation chamber as a source of pressure differential. The pressure differential required to operate the power plant is supplied primarily by the venturi system 2602 or any other appropriate system such as but not limited to a jet pump/ejector system, eductor system, hammer system, dual hammer system, centrifugal pump system or any combination of the aforementioned systems or comparable substitutes now known or later developed. The pressure differential is also regulated by the flow of water through connecting pipes 2616 and 2622. Additionally, water passing through the turbine/generator system 2612 also has its pressure lowered.

This variation demonstrates that the venturi system 2602 or any other appropriate system (and any comparable component as mentioned above) is used to lower the pressure of the water in connecting pipe 2616. Accordingly, the combination of the venturi effect (or, e.g., the nozzle effect if a jet pump/ejector system is used) and the force of the water traveling through 2616 helps generate a pressure differential enabling the system 2612 to operate (generate power).

Water passing through the turbine/generator system 2612 has its pressure reduced after operating the system 2612. This allows the low-pressure water to enter the venturi 2602 (or any other appropriate system like but not limited to a (jet pump/ejector system). The high-pressure water in 2616 enters 2602 or any other appropriate system as previously stated. It has a relatively low velocity. However, after entering 2602 its pressure is reduced, and its velocity is increased. This allows the venturi 2602 or any other appropriate system as previously mentioned to draw the low-pressure water (entrained fluid) that passed through the system 2612 into the venturi 2602 or any other appropriate system as previously mentioned. Here, the water that passed through the system 2612 and the water from 2616 comingle. The velocity of the combined flow of water is reduced and its pressure increases as it travels through 2602 or any other appropriate system as previously mentioned. After exiting 2602 or any other appropriate system as previously mentioned, the velocity of the combined flow becomes equal to or nearly equal to the velocity of the flow of water from 2616 that entered 2602 or any other appropriate system as previously mentioned. Likewise, after exiting the venturi 2602 or any other appropriate system as previously mentioned, the pressure of the combined flow becomes equal to or nearly equal to the pressure of the flow of water from 2616 that entered 2602 or any other appropriate system as previously mentioned.

The combined flow of water travels through connecting pipe 2622 and exits the system through valve 2672. Valve 2672 can be opened and closed as necessary.

It may be necessary to prime 2602 or any other appropriate system as previously mentioned for it to operate in certain applications. To prime 2602 or any other appropriate system as previously mentioned, valve 2672 is closed and valves 2626, 2604 and 2606 are opened. Prime Pump System 2624 pumps water out from connecting pipe 2622. When 2602 begins operation valve 2672 is opened and pump system 2624 is shut off. Valve 2626 is closed. Valves 2672 and 2626 can be opened and closed as needed. Pump System 2624 can be used as desired.

14 represents the depth of the water. This depth can vary. The difference between the water head 14 and the depth of the turbine generator system 2612 represents the theoretical advantage of using the 2602 or any other appropriate system as previously mentioned. This advantage allows an increase in power generation than what can be expected from traditional hydroelectric power generation systems. The increase in the power generation is dependent upon many elements such as but not limited to the following: the size and specifications of the connecting pipes, the size and the specifications of the power generating system system, the size and specification of the penstock, the type and specifications of the system used to evacuate water that passed through power system from the power plant, the specifications of pump system 2624, the flow of water through the system and the desired amount of power generation given the available amount of water.

This concept can be used for any desired amount of power generation given the appropriate supply of water (low head, moderate head and high heads of water). As in other variations, this embodiment can be operated in places such as but not limited to the following: ponds, creeks, streams, rivers, lakes and oceans.

Figure 27:
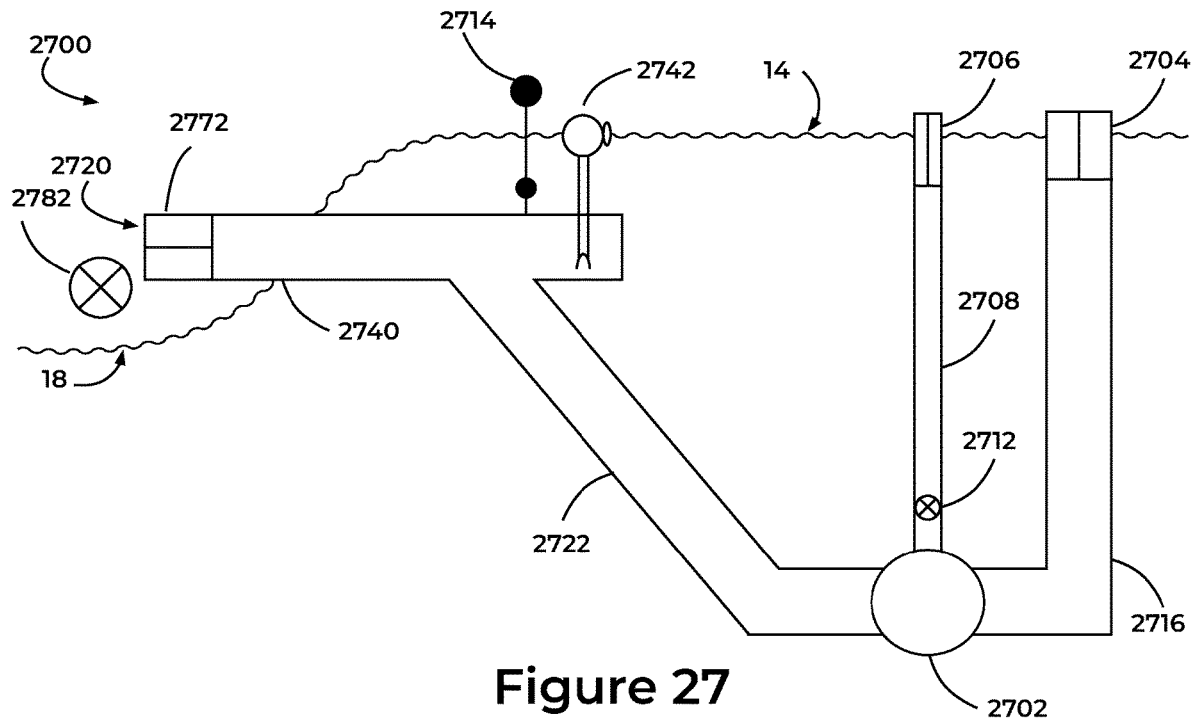
FIG. 27 is an elevation view of a twenty-fifth exemplary embodiment of the invented power generation system.

The exemplary embodiment 2700 shown in connection with FIG. 27 illustrates a variation of FIG. 26. Here, an evacuation chamber 2740 is added to help establish a pressure differential to move water through the system 2700. Water is sent to chamber 2740 after passing through the venturi 2702 or any other appropriate vacuum pump system as previously mentioned. Then pump system 2742 evacuates the water from the power plant. A valve controlling air vent 2714 determines whether chamber 2740 is open or closed to atmosphere. Evacuation chamber 2740 can be open or closed to atmosphere as desired for a given application.

As desired/necessary for a given application, the evacuation chamber 2740 can extend/travel any desired distance in order to drain its water content into a lower head of water 18. This method would replace having to pump the water from the evacuation chamber 2740. An optional auxiliary turbine 2782 can be placed at the 2720 to generate additional electricity if desired.

Figure 28:
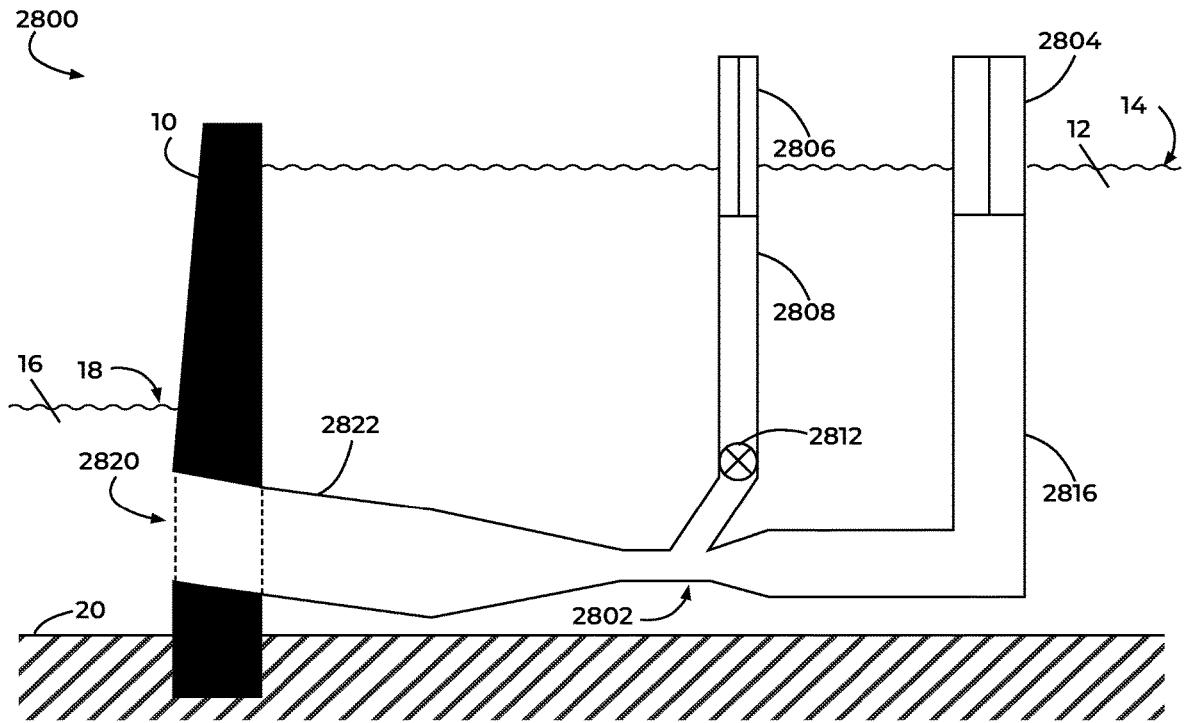
FIG. 28 is an elevation view of a twenty-sixth exemplary embodiment of the invented power generation system.

The exemplary embodiment 2800 depicted in connection with FIG. 28 illustrates the concept involving systems like but not limited to (venturi systems, jet pump systems, ejector systems, double hammer systems, etc.) 2802 can be applied to any of the following: low head dams, moderate head dams and high head dams to increase the power generation and/or efficiency over traditional hydroelectric power plants.

Figure 29:
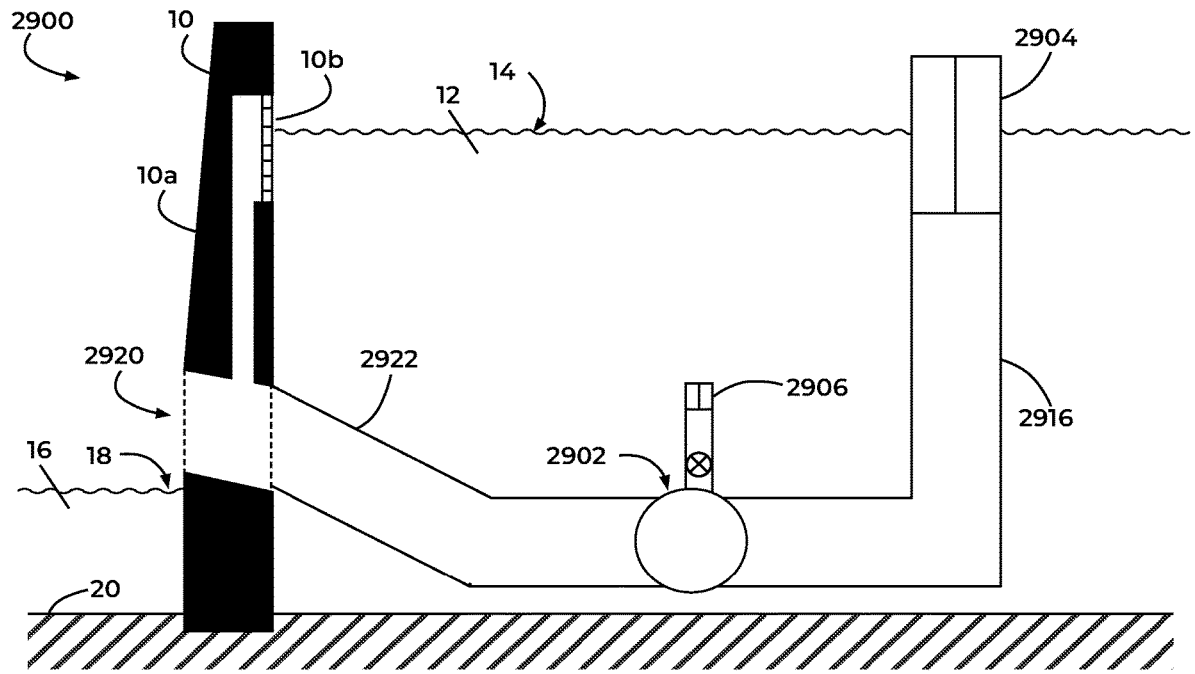
FIG. 29 is an elevation view of a twenty-seventh exemplary embodiment of the invented power generation system.

This embodiment demonstrates that it can be added to existing hydroelectric power generating systems or replace them if desired. It can also be a new construction, too. The exemplary embodiment 2900 shown in connection with FIG. 29 also shows another variation of how these types of hydroelectric power generating systems can be used to modify/upgrade existing hydroelectric power plants to make them generate more power and/or become more efficient. The embodiment in FIG. 29 shows one of several methods that this concept can be added to an existing hydroelectric power plant to improve its power generation and/or efficiency, having a traditional penstock and inlet configuration at 10*a* and 10*b*, respectively.

10*b* is the old intake valve for the old power plants penstock. 10*a* is the old penstock of the old power plant. This variation shows that the old power plant's dam 10 is being reused. It also shows that parts of the penstock 10*a* and the point of discharge 2920 of the old power plant can be used. The possible variations for modifying an older hydroelectric power plant with the new concept are too numerous to describe exhaustively herein, but these embodiments illustrate exemplary retrofit scenarios and their application in other comparable scenarios will be readily apparent to those skilled in the art when combined with the disclosure provided herein.

Figure 30:
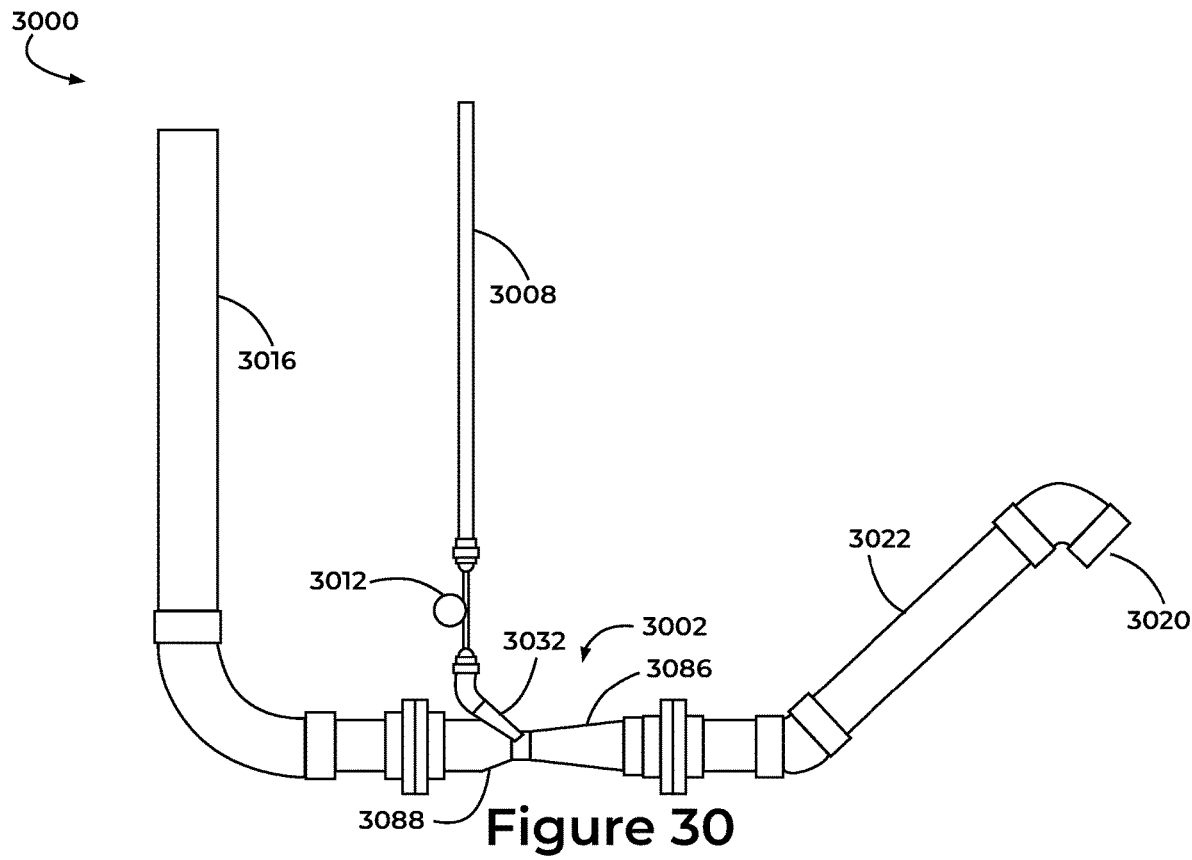
FIG. 30 is an elevation view of a twenty-eighth exemplary embodiment of the invented power generation system.
Figure 31:
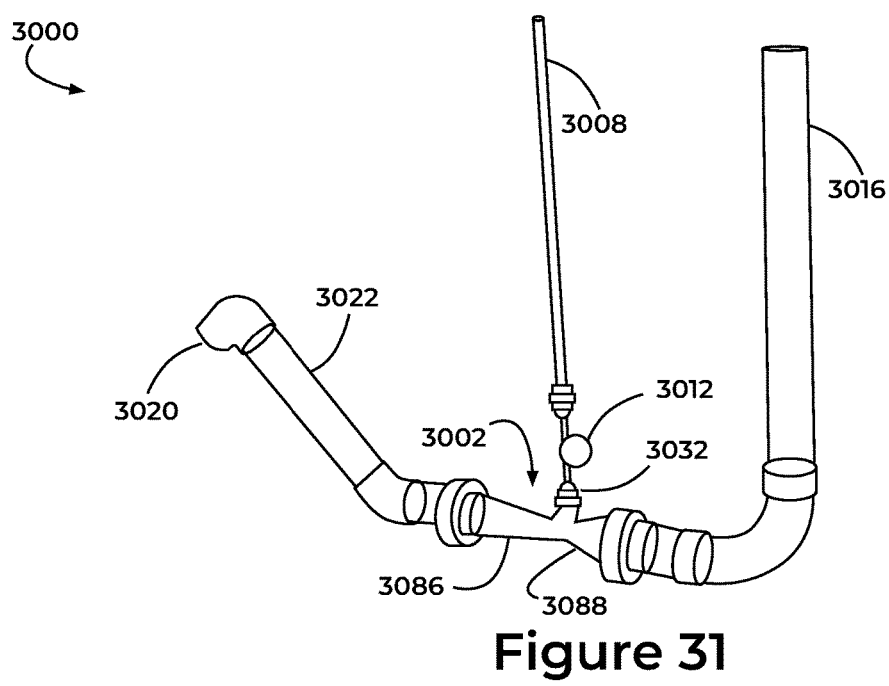
FIG. 31 is a perspective view of the exemplary embodiment of the invented power generation system shown in connection with FIG. 30.

FIG. 30 and FIG. 31 are elevation and perspective views, respectively, of a prototype model 3000 created to demonstrate the principles of the invention as set forth above. As configured, this embodiment employs a venturi system 3002 having an inlet or convergent cone 3088, outlet or divergent cone 3086 and a low-pressure or vacuum inlet 3032. The high head of water enters the system via a first connecting pipe 3016 and enters the inlet cone 3088. At the restriction, the low-pressure inlet 3032 receives fluid from the penstock 3008 after passing through a turbine or turbine generator 3012. The outlet cone 3086 receives the mixture of these two flows and passes the same to the second connecting pipe 3022 to the point of discharge 3020.

Figure 32:
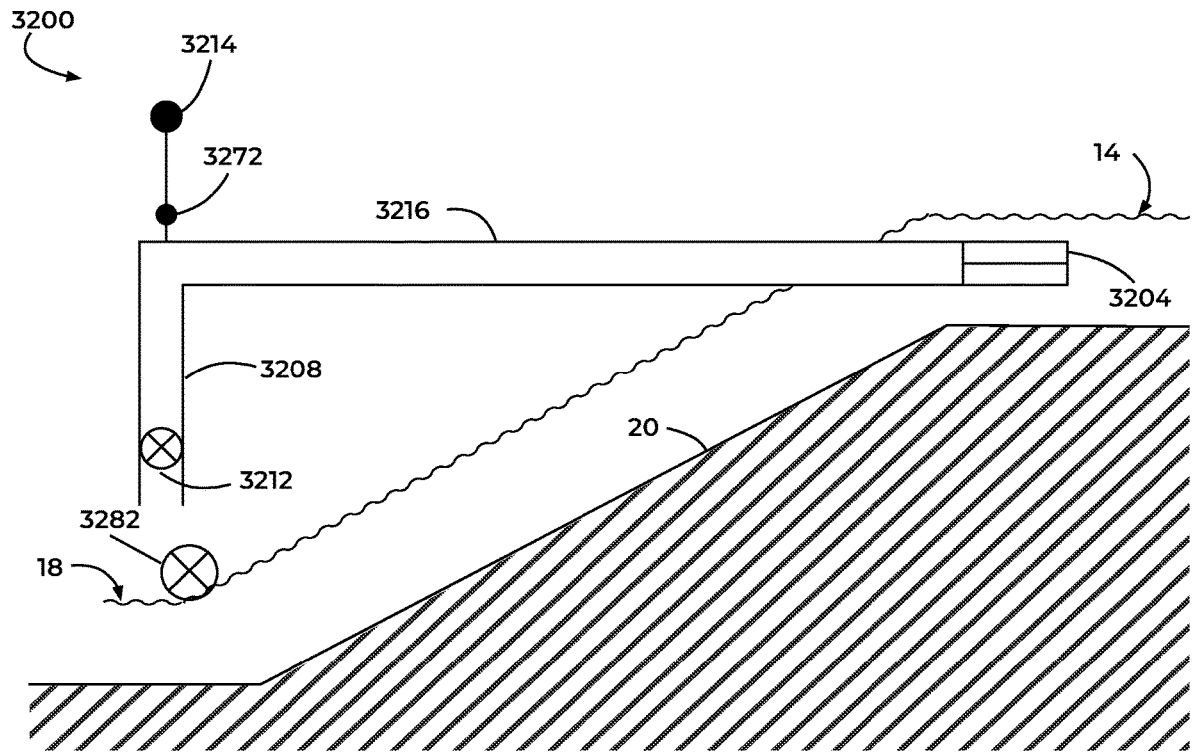
FIG. 32 is an elevation view of a twenty-ninth exemplary embodiment of the invented power generation system.

FIG. 32 shows that a connecting system 3200 such as but not limited to: a pipe, channel, ditch or combination of any natural and/or man-made items to transport water from a high head 14 to a low head 18 to generate power. Water enters the power plant from the high head of water 14 by opening valve 3204. Connecting pipe system 3216 directs the water to a lower head. The water drops down a penstock 3208 to operate a turbine/generator system 3216 generate more power than the head of water located at valve 3204 is capable of generating. This is because connecting pipe 3216 transports the water to an elevation that has a lower elevation allowing the penstock to be longer, so more power can be generated then can be at the high head of water 14. Connecting system 3216 can be designed to carry small, moderate and large volumes of water short, moderate and long distances.

A connecting pipe 3216 is run from upstream to downstream taking advantage of the downward slope to generate an (elevation differential/pressure differential) between the high head 14 of water upstream and the low head 18 of water downstream. Thus, if the elevation drops 15 feet over a hundred yards then the system would have approximately a 10- to 15-foot head of water to drop down a penstock to operate a turbine system to generate power. If the decrease in elevation is 50 feet over a downward slope extending four miles, then there would be a potential of having an approximate (40- to 50-foot head of water) to drop down a penstock to generate electricity/perform work. The connecting pipe would need a support structure to keep the original elevation of the head of water to the penstock. The exact height of the connecting pipe's support structure will need to be calculated and tested by an expert in the appropriate arts taking into specific application topography and geological features, which is beyond the purview of this disclosure. Again, if the intake of the connecting pipe in the upstream head of water is 80 feet above sea level and the location of the penstock (which is five miles downstream) is 30 feet above sea level, then there would be about a 35- to 50-foot (elevation/pressure) differential that can be used to generate electricity. The exact elevation/pressure differential between the high head 14 of water upstream and the low head 18 of water downstream would need to be calculated by an expert in the appropriate arts depending upon applicable variables for a given installation. Consideration should be given to where the intake valve is positioned to receive upstream water and how much distance is required between the turbine and the low head of water downstream.

Consequently, if the intake valve 3204 is 80 feet above sea water (when positioned to receive water from the upstream high head 14 of water and the low head 18 of water is 30 feet above sea level then accommodation is necessary for the seasonal rise and fall of the water at the water at the downstream low head 18 to ensure that power generation can occur as often as desired.

This exemplary embodiment has numerous advantages, such as the fact that dams are not required. Hydroelectric power plants could be placed in numerous locations even at sites where current hydroelectric power technology determined it was not feasible. The support structure for the connecting pipe can be designed to be environmentally friendly. It can also be used for recreational installations (e.g., walking, jogging, picnics, sports fields, fishing, bird watching, etc.).

In operation, the high head 14 water enters intake valve 3204. It travels inside of connecting pipe 3216 to the penstock 3208, which is located downstream. Water drops down 3208 and operates turbine system 3212 which is implied to be connected to a generator to generate electricity. The 3208 can be vented to atmosphere by air vent 3214. Valve 3272 controls whether 3214 is opened or closed. Water passing through turbine system 3212 empties into the low head 18 of water. If desired an auxiliary turbine system 3282 can be positioned below the 3208 to capture the water dropping from 3208 and/or capture the force of the water moving downstream.

Figure 33:
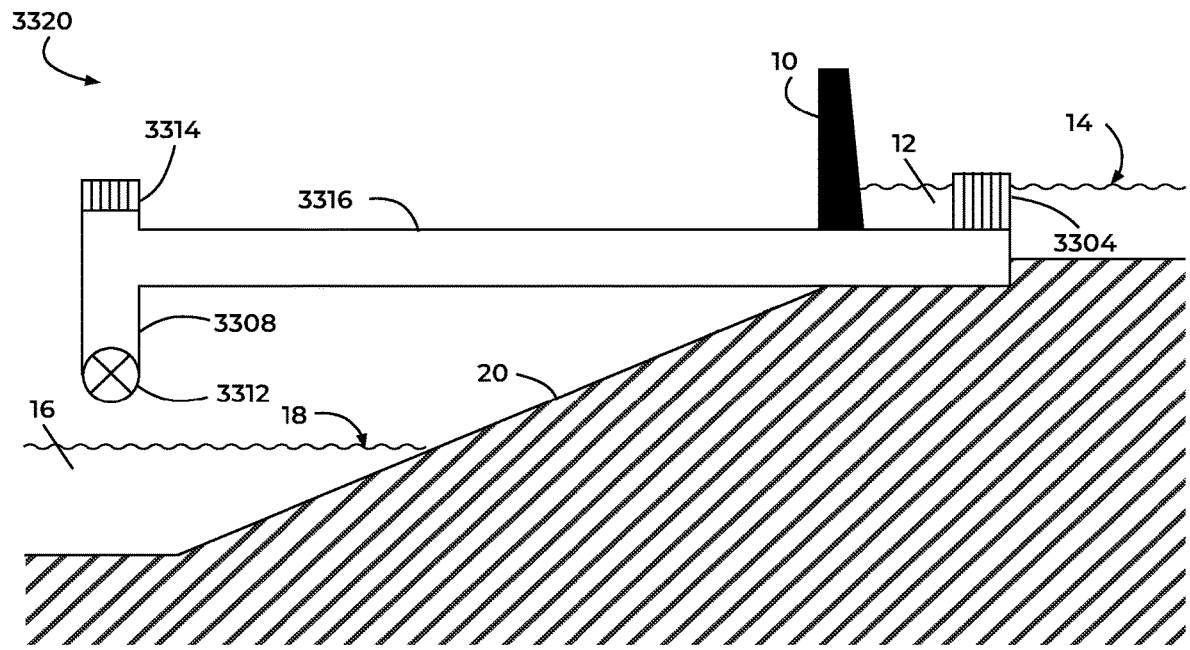
FIG. 33 is an elevation view of a thirtieth exemplary embodiment of the invented power generation system.

FIG. 33 is like FIG. 32 with the following exception. A combination of using a dam 10 and a connecting system 3316 mentioned in the written description of FIG. 32 allows water from the high head 14 to be delivered to a penstock 3308 and turbine generator system 3312. This system allows the penstock 3308 to be longer than if it were placed into the head of water up stream by valve 3304.

Figure 34:
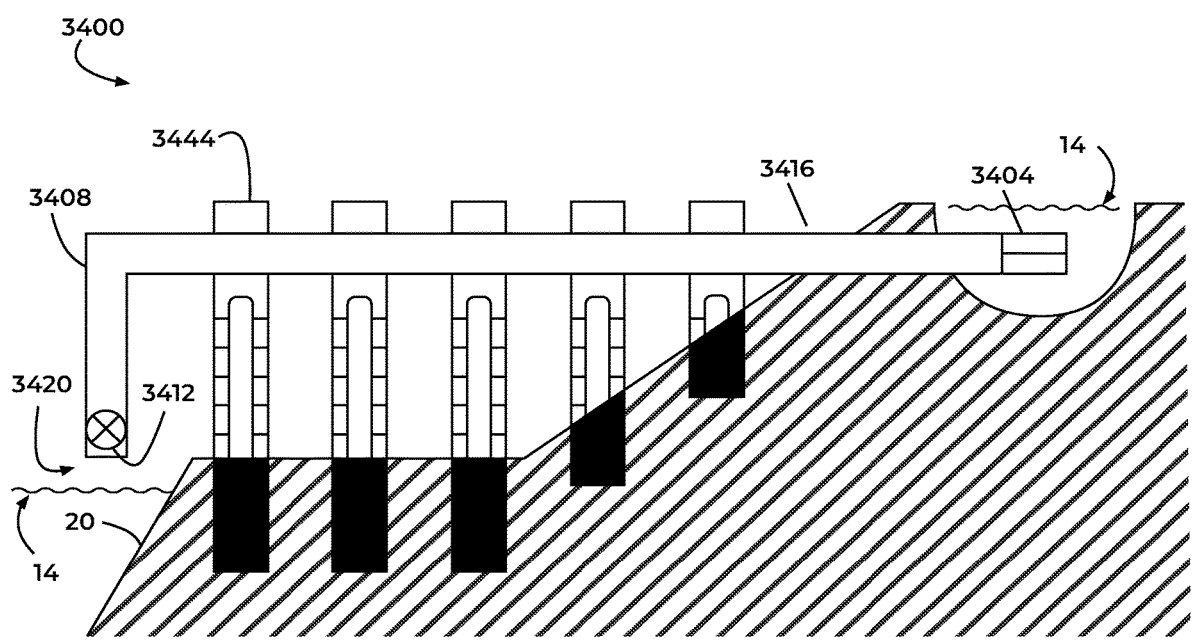
FIG. 34 is an elevation view of a thirty-first exemplary embodiment of the invented power generation system.

Referring to the exemplary embodiment 3400 shown in connection with FIG. 34, this illustrates that the concept can use a delivery system or "elevated structure" 3494 in place of a dam and/or to create the effect of a dam to generate a pressure differential between the high head 14 of water and the low head 18 of water at the point of discharge 3420 to perform work like but not limited to generating power, operating a mill or mining using the high pressure to strip away the earth.

This innovation allows for work to be done without the construction of a dam. This allows work, like power generation, to be accomplished at many additional sites where the head of water is too low, the elevation at the source is too low, or the construction of a dam would have adverse impact on the land use. Accordingly, the delivery system could send water form near, intermediate or faraway places to perform work, like generating power.

The delivery system or elevated structure 3494 allows water to be carried from a high head to a low head to perform work like generating power. The advantage here is that the elevated structure 3494 maintains a pressure differential between the high head 14 and the turbine/generator 3412 creating a pressure differential to perform work. The delivery system would maintain a high head from its high head source to the penstock 3408. Water would drop down the penstock to activate a turbine/generator system to generate power. The high head of water can be from a natural source or a manmade source. Natural sources can include but not be limited to: rivers, lakes, springs, and runoff water. Manmade sources of water can be but not limited to reservoirs, dams, tanks, over flow systems, flood control systems, catch basin systems and drain systems. Note that a catch basin system can be used to capture, run off, drainage, precipitation and water from a water fall to supply the delivery system's connecting pipe 3416 and or it's penstock 3408.

The types of delivery systems that can be used are too numerous to list but can include and are not limited to: pipe systems, tubing systems, canal systems, aqueducts, troughs, channels, drainage systems, run off systems, spillways, overflow systems and any combinations of these systems. These systems can be made of natural material, manmade/synthetic material and any combination of natural and manmade/synthetic materials. Natural materials that can be used include but not be limited to stone, dirt, clay, wood and/or any combination of those things. Manmade materials that can be used are too numerous to describe but can include but not be limited to: metal, cement/concrete, tile, and synthetic material/s (plastics/rubber/vinyl). Pumps can also be used to lift water up and into the connecting pipe. As long as the pump cost is lower than the power generation this can be a viable alternative. Refer to FIG. 35C, wherein it is demonstrated that a pump system (PPS) can lift water into the delivery system.

Referring specifically to FIG. 34, this example illustrates the work being performed is generating power or performing work. The delivery system 3494 maintains a pressure differential between the high head 14 and the turbine/generator 3412 by using a support structure 3494 to lift the connecting pipe 3416 above the ground.

The intake valve 3404 controls the flow of water entering connecting pipe 3416. Intake valve 3404 is opened allowing water from the high head 14 of water, either natural and/or manmade, to travel through connecting pipe 3416. Water traveling through 3416 eventually drops down penstock 3408 to activate/operate a turbine/generator system 3412. The water then is evacuated from the power plant at the point of discharge 3420. The water exiting the system empties into the low head 18 of water.

The delivery system can have open connecting pipes 3416 (similar to eaves troughs/gutter designs), and they can have enclosed connecting pipes. If necessary, the connecting pipe can be part opened and part enclosed. Note also that, it is entirely possible that some sections of the connecting pipe 3416 may need to travel through the earth like tunnels on a turnpike or an expressway have. FIG. 34 therefore illustrates a portion of connecting pipe 3416 being optionally installed underground.

Note also that, referring to FIGS. 34C and 34B, it is plain to see that the slope/angle of the connecting pipe can vary as desired/necessary. FIG. 34C also demonstrates the (CP) can also serve as the penstock (PS).

Figure 35A:
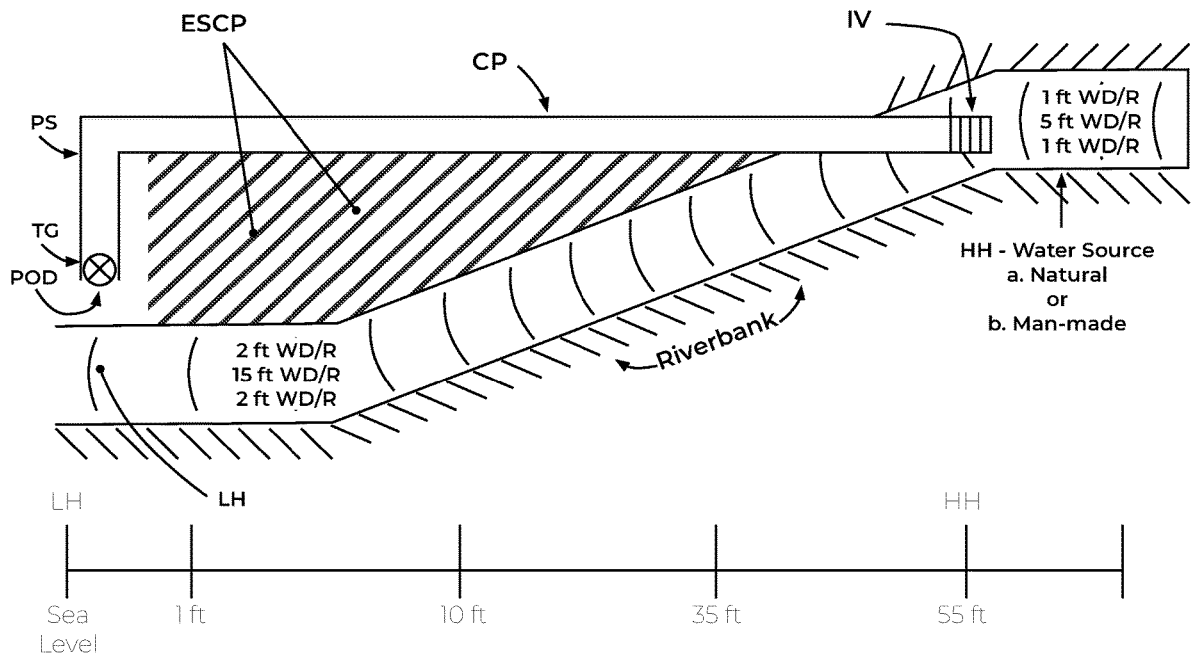
FIG. 35A is an elevation view of a thirty-second exemplary embodiment of the invented power generation system.

Referring to FIG. 35A, this is a variation of the delivery system previously described in connection with FIG. 34. The difference is that this exemplary embodiment maintains the pressure differential between the high head (HH) of water and the low head of water (LH) by elevating the ground along the path. Thus, rather than building a support system that lifts and/or supports the connecting pipe above ground, it raises the ground with natural, manmade or a combination of those things and has the connecting pipe rest on it. Thus, the delivery system or elevated structure (ESCP) uses natural and/or manmade components/material, matter allowing the connecting pipe (CP) to reside while maintaining a pressure differential (height difference) between the high head (HH) of water and the low head (LH) of water.

An elevation scale is provided in FIG. 35A for illustrative purposes. This example shows that the high head (HH) of water is at 55 feet above sea level and the point of discharge (POD) and the turbine generator systems (TG) are somewhere in between. Obviously, the possibilities of pressure differentials (difference in elevation between the high head (HH) and the low head (LH)) are too many to list. FIG. 35A operates in the same manner as the exemplary embodiment shown in connection with FIG. 34A.

Figure 35B:
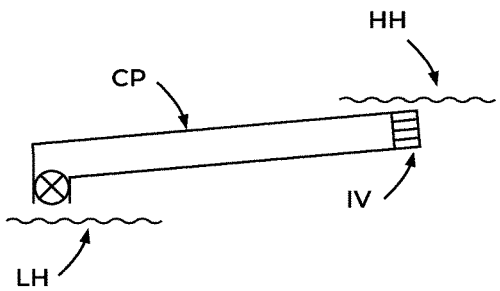
FIG. 35B is an elevation view of an embodiment of a connecting pipe slope for use in connection with exemplary embodiment of the invented power generation system shown in connection with FIG. 35A.
Figure 35C:
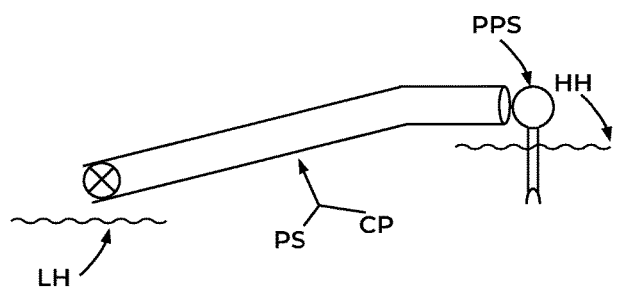
FIG. 35C is an elevation view of a further embodiment of a connecting pipe slope for use in connection with exemplary embodiment of the invented power generation system shown in connection with FIG. 35A.

Referring to FIG. 35B, this variation shows that the connecting pipe (CP) can be at any desired slope/angel as desired or necessary. It does not necessarily need to be horizontal to the ground. Referring to FIG. 35C, this variation illustrates that a pump system can be used to send water to the connecting pipe (CP). There are many practical applications for this that are too numerous to list. They include but are not limited to locations where it is easier to lift water into the (CP) rather than alter the terrain, using a catch basin to collect precipitation, using a catch basin to collect runoff water, water from a water fall, using it as a pump storage system and any of the aforementioned concepts. Also, FIG. 35C shows connecting pipe (CP) can also act as the penstock (PS).

Figure 36A:
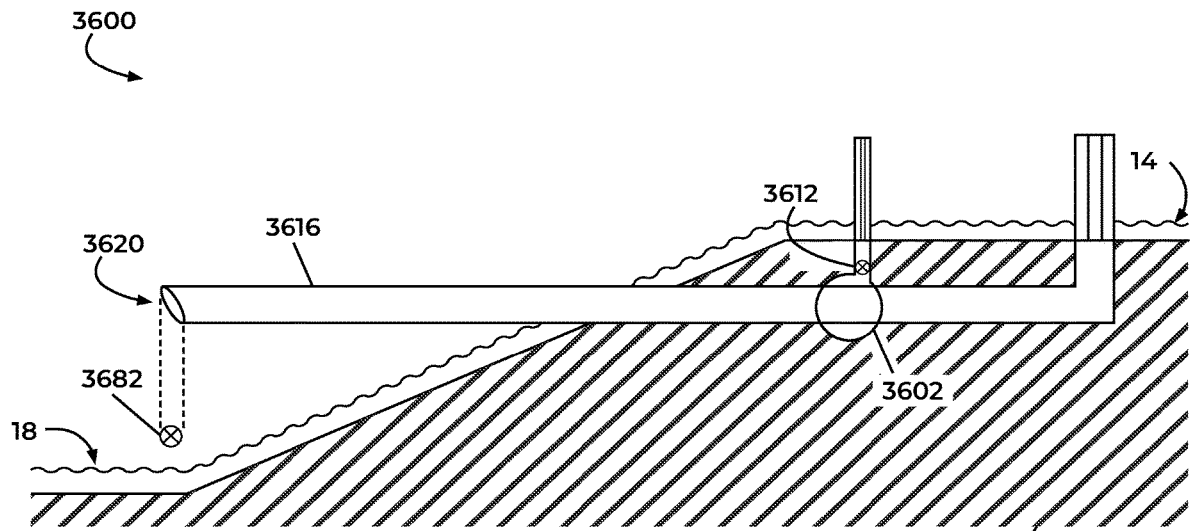
FIG. 36A is an elevation view of a thirty-third exemplary embodiment of the invented power generation system.
Figure 36B:
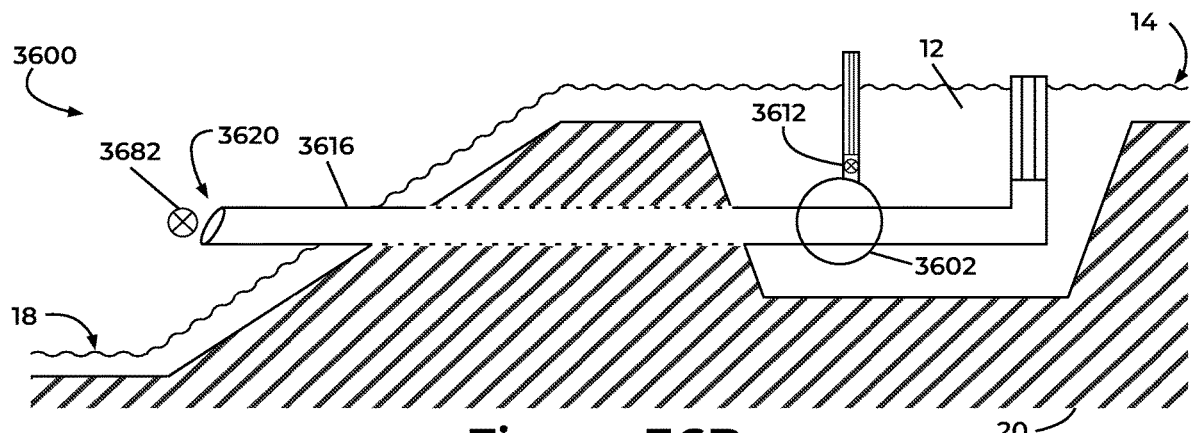
FIG. 36B is an elevation view of the exemplary embodiment of the invented power generation system shown in connection with FIG. 36A with optional excavation features.

The exemplary embodiment 3600 shown in connection with FIG. 36 depicts the addition of a turbine/generator system 3682 outside the point of discharge 3620 in FIG. 36B. Since the water exiting the vacuum pump system has the same high pressure as the water entering it, its energy can be used to perform work, like generating electricity. Although 3682 can be positioned inside of 3616 it is positioned outside in this example so that it would not have a detrimental effect on the pressure of the water flowing through the system. Accordingly, placing 3682 outside of the power plant enables 3612 to generate power at full capacity and 3682 captures the pressure differential between the high head of water 14 and the point of discharge 3620 to maximize the system's power generation. Using both 3612 and 3682 will increase the power plants efficacy. Depending upon the pressure differentials it can be a significant power generation increase. Whether 3682 is positioned inside of 3616 or outside of it will need to be calculated and tested by an expert in the appropriate arts in a given application of the inventive principles set forth herein. Again, it can be placed at either location if desired.

Figure 36C:
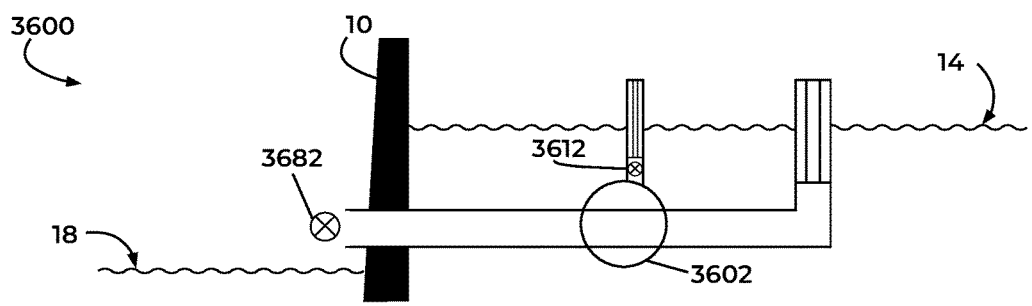
FIG. 36C is an elevation view of a further embodiment of the invented power generation system shown in connection with FIG. 36A as applied to an existing dam structure.

In FIG. 36C, it is illustrated that new construction power plants can increase their power generation by using the same principal of using a venturi or jet pump system to operate a turbine generator system 3612, as well as, using another turbine generator system 3682 as described in FIG. 36B. Whether 3682 is positioned inside of 3616 or outside of it will need to be calculated and tested by an expert in the appropriate arts in a given application of the inventive principles set forth herein. Again, it can be placed at either location if desired.

FIG. 36A also illustrates that the invented power generation system 3600 can be installed into the ground 20, which among other things permits applications to take advantage of large elevation drops. It also allows the user to extend the height of the penstock to greatly customize the capital expenditures, expected maintenance costs and efficiencies on a project. In FIG. 36B, a reservoir of high head water 12 is created by excavation, if desired.

Additionally, existing power plants can be modified using the same principal described above to increase their power generation. Whether 3682 is positioned inside of 3616 or outside of it will need to be calculated and tested by an expert in the appropriate arts in a given application of the inventive principles set forth herein. Again, it can be placed at either location if desired.

Figure 37:
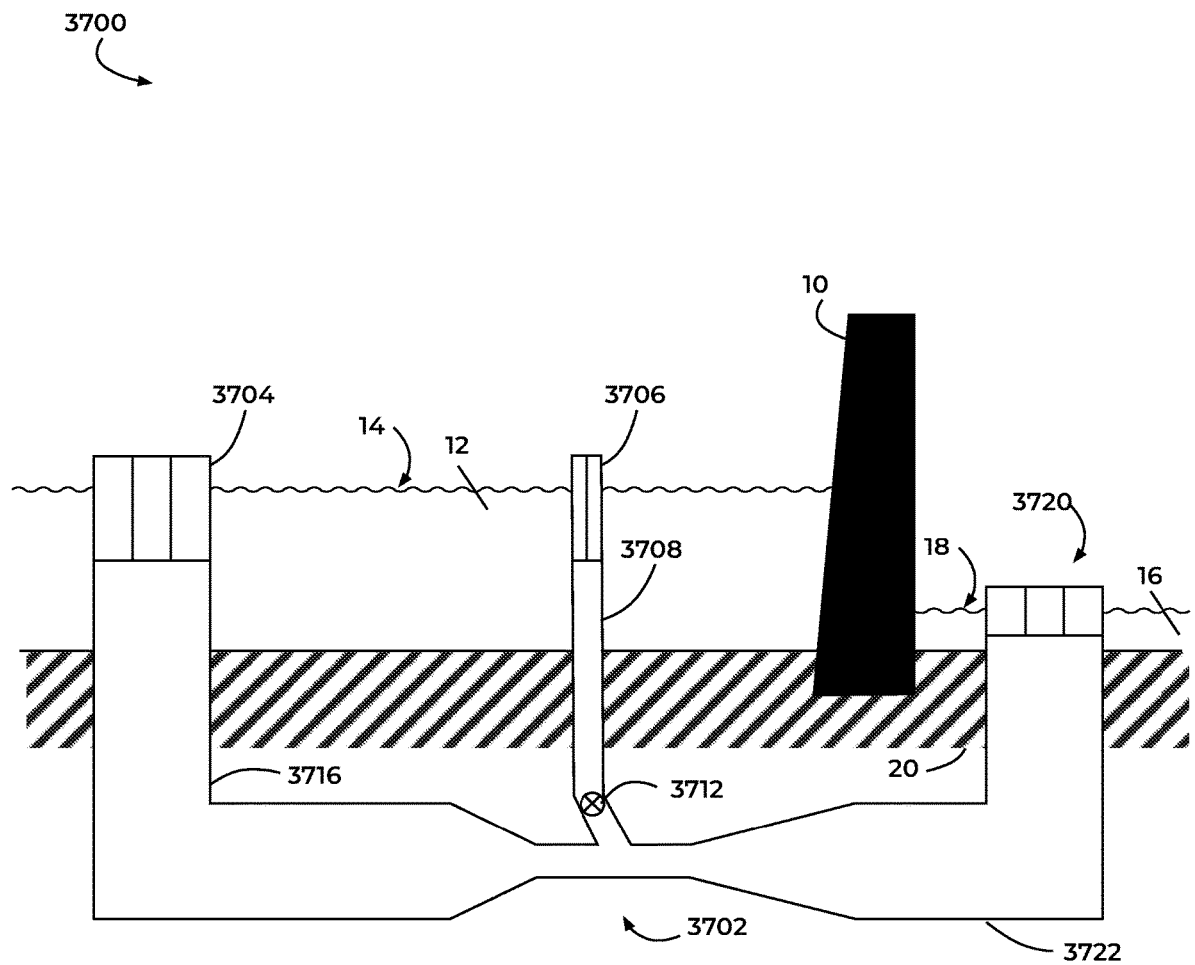
FIG. 37 is an elevation view of a thirty-third exemplary embodiment of the invented power generation system.

Turning to FIG. 37, an exemplary embodiment of the invented power generation system 3700 is depicted that illustrates generally the advantage of the invented systems provided in sizing the operational ranges of the power generating components. Here, a penstock 3708 is provided that receives an amount of working fluid from the high head 14 side of the dam 10. The penstock 3708 provided is lengthy and extends well beneath the lakebed, riverbed, or the like under the ground 20. The use of the vacuum pump system 3702 (here a venturi configuration) and the motive force of the primary flow of working fluid received via inlet 3704 and connecting pipe 3716 permits the head difference seen across the power generating system 3712 to be quite large in comparison with previous systems. This advantage is particularly useful in scenarios wherein the total head differential is relatively small, between 1.5 meters to 15 meters. Equipment can be sized to efficiently generate power at previously disadvantageous and unsuitable sites, thereby expanding the power generation capabilities of a particular geographic region.

Embodiments that take advantage of this aspect of the invented system have also been found to be very suitable for use in hydroelectric power generation that demands run of the river circumstances. Run of the river hydroelectric power projects aim to eliminate all or nearly all of the environmental effects that can be caused by hydroelectric power generation. In these applications the usefulness of the invented systems is amplified as a large portion of the water flowing in the river can be said to safely continue downstream.

Although they are theoretically desirable, run of the rivers applications also have difficulties in geographies wherein flow rates and water levels fluctuate widely. Sizing components for a hydroelectric project without significantly regulating the flow of the river becomes difficult, and flood waters are often not taken advantage of (and in many cases greatly reduce the effectiveness of the installation during flooding events).

Figure 38:
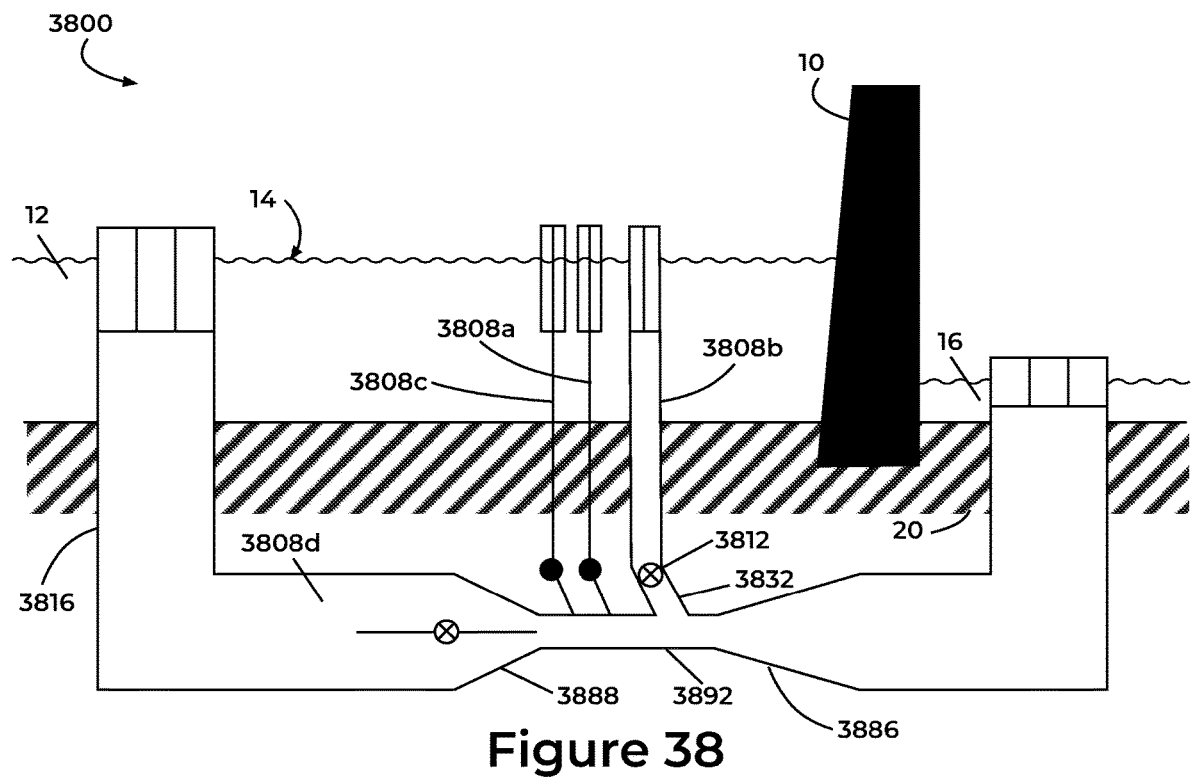
FIG. 38 is an elevation view of a thirty-fourth exemplary embodiment of the invented power generation system.
Figure 39:
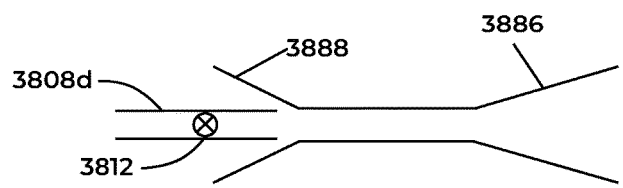
FIG. 39 is a detail view of the exemplary embodiment of the invented power generation system shown in connection with FIG. 38.

Turning to FIG. 38, an exemplary embodiment 3800 is shown in which several optional penstock locations are illustrated. Penstock 3808a, for example, is positioned generally such that the corresponding low pressure or vacuum inlet 3832 is connected at the mid-point venturi throat 3892. However, other positions are also acceptable depending on the characteristics of an application and the chosen components. It might, for instance, be beneficial to place the penstock toward the divergent section 3886 of the venturi, as at 3808b. In other cases, it may be preferred to place the penstock toward the convergent section 3888 of the venturi, as at 3808c, or within the connecting pipe 3816 leading into the venturi, at the beginning, interim, or end of the convergent section 3888, for instance. A closer detailed look of the exemplary location of a concentric penstock 3808d is shown in partial view in connection with FIG. 39. In this exemplary embodiment, the penstock 3808d might be placed as a stub (i.e., not extend to or near the surface of the high head 14 portion of the working fluid 12, but rather extending into the primary working fluid flow in connecting pipe 3816) in the connecting pipe 3816. The power generating system 3812 is carried therein, and the changing flow characteristics of the vacuum system (in this case a venturi system) increase the effective head seen by the power generating system 3812. The penstock 3808d may extend into or through the convergent cone 3888, for instance, as in this example.

Figure 40:
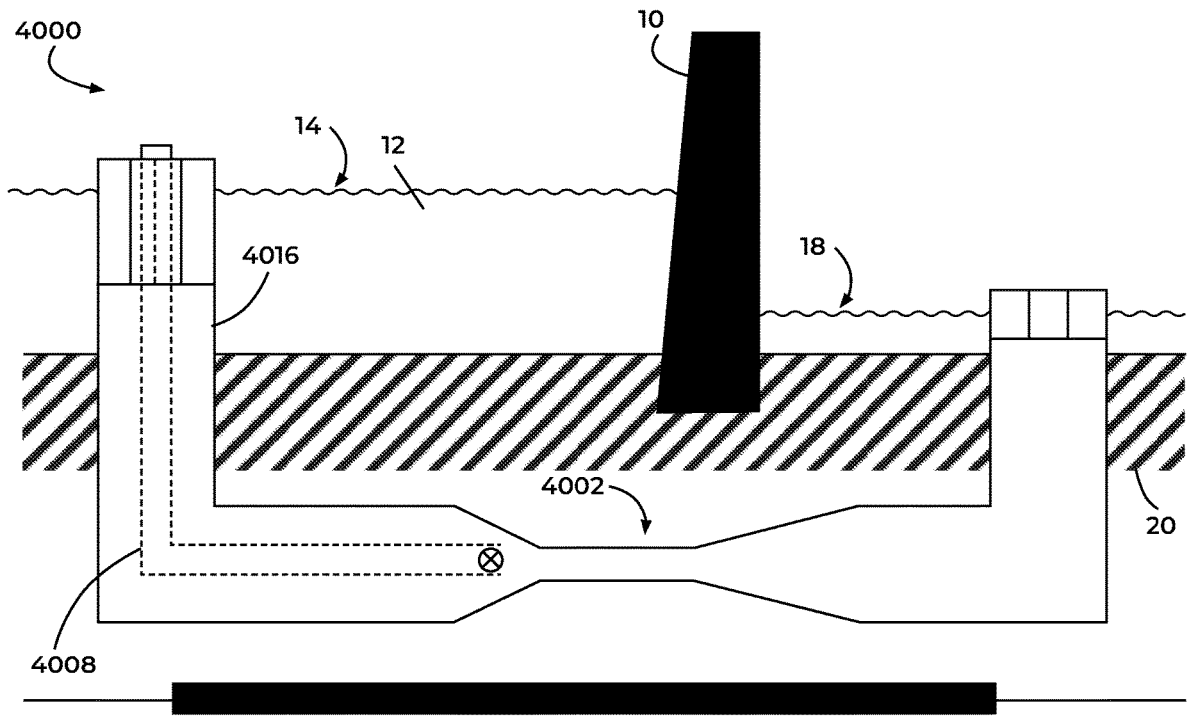
FIG. 40 is an elevation view of a thirty-fifth exemplary embodiment of the invented power generation system.
Figure 41:
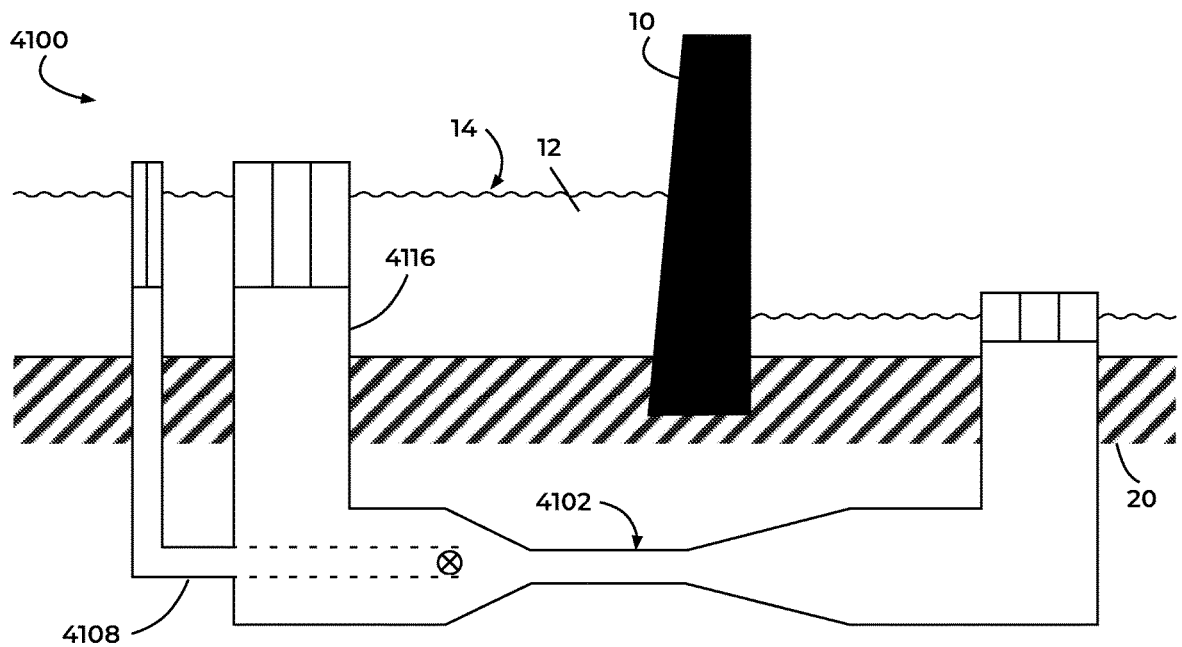
FIG. 41 is an elevation view of a thirty-sixth exemplary embodiment of the invented power generation system.
Figure 42:
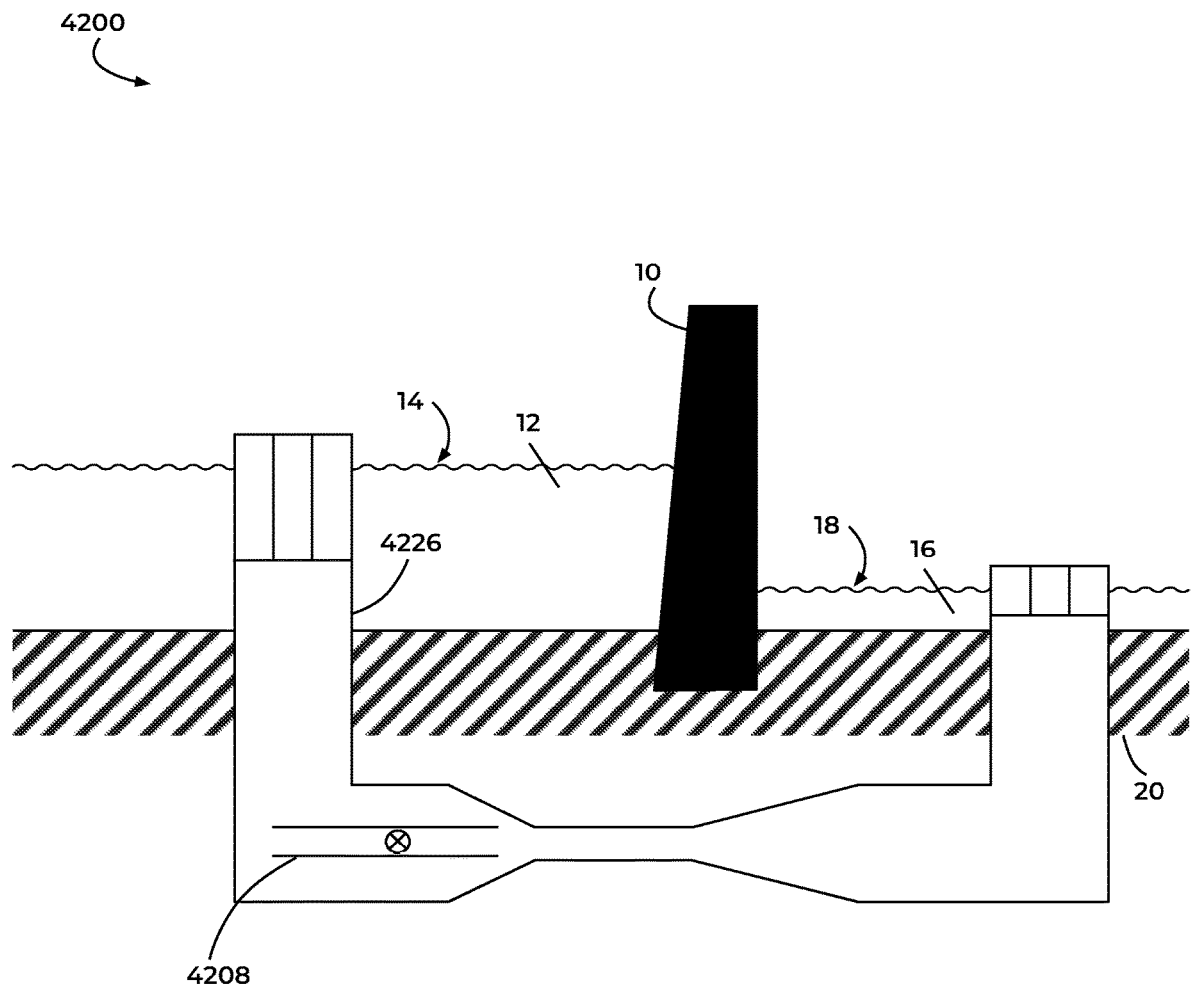
FIG. 42 is an elevation view of a thirty-seventh exemplary embodiment of the invented power generation system.

Alternatively, the concentric-style penstock can extend to the high head 14 of upstream working fluid 12. In FIG. 40, an exemplary embodiment 4000 is illustrated in which a penstock 4008 is shown positioned within the connecting pipe 4016, for example. In FIG. 41, an exemplary embodiment 4100 is illustrated in which a penstock 4108 is shown positioned with the connecting pipe 4116 for a portion of its length before extending outwardly therefrom and toward the high head 14. FIG. 42 illustrates an exemplary embodiment 4200 wherein a penstock stub 4208 is shown, housed within the connecting pipe 4216. Structural supports will be necessary and recognized by those skilled in the art but are not shown here for demonstrative purposes. However, those skilled in the art will appreciate that various structural elements can be used to support the penstock 4208 without negatively disrupting the flow of the primary working fluid.

In all of the previous several embodiments, however, the extension of the vacuum pump system components underground is primarily responsible for the invention being useful in a variety of previously undesirable locales and being ecologically beneficial—currently a sorely needed goal in the pursuit of power generation to satisfy the growing populace.

Figure 43:
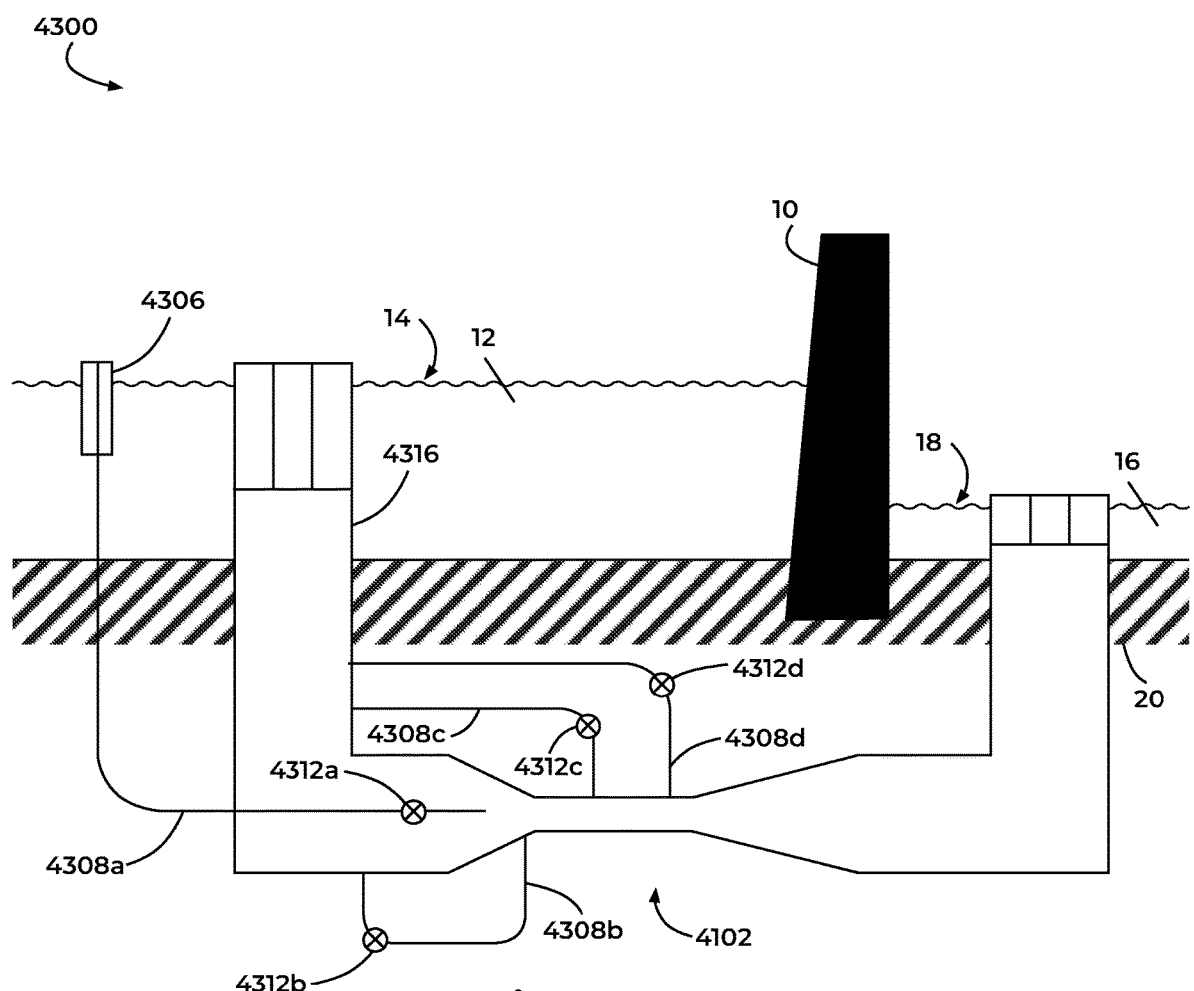
FIG. 43 is an elevation view of a thirty-eighth exemplary embodiment of the invented power generation system.

Another exemplary embodiment 4300 is shown in schematic representation in connection with FIG. 43. In this illustration, a further variety of penstock configurations are shown, as at 4308a, 4308b, 4308c and 4308d. Note that 4308a is the only optional configuration that utilizes a fully extending surface-reaching penstock at inlet 4306. The remaining three penstocks 4308b, 4308c and 4308d all receive their secondary working fluid flow from the connecting pipe 4316. Note also optional outlet locations exemplified by the ends of the penstocks downstream of the power generating systems 4312a, 4312b, 4312c and 4312d with respect to the venturi system 4302.

Figure 44:
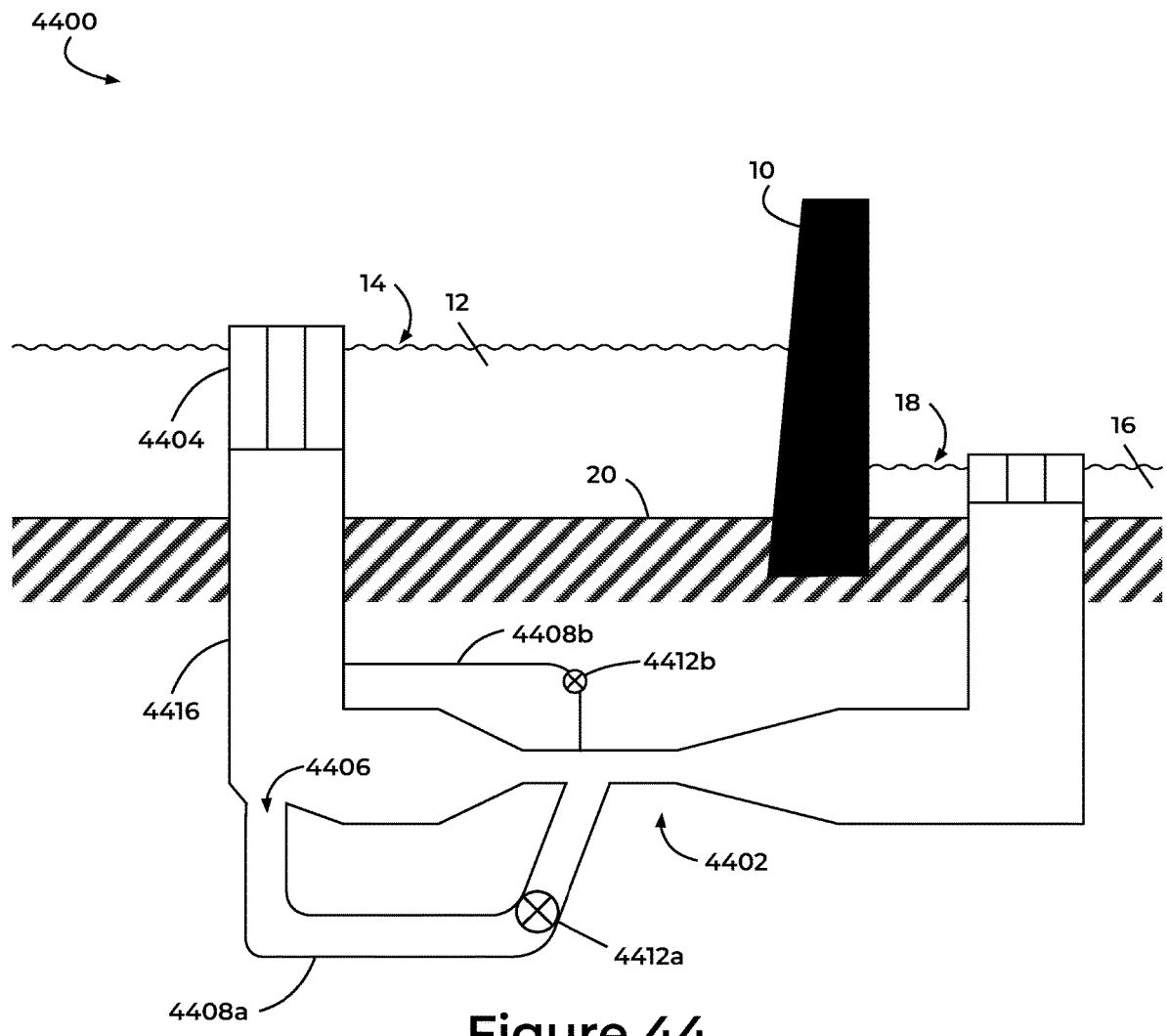
FIG. 44 is an elevation view of a thirty-ninth exemplary embodiment of the invented power generation system.
Figure 45:
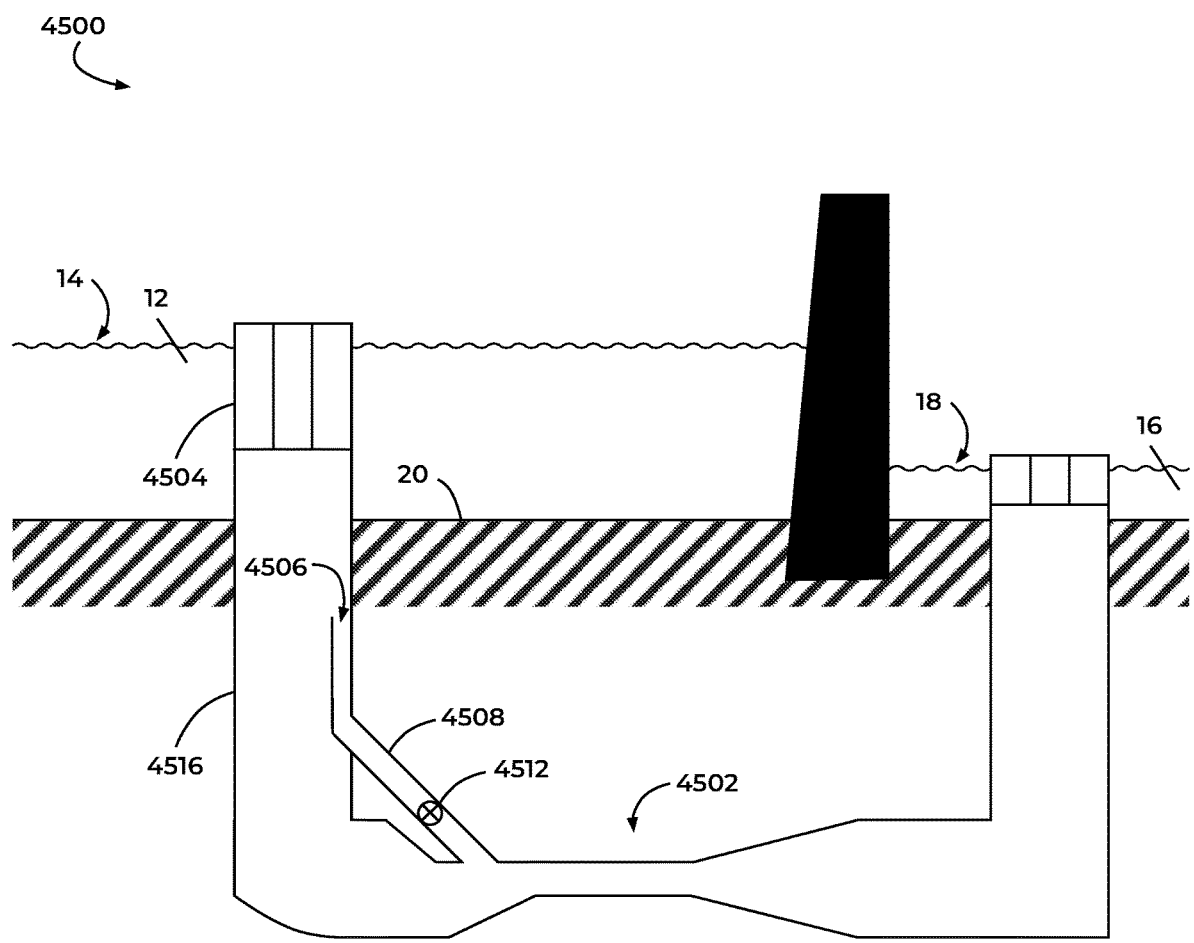
FIG. 45 is an elevation view of a fortieth exemplary embodiment of the invented power generation system.
Figure 47A:
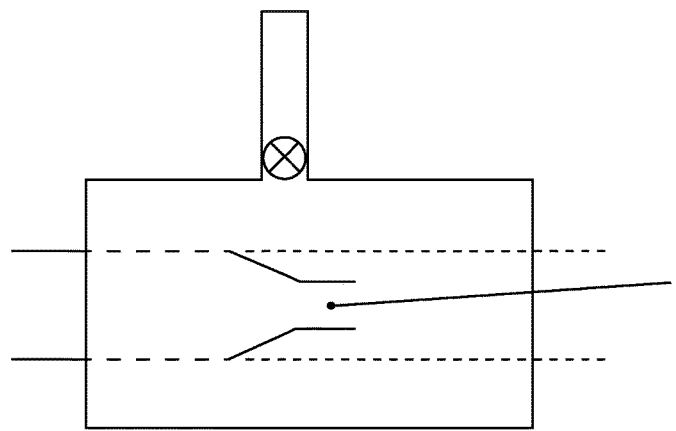
FIGS. 47A-D are exemplary detail views of vacuum pump system embodiments.
Figure 47B:
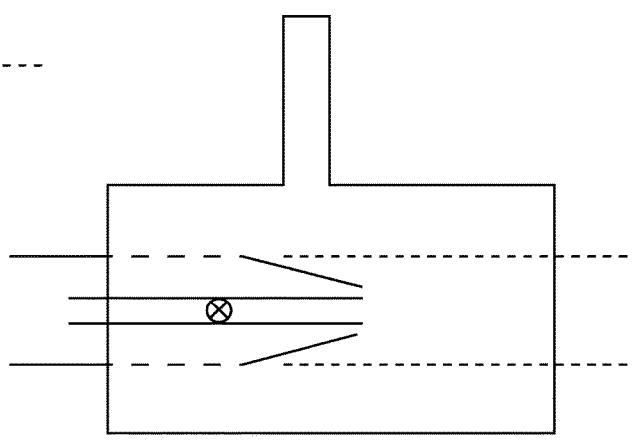
Figure 47C:
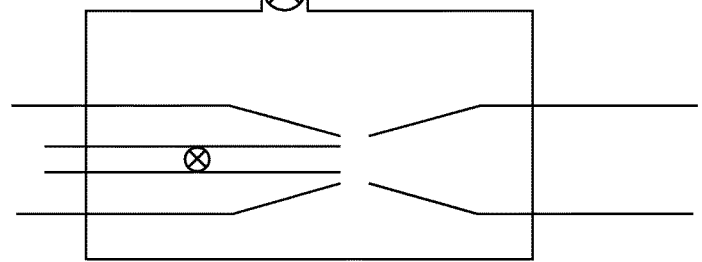
Figure 47D:
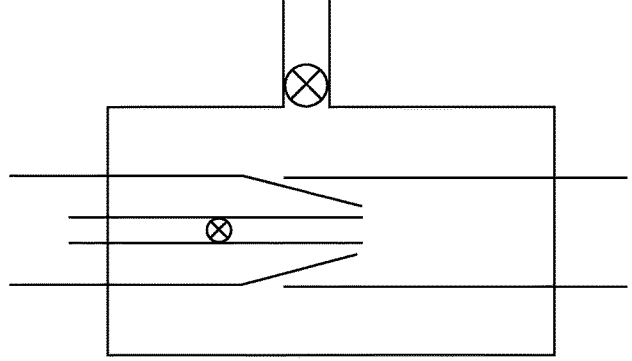
Figure 48A:
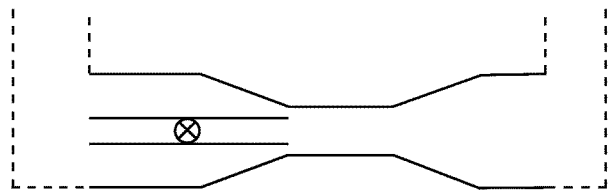
FIGS. 48A-F are exemplary detail views of vacuum pump system embodiment.
Figure 48B:
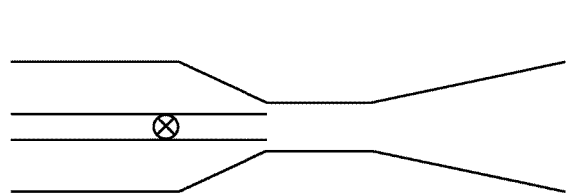
Figure 48C:
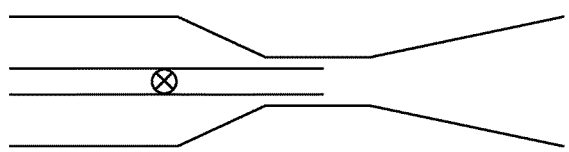
Figure 48D:
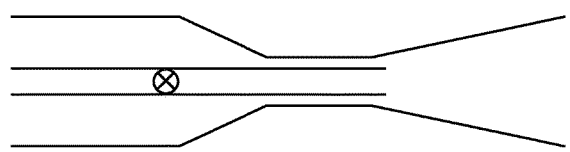
Figure 48E:
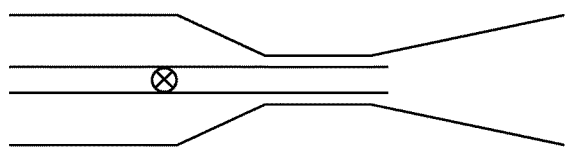
Figure 48F:
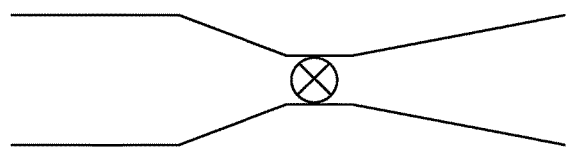

FIG. 44 and FIG. 45 each illustrate additional physical configuration options for bringing together a primary and secondary flow of working fluid at the vacuum pump system chosen for a particular application. In each case, the selection of where to begin and end the penstock may vary based on local inputs and component choices and should be tested and approved by those skilled in the art prior to operation. FIG. 44 shows an exemplary embodiment 4400 in which optional penstocks 4408a and 4408b are illustrated receiving a secondary flow of working fluid via 4406 from within the connecting pipe 4416 receiving high head 14 fluid 12 through inlet 4404. These penstocks include power generating systems 4412a and 4412b, respectively, and outlet into a lower pressure environment of the vacuum pump system 4402 generally, under the ground 20. FIG. 45, likewise, shows an exemplary embodiment 4500 in which optional penstock 4508 is illustrated receiving a secondary flow of working fluid via 4506 from within the connecting pipe 4516 receiving high head 14 fluid 12 through inlet 4504. This penstock includes power generating system 4412 and outlet into a lower pressure environment of the vacuum pump system 4502 generally, under the ground 20.

Turning to FIG. 46, an exemplary embodiment 4600 is shown in which the penstock 4608 receives working fluid preferably from a high head 14 via inlet 4606. Power is generated at power generation system 4612 before it collects into (TWC) 4618. The motive, primary working fluid flow enters from the high head 14, through inlet 4604 and into connecting pipe 4616. The vacuum pump system 4602 in this embodiment 4600 is used to increase the head seen in secondary penstock 4609, which joins the (TWC) 4618 with the vacuum pump system 4602. It is optionally shown in concentric configuration in the convergent cone 4688, for instance. The (TWC) may be optionally but preferably vented in this scenario via air vent 4614 and controlled with air valve 4672. This embodiment 4600 can be used to increase the chance for power generation in a tiered manner and can extend under the ground 20. Looking to inset A in FIG. 46, an optional configuration is shown in which the vacuum pump system 4602 is housed directly within the (TWC) 4618 between the connecting pipe 4616 and the discharge connecting pipe 4622.

Turning to FIG. 47 and FIG. 48, a variety of exemplary configurations are shown as it relates to the positioning of the various vacuum pump components. In general, there are considered to be a wide range of physical configurations that will be suitable for a given application that those skilled in the art will appreciate after becoming familiar with the invention. In FIG. 47, several jet pump configurations are shown which utilize a (TWC), for example. In FIG. 48, several venturi configurations are shown without a (TWC).

Figure 49:
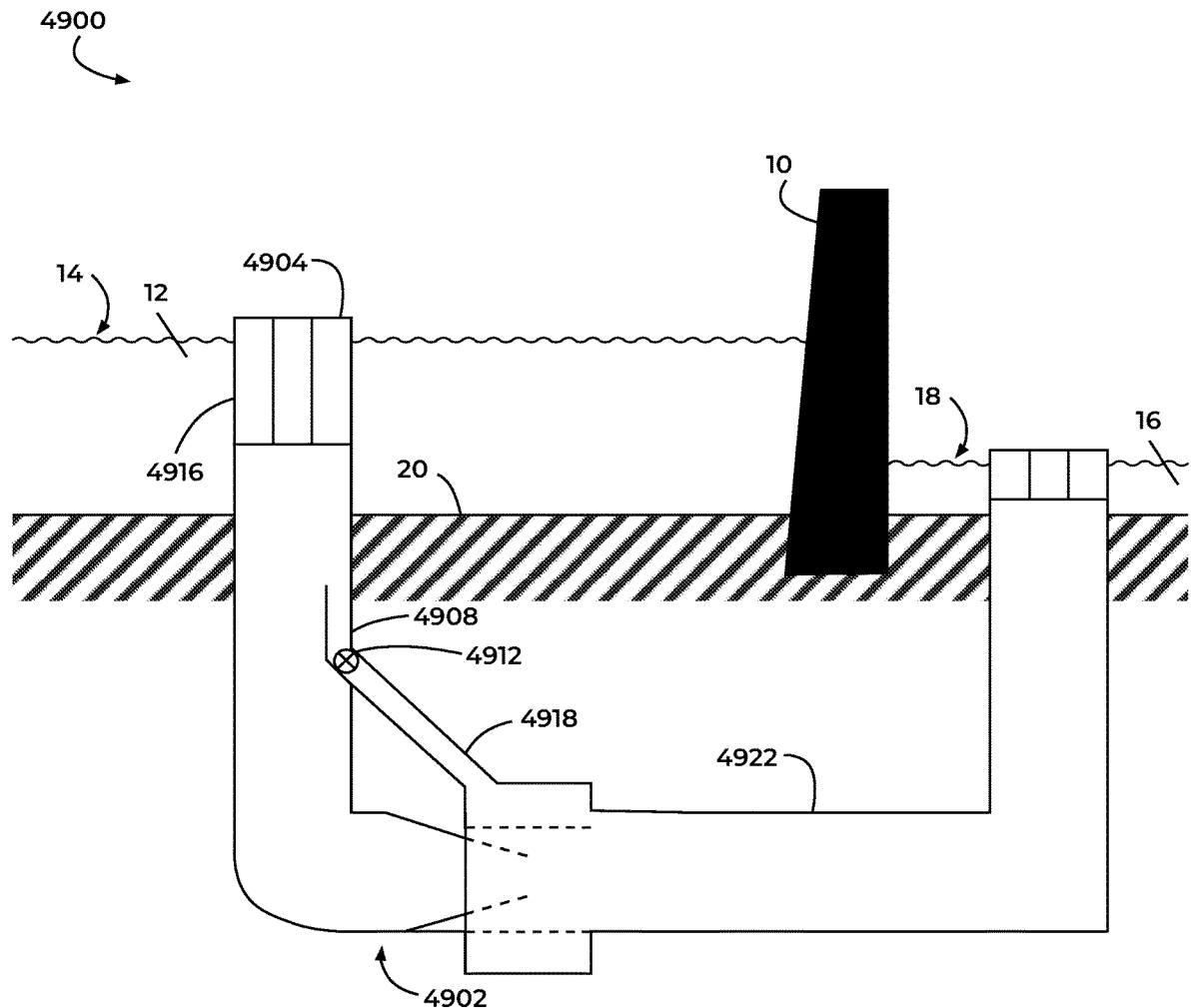
FIG. 49 is an elevation view of a forty-second exemplary embodiment of the invented power generation system.

Turning to FIG. 49, an exemplary embodiment 4900 is illustrated similar in nature to that shown and described in connection with FIG. 45. The exception and chief difference here being, that a mixing (TWC) is utilized with a jet pump as the primary vacuum pump system 4902.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A power generation system operating on a working fluid having a primary flow rate between an upstream reservoir having a high head and a downstream tailrace having a low head separated by a dam extending above a ground, comprising:

an inlet receiving a first portion of the working fluid from a-the high head;

a power generation component comprising:

a penstock inlet receiving a secondary portion of the working fluid, wherein the ratio of the secondary portion of the working fluid over the first portion of the working fluid is less than 0.5; and a turbine generator;

a vacuum pump system fluidly connected to the inlet and the power generation component beneath the ground to receive a combined working fluid, wherein the combined working fluid comprises a combination of the first portion of the working fluid and the secondary portion of the working fluid, and wherein the first portion of the working fluid imparts a fluidic vacuum to the power generation component; and a connecting pipe fluidly connected to receive the combined working fluid from the vacuum pump system and transmit the combined working fluid to a point of discharge at a-the low head.

2. The power generation system of claim 1, wherein the vacuum pump system is a venturi system.

3. The power generation system of claim 1, wherein:

the vacuum pump system is a venturi system comprising:

a convergent inlet cone fluidly connected to the inlet;

a restriction fluidly connected to the convergent inlet cone;

2 a low-pressure inlet fluidly connected to the power generation component and the restriction; and a divergent outlet cone fluidly connected to the restriction, wherein a combined working fluid is received comprising a combination of the first portion of the working fluid and the secondary portion of the working fluid, and wherein the connecting pipe is fluidly connected to receive the combined working fluid from the divergent outlet cone and transmit the combined working fluid to a point of discharge at a low head.

4. The power generation system of claim 1, wherein the vacuum pump system is an ejector system.

5. The power generation system of claim 1, wherein:

the vacuum pump system is an ejector system comprising:

a diffuser inlet fluidly connected to the inlet;

a nozzle fluidly connected to the diffuser inlet;

a low-pressure inlet fluidly connected to the power generation component and the nozzle; and a suction chamber fluidly connected to the nozzle and the low-pressure inlet, wherein a combined working fluid is received comprising a combination of the first portion of the working fluid and the secondary portion of the working fluid, and wherein the connecting pipe is fluidly connected to receive the combined working fluid from the suction chamber and transmit the combined working fluid to a point of discharge at a low head.

6. The power generation system of claim 1, wherein the combination of the first portion and the secondary portion of the working fluid increases an effective head experienced across the power generation component.

7. The power generation system of claim 1, wherein the vacuum pump system operates under a ground surface.

8. The power generation system of claim 7, whereby an effective head of the power generation system is increased.

* * * * *